United States Patent
Yu et al.

(10) Patent No.: US 12,302,174 B2
(45) Date of Patent: *May 13, 2025

(54) COMMUNICATION METHOD AND COMMUNICATIONS APPARATUS FOR DETERMINING LATENCY OF TRANSMISSION BETWEEN NETWORK ELEMENTS

(71) Applicant: Huawei Technologies Co., Ltd., Shenzhen (CN)

(72) Inventors: Fang Yu, Shenzhen (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,972

(22) Filed: Feb. 15, 2024

(65) Prior Publication Data

US 2024/0267793 A1     Aug. 8, 2024

Related U.S. Application Data

(63) Continuation of application No. 17/174,975, filed on Feb. 12, 2021, now Pat. No. 11,937,128, which is a
(Continued)

(30) Foreign Application Priority Data

Aug. 13, 2018   (CN) .......................... 201810918006.5
Oct. 8, 2018    (CN) .......................... 201811169219.9

(51) Int. Cl.
*H04W 28/12*   (2009.01)
*H04W 24/02*   (2009.01)
(Continued)

(52) U.S. Cl.
CPC ........... *H04W 28/12* (2013.01); *H04W 24/02* (2013.01); *H04W 24/08* (2013.01);
(Continued)

(58) Field of Classification Search
CPC ..................................................... H04W 28/12
See application file for complete search history.

(56) References Cited

U.S. PATENT DOCUMENTS 11,191,052 B2   11/2021  Moon et al.
11,212,829 B2*  12/2021  Hosseini ............... H04W 72/23
(Continued)

FOREIGN PATENT DOCUMENTS

CN   101394324 A    3/2009
CN   101854268 A   10/2010
(Continued)

OTHER PUBLICATIONS

Huawei et al., "TS 23.502: Delay time generation for PDU session during handover", SA WG2 Meeting #122, S2-174616, Jun. 26-30, 2017, San Jose Del Cabo, Mexico, 11 pages.
(Continued)

*Primary Examiner* — Guang W Li
(74) *Attorney, Agent, or Firm* — Slater Matsil, LLP

(57) ABSTRACT

An SMF network element determines, according to a PCC rule of a flow, a third latency of transmitting the flow from a UPF network element to UE, so that a second latency of transmitting the flow from a flow service provider in a TSN to the UE can be determined based on the third latency and a first latency of transmitting the flow from the flow service provider in the TSN to the UPF network element.

19 Claims, 23 Drawing Sheets

Related U.S. Application Data continuation of application No. PCT/CN2019/100063, filed on Aug. 9, 2019.

(51) Int. Cl.
  *H04W 24/08* (2009.01)
  *H04W 28/02* (2009.01)
  *H04L 12/14* (2006.01)
  *H04W 4/24* (2018.01)

(52) U.S. Cl.
  CPC ..... *H04W 28/0236* (2013.01); *H04L 12/1407* (2013.01); *H04W 4/24* (2013.01)

(56) References Cited

U.S. PATENT DOCUMENTS

| | | |
|---|---|---|
| 2013/0315159 A1 | 11/2013 | Xia et al. |
| 2018/0084497 A1 | 3/2018 | Jung |
| 2018/0302330 A1* | 10/2018 | Bush ........................ H04L 47/27 |
| 2019/0075431 A1* | 3/2019 | Albasheir ............... H04W 4/20 |
| 2019/0254083 A1 | 8/2019 | Stammers |
| 2020/0107253 A1* | 4/2020 | Albasheir ........... H04L 43/0852 |
| 2020/0107339 A1 | 4/2020 | Prakash |
| 2021/0099341 A1 | 4/2021 | Moon |
| 2021/0144632 A1 | 5/2021 | Albasheir et al. |
| 2021/0153070 A1* | 5/2021 | Velev .................... H04W 24/08 |
| 2021/0168658 A1 | 6/2021 | Yu |
| 2021/0243771 A1 | 8/2021 | Mannweiler |
| 2021/0345193 A1 | 11/2021 | Miklós |
| 2022/0030641 A1 | 1/2022 | Wang |

FOREIGN PATENT DOCUMENTS

| | | |
|---|---|---|
| CN | 102843257 A | 12/2012 |
| CN | 103782555 A | 5/2014 |
| CN | 105474683 A | 4/2016 |
| CN | 106230661 A | 12/2016 |
| CN | 108337705 A | 7/2018 |
| WO | 2014036704 A1 | 3/2014 |

OTHER PUBLICATIONS

Huawei et al., "QoS Negotiation between 3GPP and TSN networks KI#3.1", SA WG2 Meeting #128Bis, S2-188233, Sophia Antipolis, France, Aug. 20-24, 2018, 8 pages.

Nokia et al., "Introducing support for UE and UPF Residence Time for TSC Deterministic QoS", SA WG2 Meeting #132, S2-1903654, Apr. 8-12, 2019, Xian, 4 pages.

Secretary of SA WG2, "Draft Report of SA WG2 meetings #127BIS", SA WG2 Meeting #S2-128, S2-187293, Vilnius, Lithuania, Jul. 2-6, 2018, 537 pages.

* cited by examiner

COMMUNICATION METHOD AND COMMUNICATIONS APPARATUS FOR DETERMINING LATENCY OF TRANSMISSION BETWEEN NETWORK ELEMENTS

CROSS-REFERENCE TO RELATED APPLICATIONS

This application is a continuation of U.S. patent application Ser. No. 17/174,975, filed on Feb. 12, 2021, which is a continuation of International Application No. PCT/CN2019/100063, filed on Aug. 9, 2019, which claims priority to Chinese Patent Application No. 201810918006.5, filed on Aug. 13, 2018 and Chinese Patent Application No. 201811169219.9, filed on Oct. 8, 2018. All of the aforementioned patent applications are hereby incorporated by reference in their entireties.

TECHNICAL FIELD

This application relates to the communications field, and more specifically, to a communication method and a communications apparatus.

BACKGROUND

Currently, in the communications field, a communications technology for interworking between a 3rd generation partnership project ($3^{rd}$ generation partnership project, 3GPP) network and a time sensitive network (TSN) is proposed. In a scenario in which a 3GPP core network interworks with a TSN, a terminal device (UE) may be used as a flow service recipient (listener) to receive a flow sent by a flow service provider (talker) of the TSN. Alternatively, the UE may serve as a flow service provider to send a flow to a flow service recipient in the TSN, for example, an ultra-reliable low-latency communication (URLLC) flow. As a boundary between the TSN and the 3GPP network, a user plane function (UPF) network element may have a basic function of a bridge in the TSN.

To implement interworking between the 3GPP network and the TSN, an accumulated latency of transmitting a flow between the UE and the UPF network element in the 3GPP network needs to be calculated.

Therefore, how to determine the accumulated latency of transmission between the UE and the UPF network element is a technical problem that urgently needs to be resolved.

SUMMARY

This application provides a communication method and a communications apparatus, to determine an accumulated latency of transmitting a flow between UE and a UPF network element.

According to a first aspect, this application provides a communication method. The communication method includes: receiving, by a session management function (SMF) network element, first latency information of a flow from a UPF network element, where the first latency information is used to indicate a first latency of transmitting the flow from a flow service provider in a TSN to the UPF network element; determining, by the SMF network element according to a policy and charging control (PCC) rule of the flow, a third latency of transmitting the flow from the UPF network element to UE; determining, by the SMF network element based on the first latency and the third latency, a second latency of transmitting the flow from the flow service provider in the TSN to the UE; and sending, by the SMF network element, second latency information to the UPF network element, where the second latency information is used to indicate the second latency.

In the communication method, the SMF network element determines, according to the PCC rule, the third latency of transmitting the flow from the UPF network element to the UE, and uses the third latency as an accumulated latency of transmitting the flow from the UPF network element to the UE, so that the SMF network element can determine, based on the third latency and the first latency of transmitting the flow from the flow provider in the TSN to the UPF network element, the second latency of transmitting the flow from the flow service provider in the TSN to the UE. In this way, in a communications network in which a 3GPP network interworks with the TSN, it can be determined, based on the second latency, that QoS of the flow can be ensured, and the flow can be transmitted.

In addition, the SMF network element determines, according to the PCC rule, the third latency of transmitting the flow from the UPF network element to the UE, and uses the third latency as the accumulated latency of transmitting the flow from the UPF network element to the UE. However, in the prior art, clock synchronization needs to be performed between every two adjacent nodes between the UPF network element and the UE, and finally, clock synchronization between all nodes between the UPF network element and the UE is implemented, to support the TSN network on all transmission nodes between the UPF network element and the UE, so as to calculate the accumulated latency of transmitting the flow from the UPF network element to the UE. Compared with that in the prior art, the solution for the communication method is simple and easy to implement.

The third latency may be a maximum transmission latency of transmitting the flow from the UPF network element to the UE.

With reference to the first aspect, in a first possible implementation, the determining, by the SMF network element based on the first latency and the third latency, a second latency of transmitting the flow from the flow service provider in the TSN to the UE includes: determining, by the SMF network element, a sum of the first latency and the third latency as the second latency.

With reference to the first aspect or the first possible implementation, in a second possible implementation, the communication method further includes: determining, by the SMF network element according to the PCC rule, that a bandwidth resource can be reserved for the flow.

For example, before sending the second latency information to the UPF network element, the SMF network element may determine, according to the PCC rule corresponding to the flow, whether the bandwidth resource can be reserved for the flow. If determining, according to the PCC rule corresponding to the flow, that the bandwidth resource can be reserved for the flow, the SMF network element may send the second latency information to the UPF network element; otherwise, the SMF network element may not send the second latency information to the UPF network element.

For example, before determining the second latency based on the first latency and the third latency, the SMF network element may determine, according to the PCC rule corresponding to the flow, whether the bandwidth resource can be reserved for the flow. If determining, according to the PCC rule corresponding to the flow, that a core network and an access network can reserve the bandwidth resource for the flow, the SMF network element may determine the second latency based on the first latency and the third latency, and perform a subsequent operation. Otherwise, the SMF network element may not determine the second latency based on the first latency and the third latency, and may not perform a subsequent operation.

For example, before determining the third latency according to the PCC rule, the SMF network element may determine, according to the PCC rule corresponding to the flow, whether the bandwidth resource can be reserved for the flow. If determining, according to the PCC rule corresponding to the flow, that the core network and the access network can reserve the bandwidth resource for the flow, the SMF network element may determine the third latency according to the PCC rule, and perform a subsequent operation. Otherwise, the SMF network element may not determine the third latency according to the PCC rule, and may not perform a subsequent operation.

The SMF network element performs a subsequent related operation only when determining that the bandwidth resource can be reserved for the flow, thereby improving execution efficiency of the SMF network element.

Certainly, alternatively, the SMF network element may determine, only after sending the second latency information to the UPF network element, whether the UPF network element can reserve the bandwidth resource for the flow. This is not limited in this application.

With reference to the first aspect or the first or the second possible implementation, in a third possible implementation, the communication method further includes: sending, by the SMF network element, bandwidth requirement information of the flow to the UPF network element.

The SMF network element sends the bandwidth requirement message of the flow to the UPF network element, so that the UPF network element reserves the bandwidth resource for the flow based on the bandwidth requirement information. In this way, when the flow is transmitted to the UPF network element, the UPF network element may have a corresponding bandwidth resource to transmit the flow, thereby improving transmission reliability of the flow.

Optionally, the SMF network element may send the bandwidth requirement message of the flow to the UPF network element only when determining that the bandwidth resource can be reserved for the flow.

With reference to any one of the first aspect or the foregoing possible implementations, in a fourth possible implementation, the communication method further includes: sending, by the SMF network element, the bandwidth requirement information of the flow to an access network device corresponding to the UE.

The access network device reserves the bandwidth resource for the flow based on the bandwidth requirement information, so that the access network may have a corresponding bandwidth resource to transmit the flow, thereby improving transmission reliability of the flow.

It should be understood that, in this implementation, the access network device corresponding to the UE is a device that provides an access network service for the UE.

Optionally, the SMF network element may send the bandwidth requirement message of the flow to the access network device serving the UE only when determining that the bandwidth resource can be reserved for the flow.

With reference to the fourth possible implementation, in a fifth possible implementation, the communication method further includes: receiving, by the SMF network element, first information from the access network device, where the first information is used to indicate whether the access network device successfully reserves the bandwidth resource for the flow based on the bandwidth requirement information of the flow.

For example, before sending the second latency information to the UPF network element, the SMF network element may detect whether the first information is received from the access network device. If the SMF network element receives the first information and the first information indicates that the AN device successfully reserves the resource for the flow, the SMF network element may send the second latency information to the UPF network element. Otherwise, the SMF network element may not send the second latency information to the UPF network element.

For example, before determining the second latency based on the first latency and the third latency, the SMF network element may detect whether the first information is received from the access network device. If receiving the first information, the SMF network element may determine the second latency based on the first latency and the third latency, and perform a subsequent operation. Otherwise, the SMF network element may not determine the second latency based on the first latency and the third latency, and may not perform a subsequent operation.

For example, before determining the third latency according to the PCC rule, the SMF network element may detect whether the first information is received from the access network device. If receiving the first information, the SMF network element may determine the third latency according to the PCC rule, and perform a subsequent operation. Otherwise, the SMF network element may not determine the third latency according to the PCC rule, and does not perform a subsequent operation.

The SMF network element performs a subsequent related operation only when determining that the access network device can successfully reserve the bandwidth resource for the flow, thereby improving execution efficiency of the SMF network element.

Certainly, the SMF network element may receive the first information from the access network device only after sending the second latency information to the UPF network element. This is not limited in this application.

With reference to any one of the first aspect or the foregoing possible implementations, in a sixth possible implementation, the communication method further includes: sending, by the SMF network element, information about the flow to a policy control function (PCF) network element, where the information about the flow is used to determine a PCC rule of the flow; and receiving, by the SMF network element, the PCC rule from the PCF network element.

In this implementation, the SMF network element obtains, from the PCF network element, the PCC rule used by the SMF network element to determine the third latency or determine whether the UPF network element can reserve the bandwidth resource for the flow.

After obtaining the PCC rule corresponding to the flow from the PCF network element, the SMF network element may buffer the PCC rule. In this way, when the SMF network element needs to use the PCC rule corresponding to the flow next time, the PCC rule may be directly obtained from the SMF network element rather than from the PCF network element, thereby improving efficiency.

With reference to the sixth possible implementation, in a seventh possible implementation, the information about the flow includes at least one of the following: an identifier ID of the flow, a source address and a destination address of the flow, a size of a maximum frame used for transmitting the flow, an interval between frames used for transmitting the flow, a priority of the flow, a maximum allowable latency of transmitting a single frame of the flow from a talker to a listener, or a reliability requirement of the flow.

In other words, the SMF network element may send one or more pieces of the information to the PCF network element, so that the PCF network element can determine the corresponding PCC rule based on the one or more pieces of the information and return the corresponding PCC rule to the SMF network element.

According to a second aspect, this application provides a communication method. The communication method includes: receiving, by an SMF network element, first latency information of a flow from UE, where the first latency information is used to indicate a first latency; determining, by the SMF network element according to a PCC rule of the flow, a third latency of transmitting the flow from the UE to a UPF network element; determining, by the SMF network element based on the first latency and the third latency, a second latency of transmitting the flow from the UE to the UPF network element; and sending, by the SMF network element, second latency information to the UPF network element, where the second latency information is used to indicate the second latency.

In the communication method, the SMF network element receives the first latency information from the UE, and learns, based on the first latency information, of the first latency that is determined by the UE and that is of transmitting the flow from the UE to the UPF network element. In addition, the SMF network element determines, according to the PCC rule, the third latency of transmitting the flow from the UE to the UPF network element, and then, the SMF network element adjusts the first latency determined by the UE and the third latency determined by the SMF network element, to obtain the second latency of transmitting the flow from the UE to the UPF network element, so that it can be determined, based on the second latency in a communications network in which a 3GPP network interworks with the TSN, that QoS of the flow can be ensured, and the flow can be transmitted.

In addition, the SMF network element determines, based on the third latency of transmitting the flow from the UE to the UPF network element and the first latency that is determined by the UE, an accumulated latency of transmitting the flow from the UE to the UPF network element. However, in the prior art, clock synchronization needs to be performed between every two adjacent nodes between the UE and the UPF network element, and finally, clock synchronization between all nodes between the UE and the UPF network element is implemented, to support the TSN network on all transmission nodes between the UPF network element and the UE, so as to calculate the accumulated latency of transmitting the flow from the UE to the UPF network element. Compared with that in the prior art, the solution for the communication method is simple and easy to implement.

Optionally, the third latency may be a maximum transmission latency of transmitting the flow from the UE to the UPF network element.

With reference to the second aspect, in a first possible implementation, the determining, by the SMF network element based on the first latency and the third latency, a second latency of transmitting the flow from the UE to the UPF includes: determining, by the SMF network element, a value obtained by subtracting a default value of a transmission latency of transmitting the flow from the UE to the UPF network element from a sum of the first latency and the third latency as the second latency.

An example of the default value of the transmission latency of transmitting the flow from the UE to the UPF network element is 500 nanoseconds (nm). To be specific, a value obtained by subtracting 500 nm from the sum of the first latency and the third latency is determined as the second latency.

With reference to the second aspect or the first possible implementation, in a second possible implementation, the communication method further includes: determining, by the SMF network element according to the PCC rule, that a bandwidth resource can be reserved for the flow.

For example, before sending the second latency information to the UPF network element, the SMF network element may determine, according to the PCC rule corresponding to the flow, whether the bandwidth resource can be reserved for the flow. If determining, according to the PCC rule corresponding to the flow, that a core network and an access network can reserve the bandwidth resource for the flow, the SMF network element may send the second latency information to the UPF network element; otherwise, the SMF network element may not send the second latency information to the UPF network element.

For example, before determining the second latency based on the first latency and the third latency, the SMF network element may determine, according to the PCC rule corresponding to the flow, whether the bandwidth resource can be reserved for the flow. If determining, according to the PCC rule corresponding to the flow, that the core network and the access network can reserve the bandwidth resource for the flow, the SMF network element may determine the second latency based on the first latency and the third latency, and perform a subsequent operation. Otherwise, the SMF network element may not determine the second latency based on the first latency and the third latency, and may not perform a subsequent operation.

For example, before determining the third latency according to the PCC rule, the SMF network element may determine, according to the PCC rule corresponding to the flow, whether the bandwidth resource can be reserved for the flow. If determining, according to the PCC rule corresponding to the flow, that the core network and the access network can reserve the bandwidth resource for the flow, the SMF network element may determine the third latency according to the PCC rule, and perform a subsequent operation. Otherwise, the SMF network element may not determine the third latency according to the PCC rule, and may not perform a subsequent operation.

In this implementation, the SMF network element performs a subsequent related operation only when determining that the bandwidth resource can be reserved for the flow, thereby improving execution efficiency of the SMF network element.

With reference to the second possible implementation, in a third possible implementation, the communication method further includes: sending, by the SMF network element, bandwidth requirement information of the flow to the UPF network element.

In other words, when determining that the bandwidth resource can be reserved for the flow, the SMF network element may send the bandwidth requirement message of the flow to the UPF network element, so that the UPF network element reserves the bandwidth resource for the flow based on the bandwidth requirement information. In this way, when the flow is transmitted to the UPF network element, the UPF network element may have a corresponding bandwidth resource to transmit the flow, thereby improving transmission reliability of the flow.

With reference to the second or third possible implementation, in a fourth possible implementation, the communication method further includes: sending, by the SMF network element, the bandwidth requirement information of the flow to an access network device corresponding to the UE.

In other words, when determining that the bandwidth resource can be reserved for the flow, the SMF network element may send the bandwidth requirement message of the flow to the access network device serving the UE, so that the access network device reserves the bandwidth resource for the flow based on the bandwidth requirement information. In this way, the access network may have a corresponding bandwidth resource to transmit the flow, thereby improving transmission reliability of the flow.

It should be understood that, in this implementation, the access network device corresponding to the UE is a device that provides an access network service for the UE.

With reference to the fourth possible implementation, in a fifth possible implementation, the communication method further includes: receiving, by the SMF network element, first information from the access network device, where the first information is used to indicate whether the access network device successfully reserves the bandwidth resource for the flow based on the bandwidth requirement information of the flow.

For example, before sending the second latency information to the UPF network element, the SMF network element may detect whether the first information is received from the access network device. If the SMF network element receives the first information and the first information indicates that the AN device successfully reserves the resource for the flow, the SMF network element may send the second latency information to the UPF network element. Otherwise, the SMF network element may not send the second latency information to the UPF network element.

For example, before determining the second latency based on the first latency and the third latency, the SMF network element may detect whether the first information is received from the access network device. If receiving the first information, the SMF network element may determine the second latency based on the first latency and the third latency, and perform a subsequent operation. Otherwise, the SMF network element may not determine the second latency based on the first latency and the third latency, and may not perform a subsequent operation.

For example, before determining the third latency according to the PCC rule, the SMF network element may detect whether the first information is received from the access network device. If the SMF network element receives the first information, and the first information indicates that the AN device successfully reserves the resource for the flow, the SMF network element may determine the third latency according to the PCC rule, and perform a subsequent operation. Otherwise, the SMF network element may not determine the third latency according to the PCC rule, and does not perform a subsequent operation.

In this implementation, the SMF network element performs a subsequent related operation only when determining that the access network device can successfully reserve the bandwidth resource for the flow, thereby improving execution efficiency of the SMF network element.

With reference to any one of the second aspect or the foregoing possible implementations, in a sixth possible implementation, the communication method further includes: sending, by the SMF network element, information about the flow to a PCF network element, where the information about the flow is used to determine a PCC rule of the flow; and receiving, by the SMF network element, the PCC rule from the PCF network element.

In this implementation, the SMF network element obtains, from the PCF network element, the PCC rule used by the SMF network element to determine the third latency or determine whether the UPF network element can reserve the bandwidth resource for the flow.

After obtaining the PCC rule corresponding to the flow from the PCF network element, the SMF network element may buffer the PCC rule. In this way, when the SMF network element needs to use the PCC rule corresponding to the flow next time, the PCC rule may be directly obtained from the SMF network element rather than from the PCF network element, thereby improving efficiency.

With reference to the sixth possible implementation, in a seventh possible implementation, the information about the flow includes at least one of the following: an identifier ID of the flow, a source address and a destination address of the flow, a size of a maximum frame used for transmitting the flow, an interval between frames used for transmitting the flow, or a priority of the flow.

In other words, the SMF network element may send one or more pieces of the information to the PCF network element, so that the PCF network element can determine the corresponding PCC rule based on the one or more pieces of the information and return the corresponding PCC rule to the SMF network element.

According to a third aspect, this application provides a communication method. The communication method includes: receiving, by an SMF network element, information about a flow from UE; determining, by the SMF network element based on the information about the flow and a PCC rule of the flow, a third latency of transmitting the flow from the UE to a user plane function UPF network element; and sending, by the SMF network element, first latency information to the UE, where the first latency information is used to indicate the third latency.

In the communication method, the SMF network element determines, according to the PCC rule, the third latency of transmitting the flow from the UE to the UPF network element, and indicates the third latency to the UE, so that the UE can determine, based on the third latency, an accumulated latency of transmitting the flow from the UE to the UPF network element. In this way, in a communications network in which a 3GPP network interworks with the TSN, it can be determined, based on the accumulated latency, that QoS of the flow can be ensured, and the flow can be transmitted. It can be determined that QoS of the flow can be ensured, and the flow can be transmitted.

In addition, the SMF network element determines, according to the PCC rule, the third latency of transmitting the flow from the UE to the UPF network element, and indicates the third latency to the UE, so that the UE can determine, based on the third latency, the accumulated latency of transmitting the flow from the UE to the UPF network element. However, in the prior art, clock synchronization needs to be performed between every two adjacent nodes between the UE and the UPF network element, and finally, clock synchronization between all nodes between the UE and the UPF network element is implemented, to support the TSN network on all transmission nodes between the UPF network element and the UE, so as to calculate the accumulated latency of transmitting the flow from the UE to the UPF network element. Compared with that in the prior art, the solution for the communication method is simple and easy to implement.

Optionally, the third latency may be a maximum transmission latency of transmitting the flow from the UE to the UPF network element.

The information about the flow may include one or more of the following: an identifier ID of the flow, a source address and a destination address of the flow, a size of a maximum frame used for transmitting the flow, an interval between frames used for transmitting the flow, a priority of the flow, or information about a latency that is determined by the UE and that is of transmitting the flow from the UE to the UPF network element.

With reference to the third aspect, in a first possible implementation, the communication method further includes: determining, by the SMF network element according to the PCC rule, that a bandwidth resource can be reserved for the flow.

For example, before sending the latency information to the UE, the SMF network element may determine, according to the PCC rule corresponding to the flow, whether the bandwidth resource can be reserved for the flow. If determining, according to the PCC rule corresponding to the flow, that a core network and an access network can reserve the bandwidth resource for the flow, the SMF network element may send the latency information to the UE; otherwise, the SMF network element may not send the latency information to the UE.

For example, before determining the third latency according to the PCC rule, the SMF network element may determine, according to the PCC rule corresponding to the flow, whether the bandwidth resource can be reserved for the flow. If determining, according to the PCC rule corresponding to the flow, that the core network and the access network can reserve the bandwidth resource for the flow, the SMF network element may determine the third latency according to the PCC rule, and perform a subsequent operation. Otherwise, the SMF network element may not determine the third latency according to the PCC rule, and may not perform a subsequent operation.

In this implementation, the SMF network element performs a subsequent related operation only when determining that the bandwidth resource can be reserved for the flow, thereby improving execution efficiency of the SMF network element.

With reference to the first possible implementation, in a second possible implementation, the communication method further includes: sending, by the SMF network element, bandwidth requirement information of the flow to the UPF network element.

In other words, when determining that the bandwidth resource can be reserved for the flow, the SMF network element may send the bandwidth requirement message of the flow to the UPF network element, so that the UPF network element reserves the bandwidth resource for the flow based on the bandwidth requirement information. In this way, when the flow is transmitted to the UPF network element, the UPF network element may have a corresponding bandwidth resource to transmit the flow, thereby improving transmission reliability of the flow.

With reference to the first or second possible implementation, in a third possible implementation, the communication method further includes: sending, by the SMF network element, the bandwidth requirement information of the flow to an access network device corresponding to the UE.

In other words, when determining that the bandwidth resource can be reserved for the flow, the SMF network element may send the bandwidth requirement message of the flow to the access network device serving the UE, so that the access network device reserves the bandwidth resource for the flow based on the bandwidth requirement information. In this way, the access network may have a corresponding bandwidth resource to transmit the flow, thereby improving transmission reliability of the flow.

It should be understood that, in this implementation, the access network device corresponding to the UE is a device that provides an access network service for the UE.

With reference to the third possible implementation, in a fourth possible implementation, the communication method further includes: receiving, by the SMF network element, first information from the access network device, where the first information is used to indicate whether the access network device successfully reserves the bandwidth resource for the flow based on the bandwidth requirement information of the flow.

For example, before sending the latency information to the UE, the SMF network element may detect whether the first information is received from the access network device. If the SMF network element receives the first information and the first information indicates that the AN device successfully reserves the resource for the flow, the SMF network element may send the latency information to the UE. Otherwise, the SMF network element may not send the latency information to the UE.

For example, before determining the third latency according to the PCC rule, the SMF network element may detect whether the first information is received from the access network device. If receiving the first information, the SMF network element may determine the third latency according to the PCC rule, and perform a subsequent operation. Otherwise, the SMF network element may not determine the third latency according to the PCC rule, and does not perform a subsequent operation.

In this implementation, the SMF network element performs a subsequent related operation only when determining that the access network device can successfully reserve the bandwidth resource for the flow, thereby improving execution efficiency of the SMF network element.

With reference to any one of the third aspect or the foregoing possible implementations, in a fifth possible implementation, the communication method further includes: sending, by the SMF network element, information about the flow to a PCF network element, where the information about the flow is used to determine a PCC rule of the flow; and receiving, by the SMF network element, the PCC rule from the PCF network element.

In this implementation, the SMF network element obtains, from the PCF network element, the PCC rule used by the SMF network element to determine the third latency or determine whether the UPF network element can reserve the bandwidth resource for the flow.

After obtaining the PCC rule corresponding to the flow from the PCF network element, the SMF network element may buffer the PCC rule. In this way, when the SMF network element needs to use the PCC rule corresponding to the flow next time, the PCC rule may be directly obtained from the SMF network element rather than from the PCF network element, thereby improving efficiency.

With reference to the fifth possible implementation, in a sixth possible implementation, the information about the flow includes at least one of the following: an identifier ID of the flow, a source address and a destination address of the flow, a size of a maximum frame used for transmitting the flow, an interval between frames used for transmitting the flow, or a priority of the flow.

In other words, the SMF network element may send one or more pieces of the information to the PCF network element, so that the PCF network element can determine the corresponding PCC rule based on the one or more pieces of the information and return the corresponding PCC rule to the SMF network element.

According to a fourth aspect, this application provides a communication method. The communication method includes: receiving, by a UPF network element, first latency information of a flow from a TSN, where the first latency information is used to indicate a first latency of transmitting the flow from a flow service provider in the TSN to the UPF network element; sending, by the UPF network element, the first latency information to an SMF network element, where the first latency information is used to determine a second latency, and the second latency is a latency of transmitting the flow from the flow service provider in the TSN network to a terminal device UE; receiving, by the UPF network element, second latency information from the SMF network element, where the second latency information is used to indicate the second latency; and sending, by the UPF network element, the second latency information to the UE.

In the communication method, the UPF network element obtains, from the SMF network element, the second latency of transmitting the flow from the UPF network element to the UE, and sends the second latency to the UE, so that the flow can be transmitted based on the second latency in a communications network in which a 3GPP network interworks with the TSN.

In addition, in the communication method, a third latency used to determine the second latency is determined by the SMF network element according to a PCC rule corresponding to the flow. However, in the prior art, clock synchronization needs to be performed between every two adjacent nodes between the UPF network element and the UE, and finally, clock synchronization between all nodes between the UPF network element and the UE is implemented, to calculate an accumulated latency of transmitting the flow from the UPF network element to the UE. Compared with that in the prior art, the solution for the communication method is simple and easy to implement.

With reference to the fourth aspect, in a first possible implementation, the communication method includes: receiving, by the UPF network element, bandwidth requirement information of the flow from the SMF network element; and reserving, by the UPF network element, a bandwidth resource for the flow based on the bandwidth requirement information of the flow.

In the communication method, the UPF network element may reserve the bandwidth resource for the flow based on the bandwidth requirement information indicated by the SMF network element, so that when the flow is transmitted to the UPF network element, the UPF network element has a corresponding bandwidth resource to transmit the flow, thereby improving transmission reliability of the flow.

With reference to the first possible implementation of the fourth aspect, in a second possible implementation, the communication method further includes: receiving, by the UPF network element, first information from the SMF network element, where the first information is used to indicate whether an access network device corresponding to the UE successfully reserves the bandwidth resource for the flow based on the bandwidth requirement information of the flow.

If the UPF network element receives the first information from the SMF network element, and the first information indicates that the AN device successfully reserves the resource for the flow, the UPF network element may send the second latency information to the TSN, and notify the TSN network that the resource is successfully reserved.

According to a fifth aspect, this application provides a communication method. The communication method includes: sending, by UE, information about a flow to an SMF network element, where the information about the flow is used to determine a third latency of transmitting the flow from the UE to a UPF network element; receiving, by the UE, first latency information from the SMF network element, where the first latency information is used to indicate the third latency; determining, by the UE based on the third latency, a target latency of transmitting the flow from the UE to the UPF network element; and sending, by the UE, second latency information to the UPF network element, where the second latency information is used to indicate the target latency.

In the communication method, the UE obtains, from the SMF network element, the third latency of transmitting the flow from the UE to the UPF network element, and determines, based on the third latency, the target latency of transmitting the flow from the UE to the UPF network element. Compared with a method in which clock synchronization is performed between every two adjacent nodes between the UE and the UPF network element, and finally, clock synchronization of all nodes between the UE and the UPF network element is implemented, to calculate an accumulated latency of transmitting the flow from the UE to the UPF network element, the solution is simple and easy to implement.

According to a sixth aspect, this application provides a communication method. The communication method includes: receiving, by a UPF network element, first latency information of a flow from a TSN, where the first latency information is used to indicate a first latency of transmitting the flow from a flow service provider in the TSN to the UPF network element; sending, by the UPF network element, information about the flow to an SMF network element, where the information about the flow is used to determine a third latency of transmitting the flow from the UPF network element to UE; receiving, by the UPF network element, third latency information from the SMF network element, where the third latency information is used to indicate the third latency; determining, by the UPF network element based on the first latency and the third latency, a second latency of transmitting the flow from the flow service provider in the TSN network to the UE; and sending, by the UPF network element, second latency information to the UE, where the second latency information is used to indicate the second latency.

In the communication method, the UPF network element uses, as an accumulated latency of transmitting the flow from the UPF network element to the UE, the third latency that is determined by the SMF network element and that is of transmitting the flow from the UPF network element to the UE. Compared with a method in which clock synchronization is performed between every two adjacent nodes between the UPF network element and the UE, and finally, clock synchronization of all nodes between the UPF network element and the UE is implemented, to calculate the accumulated latency of transmitting the flow from the UPF network element to the UE, the solution is simple and easy to implement.

Optionally, the third latency may be a maximum transmission latency of transmitting the flow from the UPF network element to the UE.

With reference to the sixth aspect, in a first possible implementation, the determining, by the UPF network element based on the first latency and the third latency, a second latency of transmitting the flow from the flow service provider in the TSN network to the UE includes: determining, by the UPF network element, a sum of the first latency and the third latency as the second latency.

With reference to the sixth aspect or the first possible implementation, in a second possible implementation, the communication method includes: receiving, by the UPF network element, bandwidth requirement information of the flow from the SMF network element; and reserving, by the UPF network element, a bandwidth resource for the flow based on the bandwidth requirement information of the flow.

In the communication method, the UPF network element may reserve the bandwidth resource for the flow based on the bandwidth requirement information indicated by the SMF network element, so that when the flow is transmitted to the UPF network element, the UPF network element has a corresponding bandwidth resource to transmit the flow, thereby improving transmission reliability of the flow.

With reference to the first or the second possible implementation of the sixth aspect, in a third possible implementation, the communication method further includes: receiving, by the UPF network element, first information from the SMF network element, where the first information is used to indicate whether an access network device corresponding to the UE successfully reserves the bandwidth resource for the flow based on the bandwidth requirement information of the flow.

If the UPF network element receives the first information from the SMF network element, and the first information indicates that the AN device successfully reserves the resource for the flow, the UPF network element may send the second latency information to the TSN, and notify the TSN network that the resource is successfully reserved.

With reference to any one of the sixth aspect or the foregoing possible implementations, in a fourth possible implementation, the information about the flow includes at least one of the following: an identifier ID of the flow, a source address and a destination address of the flow, a size of a maximum frame used for transmitting the flow, an interval between frames used for transmitting the flow, a priority of the flow, a maximum allowable latency of transmitting a single frame of the flow from a talker to a listener, or a reliability requirement of the flow.

According to a seventh aspect, this application provides a communications apparatus. The communications apparatus includes a receiving module, a processing module, and a sending module, where the receiving module is configured to receive first latency information of a flow from a UPF network element, where the first latency information is used to indicate a first latency of transmitting the flow from a flow service provider in a TSN to the UPF network element; the processing module is configured to determine, according to a PCC rule of the flow, a third latency of transmitting the flow from the UPF network element to UE, and the processing module is configured to determine, based on the first latency and the third latency, a second latency of transmitting the flow from the flow service provider in the TSN to the UE; and the sending module is configured to send second latency information to the UPF network element, where the second latency information is used to indicate the second latency.

The communications apparatus determines, according to the PCC rule, the third latency of transmitting the flow from the UPF network element to the UE and uses the third latency as an accumulated latency of transmitting the flow from the UPF network element to the UE, so that the communications apparatus can determine, based on the third latency and the first latency of transmitting the flow from the flow provider in the TSN to the UPF network element, the second latency of transmitting the flow from the flow service provider in the TSN to the UE. In this way, in a communications network in which a 3GPP network interworks with the TSN, it can be determined, based on the second latency, that QoS of the flow can be ensured, and the flow can be transmitted.

In addition, the communications apparatus determines, according to the PCC rule, the third latency of transmitting the flow from the UPF network element to the UE, and uses the third latency as the accumulated latency of transmitting the flow from the UPF network element to the UE. However, in the prior art, clock synchronization needs to be performed between every two adjacent nodes between the UPF network element and the UE, and finally, clock synchronization between all nodes between the UPF network element and the UE is implemented, to support the TSN network on all transmission nodes between the UPF network element and the UE, so as to calculate the accumulated latency of transmitting the flow from the UPF network element to the UE. Compared with that in the prior art, the solution for the communications apparatus is simple and easy to implement.

The third latency may be a maximum transmission latency of transmitting the flow from the UPF network element to the UE.

With reference to the seventh aspect, in a first possible implementation, the processing module is specifically configured to determine a sum of the first latency and the third latency as the second latency.

With reference to the seventh aspect or the first possible implementation, in a second possible implementation, the processing module is configured to determine, according to the PCC rule, that a bandwidth resource can be reserved for the flow.

For example, before sending the second latency information to the UPF network element, the communications apparatus may determine, according to the PCC rule corresponding to the flow, that a core network and an access network reserve the bandwidth resource for the flow. If determining, according to the PCC rule corresponding to the flow, that the bandwidth resource can be reserved for the flow, the communications apparatus may send the second latency information to the UPF network element; otherwise, the communications apparatus may not send the second latency information to the UPF network element.

For example, before determining the second latency based on the first latency and the third latency, the communications apparatus may determine, according to the PCC rule corresponding to the flow, whether the bandwidth resource can be reserved for the flow. If determining, according to the PCC rule corresponding to the flow, that the core network and the access network can reserve the bandwidth resource for the flow, the communications apparatus may determine the second latency based on the first latency and the third latency, and perform a subsequent operation. Otherwise, the communications apparatus may not determine the second latency based on the first latency and the third latency, and may not perform a subsequent operation.

For example, before determining the third latency according to the PCC rule, the communications apparatus may determine, according to the PCC rule corresponding to the flow, whether the bandwidth resource can be reserved for the flow. If determining, according to the PCC rule corresponding to the flow, that the core network and the access network can reserve the bandwidth resource for the flow, the communications apparatus may determine the third latency according to the PCC rule, and perform a subsequent operation. Otherwise, the communications apparatus may not determine the third latency according to the PCC rule, and may not perform a subsequent operation.

The communications apparatus performs a subsequent related operation only when determining that the bandwidth resource can be reserved for the flow, thereby improving execution efficiency of the communications apparatus.

Certainly, alternatively, the communications apparatus may determine, only after sending the second latency information to the UPF network element, whether the bandwidth resource can be reserved for the flow. This is not limited in this application.

With reference to the seventh aspect or the first or the second possible implementation, in a third possible implementation, the sending module is configured to send bandwidth requirement information of the flow to the UPF network element.

The communications apparatus sends the bandwidth requirement message of the flow to the UPF network element, so that the UPF network element reserves the bandwidth resource for the flow based on the bandwidth requirement information. In this way, when the flow is transmitted to the UPF network element, the UPF network element may have a corresponding bandwidth resource to transmit the flow, thereby improving transmission reliability of the flow.

Optionally, the communications apparatus may send the bandwidth requirement message of the flow to the UPF network element only when determining that the bandwidth resource can be reserved for the flow.

With reference to any one of the seventh aspect or the foregoing possible implementations, in a fourth possible implementation, the sending module is configured to send the bandwidth requirement information of the flow to an access network device corresponding to the UE.

The access network device reserves the bandwidth resource for the flow based on the bandwidth requirement information, so that the access network may have a corresponding bandwidth resource to transmit the flow, thereby improving transmission reliability of the flow.

It should be understood that, in this implementation, the access network device corresponding to the UE is a device that provides an access network service for the UE.

Optionally, the communications apparatus may send the bandwidth requirement message of the flow to the access network device serving the UE only when determining that the bandwidth resource can be reserved for the flow.

With reference to the fourth possible implementation, in a fifth possible implementation, the receiving module is configured to receive first information from the access network device, where the first information is used to indicate whether the access network device successfully reserves the bandwidth resource for the flow based on the bandwidth requirement information of the flow.

For example, before sending the second latency information to the UPF network element, the communications apparatus may detect whether the first information is received from the access network device. If the communications apparatus receives the first information and the first information indicates that the AN device successfully reserves the resource for the flow, the communications apparatus may send the second latency information to the UPF network element. Otherwise, the communications apparatus may not send the second latency information to the UPF network element.

For example, before determining the second latency based on the first latency and the third latency, the communications apparatus may detect whether the first information is received from the access network device. If receiving the first information, the communications apparatus may determine the second latency based on the first latency and the third latency, and perform a subsequent operation. Otherwise, the communications apparatus may not determine the second latency based on the first latency and the third latency, and may not perform a subsequent operation.

For example, before determining the third latency according to the PCC rule, the communications apparatus may detect whether the first information is received from the access network device. If receiving the first information, the communications apparatus may determine the third latency according to the PCC rule, and perform a subsequent operation. Otherwise, the communications apparatus may not determine the third latency according to the PCC rule, and does not perform a subsequent operation.

The communications apparatus performs a subsequent related operation only when determining that the access network device can successfully reserve the bandwidth resource for the flow, thereby improving execution efficiency of the communications apparatus.

Certainly, the communications apparatus may receive the first information from the access network device only after sending the second latency information to the UPF network element. This is not limited in this application.

With reference to any one of the seventh aspect or the foregoing possible implementations, in a sixth possible implementation, the sending module is configured to send information about the flow to a PCF network element, where the information about the flow is used to determine a PCC rule of the flow; and the receiving module is configured to receive the PCC rule from the PCF network element.

In this implementation, the communications apparatus obtains, from the PCF network element, the PCC rule used by the communications apparatus to determine the third latency or determine whether the UPF network element can reserve the bandwidth resource for the flow.

After obtaining the PCC rule corresponding to the flow from the PCF network element, the communications apparatus may buffer the PCC rule. In this way, when the communications apparatus needs to use the PCC rule corresponding to the flow next time, the PCC rule may be directly obtained from the communications apparatus rather than from the PCF network element, thereby improving efficiency.

With reference to the sixth possible implementation, in a seventh possible implementation, the information about the flow includes at least one of the following: an identifier ID of the flow, a source address and a destination address of the flow, a size of a maximum frame used for transmitting the flow, an interval between frames used for transmitting the flow, a priority of the flow, a maximum allowable latency of transmitting a single frame of the flow from a talker to a listener, or a reliability requirement of the flow.

In other words, the communications apparatus may send one or more pieces of the information to the PCF network element, so that the PCF network element can determine the corresponding PCC rule based on the one or more pieces of the information and return the corresponding PCC rule to the SMF network element.

The modules included in the communications apparatus in the seventh aspect may be implemented in a software and/or hardware manner.

For example, the receiving module may be a receiver, the sending module may be a transmitter, and the processing module may be a processor. The receiver and the transmitter may be integrated together and referred to as a transceiver. In this case, the communications apparatus may be an SMF network element.

For another example, the processing module may be a processor, and the receiving module and the sending module may be communications interfaces. In this case, the communications apparatus may be a chip, for example, may be a chip that can be integrated into the SMF network element.

Optionally, the communications apparatus may further include a memory, configured to store program code executed by the processor.

According to an eighth aspect, this application provides a communications apparatus. The communications apparatus includes a receiving module, a processing module, and a sending module, where the receiving module is configured to receive first latency information of a flow from UE, where the first latency information is used to indicate a first latency; the processing module is configured to determine, according to a PCC rule of the flow, a third latency of transmitting the flow from the UE to a UPF network element; the processing module is configured to determine, based on the first latency and the third latency, a second latency of transmitting the flow from the UE to the UPF network element; and the sending module is configured to send second latency information to the UPF network element, where the second latency information is used to indicate the second latency.

The communications apparatus receives the first latency information from the UE, and learns, based on the first latency information, of the first latency that is determined by the UE and that is of transmitting the flow from the UE to the UPF network element. In addition, the communications apparatus determines, according to the PCC rule, the third latency of transmitting the flow from the UE to the UPF network element, and then, adjusts the first latency determined by the UE and the third latency determined by the communications apparatus, to obtain the second latency of transmitting the flow from the UE to the UPF network element, so that it can be determined, based on the second latency in a communications network in which a 3GPP network interworks with the TSN, that QoS of the flow can be ensured, and the flow can be transmitted.

In addition, the communications apparatus determines, based on the third latency of transmitting the flow from the UE to the UPF network element and the first latency that is determined by the UE, an accumulated latency of transmitting the flow from the UE to the UPF network element. However, in the prior art, clock synchronization needs to be performed between every two adjacent nodes between the UE and the UPF network element, and finally, clock synchronization between all nodes between the UE and the UPF network element is implemented, to support the TSN network on all transmission nodes between the UPF network element and the UE, so as to calculate the accumulated latency of transmitting the flow from the UE to the UPF network element. Compared with that in the prior art, the solution for the communications apparatus is simple and easy to implement.

Optionally, the third latency may be a maximum transmission latency of transmitting the flow from the UE to the UPF network element.

With reference to the eighth aspect, in a first possible implementation, the processing module is specifically configured to determine a value obtained by subtracting a default value of a transmission latency of transmitting the flow from the UE to the UPF network element from a sum of the first latency and the third latency as the second latency.

An example of the default value of the transmission latency of transmitting the flow from the UE to the UPF network element is 500 nanoseconds (nm). To be specific, a value obtained by subtracting 500 nm from the sum of the first latency and the third latency is determined as the second latency.

With reference to the eighth aspect or the first possible implementation, in a second possible implementation, the processing module is configured to determine, according to the PCC rule, that a bandwidth resource can be reserved for the flow.

For example, before sending the second latency information to the UPF network element, the communications apparatus may determine, according to the PCC rule corresponding to the flow, whether the bandwidth resource can be reserved for the flow. If determining, according to the PCC rule corresponding to the flow, that a core network and an access network can reserve the bandwidth resource for the flow, the communications apparatus may send the second latency information to the UPF network element; otherwise, the communications apparatus may not send the second latency information to the UPF network element.

For example, before determining the second latency based on the first latency and the third latency, the communications apparatus may determine, according to the PCC rule corresponding to the flow, whether the bandwidth resource can be reserved for the flow. If determining, according to the PCC rule corresponding to the flow, that the core network and the access network can reserve the bandwidth resource for the flow, the communications apparatus may determine the second latency based on the first latency and the third latency, and perform a subsequent operation. Otherwise, the communications apparatus may not determine the second latency based on the first latency and the third latency, and may not perform a subsequent operation.

For example, before determining the third latency according to the PCC rule, the communications apparatus may determine, according to the PCC rule corresponding to the flow, whether the bandwidth resource can be reserved for the flow. If determining, according to the PCC rule corresponding to the flow, that the core network and the access network can reserve the bandwidth resource for the flow, the communications apparatus may determine the third latency according to the PCC rule, and perform a subsequent operation. Otherwise, the communications apparatus may not determine the third latency according to the PCC rule, and may not perform a subsequent operation.

In this implementation, the communications apparatus performs a subsequent related operation only when determining that the bandwidth resource can be reserved for the flow, thereby improving execution efficiency of the communications apparatus.

With reference to the second possible implementation, in a third possible implementation, the sending module is configured to send bandwidth requirement information of the flow to the UPF network element.

In other words, when determining that the bandwidth resource can be reserved for the flow, the communications apparatus may send the bandwidth requirement message of the flow to the UPF network element, so that the UPF network element reserves the bandwidth resource for the flow based on the bandwidth requirement information. In this way, when the flow is transmitted to the UPF network element, the UPF network element may have a corresponding bandwidth resource to transmit the flow, thereby improving transmission reliability of the flow.

With reference to the second or the third possible implementation, in a fourth possible implementation, the sending module is configured to send the bandwidth requirement information of the flow to an access network device corresponding to the UE.

In other words, when determining that the bandwidth resource can be reserved for the flow, the communications apparatus may send the bandwidth requirement message of the flow to the access network device serving the UE, so that the access network device reserves the bandwidth resource for the flow based on the bandwidth requirement information. In this way, the access network may have a corresponding bandwidth resource to transmit the flow, thereby improving transmission reliability of the flow.

It should be understood that, in this implementation, the access network device corresponding to the UE is a device that provides an access network service for the UE.

With reference to the fourth possible implementation, in a fifth possible implementation, the receiving module is configured to receive first information from the access network device, where the first information is used to indicate whether the access network device successfully reserves the bandwidth resource for the flow based on the bandwidth requirement information of the flow.

For example, before sending the second latency information to the UPF network element, the communications apparatus may detect whether the first information is received from the access network device. If the communications apparatus receives the first information and the first information indicates that the AN device successfully reserves the resource for the flow, the communications apparatus may send the second latency information to the UPF network element. Otherwise, the communications apparatus may not send the second latency information to the UPF network element.

For example, before determining the second latency based on the first latency and the third latency, the communications apparatus may detect whether the first information is received from the access network device. If receiving the first information, the communications apparatus may determine the second latency based on the first latency and the third latency, and perform a subsequent operation. Otherwise, the communications apparatus may not determine the second latency based on the first latency and the third latency, and may not perform a subsequent operation.

For example, before determining the third latency according to the PCC rule, the communications apparatus may detect whether the first information is received from the access network device. If receiving the first information, the communications apparatus may determine the third latency according to the PCC rule, and perform a subsequent operation. Otherwise, the communications apparatus may not determine the third latency according to the PCC rule, and does not perform a subsequent operation.

In this implementation, the communications apparatus performs a subsequent related operation only when determining that the access network device can successfully reserve the bandwidth resource for the flow, thereby improving execution efficiency of the SMF network element.

With reference to any one of the eighth aspect or the foregoing possible implementations, in a sixth possible implementation, the sending module is configured to send information about the flow to a PCF network element, where the information about the flow is used to determine a PCC rule of the flow; and the SMF network element receives the PCC rule from the PCF network element.

In this implementation, the communications apparatus obtains, from the PCF network element, the PCC rule used by the communications apparatus to determine the third latency or determine whether the UPF network element can reserve the bandwidth resource for the flow.

After obtaining the PCC rule corresponding to the flow from the PCF network element, the communications apparatus may buffer the PCC rule. In this way, when the communications apparatus needs to use the PCC rule corresponding to the flow next time, the PCC rule may be directly obtained from the communications apparatus rather than from the PCF network element, thereby improving efficiency.

With reference to the sixth possible implementation, in a seventh possible implementation, the information about the flow includes at least one of the following: an identifier ID of the flow, a source address and a destination address of the flow, a size of a maximum frame used for transmitting the flow, an interval between frames used for transmitting the flow, or a priority of the flow.

In other words, the communications apparatus may send one or more pieces of the information to the PCF network element, so that the PCF network element can determine the corresponding PCC rule based on the one or more pieces of the information and return the corresponding PCC rule to the communications apparatus.

The modules included in the communications apparatus in the eighth aspect may be implemented in a software and/or hardware manner.

For example, the receiving module may be a receiver, the sending module may be a transmitter, and the processing module may be a processor. The receiver and the transmitter may be integrated together and referred to as a transceiver. In this case, the communications apparatus may be an SMF network element.

For another example, the processing module may be a processor, and the receiving module and the sending module may be communications interfaces. In this case, the communications apparatus may be a chip, for example, may be a chip that can be integrated into the SMF network element.

Optionally, the communications apparatus may further include a memory, configured to store program code executed by the processor.

According to a ninth aspect, this application provides a communications apparatus. The communications apparatus includes a receiving module, a processing module, and a sending module, where the receiving module is configured to receive information about a flow from UE; the processing module is configured to: determine, based on the information about the flow and a PCC rule of the flow, a third latency of transmitting the flow from the UE to a user plane function UPF network element; and the sending module is configured to send first latency information to the UE, where the first latency information is used to indicate the third latency.

The communications apparatus determines, according to the PCC rule, the third latency of transmitting the flow from the UE to the UPF network element, and indicates the third latency to the UE, so that the UE can determine, based on the third latency, an accumulated latency of transmitting the flow from the UE to the UPF network element. In this way, in a communications network in which a 3GPP network interworks with the TSN, it can be determined, based on the accumulated latency, that QoS of the flow can be ensured, and the flow can be transmitted. It can be determined that QoS of the flow can be ensured, and the flow can be transmitted.

In addition, the communications apparatus determines, according to the PCC rule, the third latency of transmitting the flow from the UE to the UPF network element, and indicates the third latency to the UE, so that the UE can determine, based on the third latency, the accumulated latency of transmitting the flow from the UE to the UPF network element. However, in the prior art, clock synchronization needs to be performed between every two adjacent nodes between the UE and the UPF network element, and finally, clock synchronization between all nodes between the UE and the UPF network element is implemented, to support the TSN network on all transmission nodes between the UPF network element and the UE, so as to calculate the accumulated latency of transmitting the flow from the UE to the UPF network element. Compared with that in the prior art, the solution for the communications apparatus is simple and easy to implement.

Optionally, the third latency may be a maximum transmission latency of transmitting the flow from the UE to the UPF network element.

The information about the flow may include one or more of the following: an identifier ID of the flow, a source address and a destination address of the flow, a size of a maximum frame used for transmitting the flow, an interval between frames used for transmitting the flow, a priority of the flow, or information about a latency that is determined by the UE and that is of transmitting the flow from the UE to the UPF network element.

With reference to the ninth aspect, in a first possible implementation, the processing module is configured to determine, according to the PCC rule, that a bandwidth resource can be reserved for the flow.

For example, before sending the latency information to the UE, the communications apparatus may determine, according to the PCC rule corresponding to the flow, whether the bandwidth resource can be reserved for the flow. If determining, according to the PCC rule corresponding to the flow, that a core network and an access network can reserve the bandwidth resource for the flow, the communications apparatus may send the latency information to the UE; otherwise, the communications apparatus may not send the latency information to the UE.

For example, before determining the third latency according to the PCC rule, the communications apparatus may determine, according to the PCC rule corresponding to the flow, whether the bandwidth resource can be reserved for the flow. If determining, according to the PCC rule corresponding to the flow, that the core network and the access network can reserve the bandwidth resource for the flow, the communications apparatus may determine the third latency according to the PCC rule, and perform a subsequent operation. Otherwise, the communications apparatus may not determine the third latency according to the PCC rule, and may not perform a subsequent operation.

In this implementation, the communications apparatus performs a subsequent related operation only when determining that the bandwidth resource can be reserved for the flow, thereby improving execution efficiency of the communications apparatus.

With reference to the first possible implementation, in a second possible implementation, the sending module is configured to send bandwidth requirement information of the flow to the UPF network element.

In other words, when determining that the bandwidth resource can be reserved for the flow, the communications apparatus may send the bandwidth requirement message of the flow to the UPF network element, so that the UPF network element reserves the bandwidth resource for the flow based on the bandwidth requirement information. In this way, when the flow is transmitted to the UPF network element, the UPF network element may have a corresponding bandwidth resource to transmit the flow, thereby improving transmission reliability of the flow.

With reference to the first or the second possible implementation, in a third possible implementation, the sending module is configured to send the bandwidth requirement information of the flow to an access network device corresponding to the UE.

In other words, when determining that the bandwidth resource can be reserved for the flow, the communications apparatus may send the bandwidth requirement message of the flow to the access network device serving the UE, so that the access network device reserves the bandwidth resource for the flow based on the bandwidth requirement information. In this way, the access network may have a corresponding bandwidth resource to transmit the flow, thereby improving transmission reliability of the flow.

It should be understood that, in this implementation, the access network device corresponding to the UE is a device that provides an access network service for the UE.

With reference to the third possible implementation, in a fourth possible implementation, the receiving module is configured to receive first information from the access network device, where the first information is used to indicate whether the access network device successfully reserves the bandwidth resource for the flow based on the bandwidth requirement information of the flow.

For example, before sending the latency information to the UE, the communications apparatus may detect whether the first information is received from the access network device. If the communications apparatus receives the first information and the first information indicates that the AN device successfully reserves the resource for the flow, the communications apparatus may send the latency information to the UE. Otherwise, the communications apparatus may not send the latency information to the UE.

For example, before determining the third latency according to the PCC rule, the communications apparatus may detect whether the first information is received from the access network device. If receiving the first information, the communications apparatus may determine the third latency according to the PCC rule, and perform a subsequent operation. Otherwise, the communications apparatus may not determine the third latency according to the PCC rule, and does not perform a subsequent operation.

In this implementation, the communications apparatus performs a subsequent related operation only when determining that the access network device can successfully reserve the bandwidth resource for the flow, thereby improving execution efficiency of the communications apparatus.

With reference to any one of the ninth aspect or the foregoing possible implementations, in a fifth possible implementation, the sending module is configured to send information about the flow to a PCF network element, where the information about the flow is used to determine a PCC rule of the flow; and the receiving module is configured to receive the PCC rule from the PCF network element.

In this implementation, the communications apparatus obtains, from the PCF network element, the PCC rule used by the communications apparatus to determine the third latency or determine whether the UPF network element can reserve the bandwidth resource for the flow.

After obtaining the PCC rule corresponding to the flow from the PCF network element, the communications apparatus may buffer the PCC rule. In this way, when the communications apparatus needs to use the PCC rule corresponding to the flow next time, the PCC rule may be directly obtained from the communications apparatus rather than from the PCF network element, thereby improving efficiency.

With reference to the fifth possible implementation, in a sixth possible implementation, the information about the flow includes at least one of the following: an identifier ID of the flow, a source address and a destination address of the flow, a size of a maximum frame used for transmitting the flow, an interval between frames used for transmitting the flow, or a priority of the flow.

In other words, the communications apparatus may send one or more pieces of the information to the PCF network element, so that the PCF network element can determine the corresponding PCC rule based on the one or more pieces of the information and return the corresponding PCC rule to the communications apparatus.

The modules included in the communications apparatus in the ninth aspect may be implemented in a software and/or hardware manner.

For example, the receiving module may be a receiver, the sending module may be a transmitter, and the processing module may be a processor. The receiver and the transmitter may be integrated together and referred to as a transceiver. In this case, the communications apparatus may be an SMF network element.

For another example, the processing module may be a processor, and the receiving module and the sending module may be communications interfaces. In this case, the communications apparatus may be a chip, for example, may be a chip that can be integrated into the SMF network element.

Optionally, the communications apparatus may further include a memory, configured to store program code executed by the processor.

According to a tenth aspect, this application provides a communications apparatus. The communications apparatus includes a receiving module and a sending module, where the receiving module is configured to receive first latency information of a flow from a TSN, where the first latency information is used to indicate a first latency of transmitting the flow from a flow service provider in the TSN to the UPF network element; the sending module is configured to send the first latency information to an SMF network element, where the first latency information is used to determine a second latency, and the second latency is a latency of transmitting the flow from the flow service provider in the TSN network to a terminal device UE; the receiving module is configured to receive second latency information from the SMF network element, where the second latency information is used to indicate the second latency; and the sending module is configured to send the second latency information to the UE.

The communications apparatus obtains, from the SMF network element, the second latency of transmitting the flow from the UPF network element to the UE, and sends the second latency to the UE, so that the flow can be transmitted based on the second latency in a communications network in which a 3GPP network interworks with the TSN.

In addition, in the communications apparatus, a third latency used to determine the second latency is determined by the SMF network element according to a PCC rule corresponding to the flow. However, in the prior art, clock synchronization needs to be performed between every two adjacent nodes between the UPF network element and the UE, and finally, clock synchronization between all nodes between the UPF network element and the UE is implemented, to calculate an accumulated latency of transmitting the flow from the UPF network element to the UE. Compared with that in the prior art, the solution for the communications apparatus is simple and easy to implement.

The third latency may be a maximum transmission latency of transmitting the flow from the UPF network element to the UE.

With reference to the tenth aspect, in a first possible implementation, the receiving module is configured to receive bandwidth requirement information of the flow from the SMF network element; and the communications apparatus further includes a processing module, where the processing module is configured to reserve a bandwidth resource for the flow based on the bandwidth requirement information of the flow.

The communications apparatus may reserve the bandwidth resource for the flow based on the bandwidth requirement information indicated by the SMF network element, so that when the flow is transmitted to the UPF network element, the communications apparatus has a corresponding bandwidth resource to transmit the flow, thereby improving transmission reliability of the flow.

With reference to the tenth aspect or the first possible implementation, in a second possible implementation, the receiving module is configured to receive first information from the SMF network element, where the first information is used to indicate whether an access network device corresponding to the UE successfully reserves the bandwidth resource for the flow based on the bandwidth requirement information of the flow.

If the communications apparatus receives the first information from the SMF network element, and the first information indicates that the AN device successfully reserves the resource for the flow, the communications apparatus may send the second latency information to the TSN, and notify the TSN network that the resource is successfully reserved.

The modules included in the communications apparatus in the tenth aspect may be implemented in a software and/or hardware manner.

For example, the receiving module may be a receiver, the sending module may be a transmitter, and the processing module may be a processor. The receiver and the transmitter may be integrated together and referred to as a transceiver. In this case, the communications apparatus may be a UPF network element.

For another example, the processing module may be a processor, and the receiving module and the sending module may be communications interfaces. In this case, the communications apparatus may be a chip, for example, may be a chip that can be integrated into the UPF network element.

Optionally, the communications apparatus may further include a memory, configured to store program code executed by the processor.

According to an eleventh aspect, this application provides a communications apparatus. The communications apparatus includes a sending module, a receiving module, and a processing module, where the sending module is configured to send information about a flow to an SMF network element, where the information about the flow is used to determine a third latency of transmitting the flow from the UE to a UPF network element; the receiving module is configured to receive first latency information from the SMF network element, where the first latency information is used to indicate the third latency; the processing module is configured to determine, based on the third latency, a target latency of transmitting the flow from the UE to the UPF network element; and the sending module is configured to send second latency information to the UPF network element, where the second latency information is used to indicate the target latency.

The communications apparatus obtains, from the SMF network element, the third latency of transmitting the flow from the UE to the UPF network element, and determines, based on the third latency, the target latency of transmitting the flow from the UE to the UPF network element. Compared with a method in which clock synchronization is performed between every two adjacent nodes between the UE and the UPF network element, and finally, clock synchronization of all nodes between the UE and the UPF network element is implemented, to calculate an accumulated latency of transmitting the flow from the UE to the UPF network element, the solution is simple and easy to implement.

The third latency may be a maximum transmission latency of transmitting the flow from the UE to the UPF network element.

The modules included in the communications apparatus in the eleventh aspect may be implemented in a software and/or hardware manner.

For example, the receiving module may be a receiver, the sending module may be a transmitter, and the processing module may be a processor. The receiver and the transmitter may be integrated together and referred to as a transceiver. In this case, the communications apparatus may be UE.

For another example, the processing module may be a processor, and the receiving module and the sending module may be communications interfaces. In this case, the communications apparatus may be a chip, for example, may be a chip that can be integrated into the UE.

Optionally, the communications apparatus may further include a memory, configured to store program code executed by the processor.

According to a twelfth aspect, this application provides a communications apparatus. The communications apparatus includes a receiving module, a sending module, and a processing module, where the receiving module is configured to receive first latency information of a flow from a TSN, where the first latency information is used to indicate a first latency of transmitting the flow from a flow service provider in the TSN to the UPF network element; the sending module is configured to send information about the flow to an SMF network element, where the information about the flow is used to determine a third latency of transmitting the flow from the UPF network element to UE; the processing module is configured to receive third latency information from the SMF network element, where the third latency information is used to indicate the third latency; the processing module is configured to determine, based on the first latency and the third latency, a second latency of transmitting the flow from the flow service provider in the TSN network to the UE; and the sending module is configured to send second latency information to the UE, where the second latency information is used to indicate the second latency.

The communications apparatus uses, as an accumulated latency of transmitting the flow from the UPF network element to the UE, the third latency that is determined by the SMF network element and that is of transmitting the flow from the UPF network element to the UE. Compared with a method in which clock synchronization is performed between every two adjacent nodes between the UPF network element and the UE, and finally, clock synchronization of all nodes between the UPF network element and the UE is implemented, to calculate the accumulated latency of transmitting the flow from the UPF network element to the UE, the solution is simple and easy to implement.

The third latency may be a maximum transmission latency of transmitting the flow from the UPF network element to the UE.

With reference to the twelfth aspect, in a first possible implementation, the processing module is specifically configured to determine a sum of the first latency and the third latency as the second latency.

With reference to the twelfth aspect or the first possible implementation, in a second possible implementation, the receiving module is configured to receive bandwidth requirement information of the flow from the SMF network element; and the processing module is configured to reserve a bandwidth resource for the flow based on the bandwidth requirement information of the flow.

The communications apparatus may reserve the bandwidth resource for the flow based on the bandwidth requirement information indicated by the SMF network element, so that when the flow is transmitted to the communications apparatus, the communications apparatus has a corresponding bandwidth resource to transmit the flow, thereby improving transmission reliability of the flow.

With reference to the twelfth aspect or the first or the second possible implementation, in a third possible implementation, the receiving module is configured to receive first information from the SMF network element, where the first information is used to indicate whether an access network device corresponding to the UE successfully reserves the bandwidth resource for the flow based on the bandwidth requirement information of the flow.

If the communications apparatus receives the first information from the SMF network element, and the first information indicates that the AN device successfully reserves the resource for the flow, the communications apparatus may send the second latency information to the TSN, and notify the TSN network that the resource is successfully reserved.

With reference to any one of the twelfth aspect or the foregoing possible implementations, in a fourth possible implementation, the information about the flow includes at least one of the following: an identifier ID of the flow, a source address and a destination address of the flow, a size of a maximum frame used for transmitting the flow, an interval between frames used for transmitting the flow, a priority of the flow, a maximum allowable latency of transmitting a single frame of the flow from a talker to a listener, or a reliability requirement of the flow.

The modules included in the communications apparatus in the twelfth aspect may be implemented in a software and/or hardware manner.

For example, the receiving module may be a receiver, the sending module may be a transmitter, and the processing module may be a processor. The receiver and the transmitter may be integrated together and referred to as a transceiver. In this case, the communications apparatus may be a UPF network element.

For another example, the processing module may be a processor, and the receiving module and the sending module may be communications interfaces. In this case, the communications apparatus may be a chip, for example, may be a chip that can be integrated into the UPF network element.

Optionally, the communications apparatus may further include a memory, configured to store program code executed by the processor.

According to a thirteenth aspect, this application provides a computer-readable storage medium. The computer-readable storage medium stores program code to be executed by the communications apparatus. The program code includes an instruction used to perform the communication method in any one of the first aspect to the sixth aspect or the possible implementations of the first aspect to the sixth aspect.

According to a fourteenth aspect, this application provides a computer program product that includes an instruction. When the computer program product runs on a communications apparatus, the communications apparatus is enabled to perform the communication method in any one of the first aspect to the sixth aspect or the possible implementations of the first aspect to the sixth aspect.

According to a fifteenth aspect, this application provides a communication method. The communication method includes: receiving, by an SMF network element, first latency information of a flow from a first communications device, where the first latency information is used to indicate a first latency of transmitting the flow from a flow service provider in a TSN to the first communications device; determining, by the SMF network element according to a PCC rule of the flow, a first target latency of transmitting the flow from the first communications device to a second communications device; determining, by the SMF network element based on the first latency, the first target latency, and a second target latency, a third latency of transmitting the flow from the flow service provider to a target network element that is in the TSN and that is used as a next hop of the second communications device, and the second target latency is a latency of transmitting the flow from the second communications device to the target network element; and sending, by the SMF network element, third latency information to the first communications device, where the third latency information is used to indicate the third latency, where the first communications device is a UPF network element, and the second communications device is UE, or the first communications device is the UE, and the second communications device is the UPF network element.

In the communication method, an accumulated latency of transmitting the flow from the flow service provider to the target network element that is in the TSN network and that is used as the next hop of the second communications device may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In a possible implementation, the determining, by the SMF network element, a third latency based on the first latency, the first target latency, and a second target latency includes: using, by the SMF network element, a sum of the first latency, the first target latency, and the second target latency as the third latency.

In a possible implementation, the first target latency is a maximum transmission latency of the flow between the UPF network element and the UE.

In a possible implementation, the communication method further includes: determining, by the SMF network element according to the PCC rule, that a bandwidth resource can be reserved for the flow.

In a possible implementation, the communication method further includes: sending, by the SMF network element, bandwidth requirement information of the flow to the UPF network element.

In a possible implementation, the communication method further includes: sending, by the SMF network element, the bandwidth requirement information of the flow to an access network device corresponding to the UE.

In a possible implementation, the communication method further includes: receiving, by the SMF network element, first information from the access network device, where the first information is used to indicate whether the access network device successfully reserves the bandwidth resource for the flow based on the bandwidth requirement information of the flow.

In a possible implementation, the communication method further includes: sending, by the SMF network element, information about the flow to a PCF network element, where the information about the flow is used to determine a PCC rule of the flow; and receiving, by the SMF network element, the PCC rule from the PCF network element.

For the communication method in the fifteenth aspect, refer to the steps performed by the SMF network element in the communication method described in FIG. 24 or FIG. 30.

According to a sixteenth aspect, this application provides a communication method. The communication method includes: receiving, by an SMF network element, first latency information of a flow from a UPF network element or UE, where the first latency information is used to indicate a first latency of transmitting the flow from a flow service provider in a TSN to a first communications device; determining, by the SMF network element according to a PCC rule of the flow, a first target latency of transmitting the flow between the UPF network element and the UE; determining, by the SMF network element based on the first latency and the first target latency, a second latency of transmitting the flow from the flow service provider in the TSN to a second communications device; and sending, by the SMF network element, second latency information to the UPF network element or the UE, where the second latency information is used to indicate the second latency, where the first communications device is the UPF network element, and the second communications device is the UE, or the first communications device is the UE, and the second communications device is the UPF network element.

In the communication method, an accumulated latency of transmitting the flow from the flow service provider to the second communications device that is in 3GPP and that is used as an output port may be obtained, so that the second communications device can calculate, based on the accumulated latency, a total latency of transmitting the flow from the flow service provider to the target network element that is in the TSN and that is used as a next hop of the second communications device, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In a possible implementation, the determining, by the SMF network element, a second latency based on the first latency and the first target latency includes: using a sum of the first latency and the first target latency as the second latency.

In a possible implementation, the first target latency is a maximum transmission latency of the flow between the UPF network element and the UE.

In a possible implementation, the communication method further includes: determining, by the SMF network element according to the PCC rule, that a bandwidth resource can be reserved for the flow.

In a possible implementation, the communication method further includes: sending, by the SMF network element, bandwidth requirement information of the flow to the UPF network element.

In a possible implementation, the communication method further includes: sending, by the SMF network element, the bandwidth requirement information of the flow to an access network device corresponding to the UE.

In a possible implementation, the communication method further includes: receiving, by the SMF network element, first information from the access network device, where the first information is used to indicate whether the access network device successfully reserves the bandwidth resource for the flow based on the bandwidth requirement information of the flow.

In a possible implementation, the communication method further includes: sending, by the SMF network element, information about the flow to a PCF network element, where the information about the flow is used to determine a PCC rule of the flow; and receiving, by the SMF network element, the PCC rule from the PCF network element.

For the communication method in the sixteenth aspect, refer to the steps performed by the SMF network element in the communication method described in FIG. 20, FIG. 22, FIG. 26, FIG. 28, FIG. 32, or FIG. 33.

According to a seventeenth aspect, this application provides a communication method. The communication method includes: receiving, by a UPF network element, first latency information of a flow from a TSN, where the first latency information is used to indicate a first latency of transmitting the flow from a flow service provider in the TSN to the UPF network element; sending, by the UPF network element, information about the flow to an SMF network element, where the information about the flow is used to determine a quality of service parameter corresponding to the flow; receiving, by the UPF network element, the quality of service parameter from the SMF network element; determining, by the UPF network element based on the quality of service parameter, a first target latency of transmitting the flow from the UPF network element to the UE; determining, by the UPF network element, a second latency based on the first latency and the first target latency, where the second latency is a latency of transmitting the flow from the flow service provider to the UE; and sending, by the UPF network element, second latency information to the UE, where the second latency information is used to indicate the second latency.

In the communication method, an accumulated latency of transmitting the flow from the flow service provider to the UE that is in 3GPP and that is used as an output port may be obtained, so that the UPF network element can calculate, based on the accumulated latency, a total latency of transmitting the flow from the flow service provider to the target network element that is in the TSN and that is used as a next hop of the UPF network element, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In a possible implementation, the determining, by the UPF network element, a second latency based on the first latency and the first target latency includes: using a sum of the first latency and the first target latency as the second latency.

In a possible implementation, the first target latency is a maximum transmission latency of the flow between the UPF network element and the UE.

In a possible implementation, the communication method includes: receiving, by the UPF network element, bandwidth requirement information of the flow from the SMF network element; and reserving, by the UPF network element, a bandwidth resource for the flow based on the bandwidth requirement information of the flow.

In a possible implementation, the communication method further includes: receiving, by the UPF network element, first information from the SMF network element, where the first information is used to indicate whether an access network device corresponding to the UE successfully reserves the bandwidth resource for the flow based on the bandwidth requirement information of the flow.

For the communication method in the seventeenth aspect, refer to the steps performed by the UPF network element in the communication method described in FIG. 23.

According to an eighteenth aspect, this application provides a communication method. The communication method includes: receiving, by a UPF network element, first latency information of a flow from a TSN or UE, where the first latency information is used to indicate a first latency of transmitting the flow from a flow service provider in the TSN to a first communications device; sending, by the UPF network element, information about the flow to an SMF network element, where the information about the flow is used to determine a quality of service parameter corresponding to the flow; receiving, by the UPF network element, the quality of service parameter corresponding to the flow from the SMF network element; determining, by the UPF network element, a first target latency based on the quality of service parameter corresponding to the flow, where the first target latency is a latency of transmitting the flow between the terminal device UE and the UPF network element; determining, by the UPF network element, a third latency based on the first latency, the first target latency, and a second target latency, where the second target latency is a latency of transmitting the flow from a second communications device to a target network element that is in the TSN network and that is used as a next hop of the second communications device, and the third latency is a latency of transmitting the flow from the flow service provider to the target network element; and sending, by the UPF network element, third latency information, where the third latency information is used to indicate the third latency, where the first communications device is the UPF network element, and the second communications device is the UE, or the first communications device is the UE, and the second communications device is the UPF network element.

In the communication method, an accumulated latency of transmitting the flow from the flow service provider to the target network element that is in the TSN network and that is used as the next hop of the second communications device may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In a possible implementation, the determining, by the UPF network element, a third latency based on the first latency, the first target latency, and a second target latency includes: using a sum of the first latency, the first target latency, and the second target latency as the third latency.

In a possible implementation, the first target latency is a maximum transmission latency of the flow between the UPF network element and the UE.

In a possible implementation, the communication method includes: receiving, by the UPF network element, bandwidth requirement information of the flow from the SMF network element; and reserving, by the UPF network element, a bandwidth resource for the flow based on the bandwidth requirement information of the flow.

In a possible implementation, the communication method further includes: receiving, by the UPF network element, first information from the SMF network element, where the first information is used to indicate whether an access network device corresponding to the UE successfully reserves the bandwidth resource for the flow based on the bandwidth requirement information of the flow.

For the communication method in the eighteenth aspect, refer to the steps performed by the UPF network element in the communication method described in FIG. 25 or FIG. 27.

According to a nineteenth aspect, this application provides a communication method. The communication method includes: receiving, by a UPF network element, second latency information of a flow from UE or an SMF network element, where the second latency information is used to indicate a second latency of transmitting the flow from a flow service provider in a time sensitive network TSN to the UPF network element; determining, by the UPF network element, a third latency based on the second latency and a second target latency, where the second target latency is a latency of transmitting the flow from the UPF network element to a target network element that is in the TSN network and that is used as a next hop of the UPF network element, and the third latency is a latency of transmitting the flow from the flow service provider to the target network element; and sending, by the UPF network element, third latency information to the target network element, where the third latency information is used to indicate the third latency.

In the communication method, an accumulated latency of transmitting the flow from the flow service provider to the target network element that is in the TSN network and that is used as the next hop of the UPF network element may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In a possible implementation, the determining, by the UPF network element, a third latency based on the second latency and a second target latency includes: using a sum of the second latency and the second target latency as the third latency.

In a possible implementation, the communication method includes: receiving, by the UPF network element, bandwidth requirement information of the flow from the SMF network element; and reserving, by the UPF network element, a bandwidth resource for the flow based on the bandwidth requirement information of the flow.

In a possible implementation, the communication method further includes: receiving, by the UPF network element, first information from the SMF network element, where the first information is used to indicate whether an access network device corresponding to the UE successfully reserves the bandwidth resource for the flow based on the bandwidth requirement information of the flow.

For the communication method in the nineteenth aspect, refer to the steps performed by the UPF network element in the communication method described in FIG. 26, FIG. 28. FIG. 29, or FIG. 33.

According to a twentieth aspect, this application provides a communication method. The communication method includes: receiving, by UE, second latency information of a flow from an SMF network element or a UPF network element, where the second latency information is used to indicate a second latency of transmitting the flow from a flow service provider in a TSN to the UE; determining, by the UE, a third latency based on the second latency and a second target latency, where the second target latency is a latency of transmitting the flow from the UE to a target network element that is in the TSN network and that is used as a next hop of the UE, and the third latency is a latency of transmitting the flow from the flow service provider to the target network element; and sending, by the UE, third latency information to the target network element, where the third latency information is used to indicate the third latency.

In the communication method, an accumulated latency of transmitting the flow from the flow service provider to the target network element that is in the TSN network and that is used as the next hop of the UE may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In a possible implementation, the determining, by the UE, a third latency based on the second latency and a second target latency includes: using a sum of the second latency and the second target latency as the third latency.

For the communication method in the twentieth aspect, refer to the steps performed by the UE in the communication method described in FIG. 20, FIG. 22, FIG. 23, or FIG. 32.

According to a twenty-first aspect, this application provides a communication method. The communication method includes: receiving, by UE, first latency information of a flow, where the first latency information is used to indicate a first latency of transmitting the flow from a flow service provider in a time sensitive network TSN to a first communications device; sending, by the UE, information about the flow to a session management function SMF network element, where the information about the flow is used to determine a quality of service parameter corresponding to the flow; receiving, by the UE, the quality of service parameter corresponding to the flow from the SMF network element; determining, by the UE, a first target latency based on the quality of service parameter corresponding to the flow, where the first target latency is a latency of transmitting the flow between the UE and a user plane function UPF network element; determining, by the UE, a third latency based on the first latency, the first target latency, and a second target latency, where the second target latency is a latency of transmitting the flow from a second communications device to a target network element that is in the TSN network and that is used as a next hop of the second communications device, and the third latency is a latency of transmitting the flow from the flow service provider to the target network element; and sending, by the UE, third latency information, where the third latency information is used to indicate the third latency, where the first communications device is the UPF network element, and the second communications device is the UE, or the first communications device is the UE, and the second communications device is the UPF network element.

In the communication method, an accumulated latency of transmitting the flow from the flow service provider to the target network element that is in the TSN network and that is used as the next hop of the second communications device may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In a possible implementation, the determining, by the UE, a third latency based on the first latency, the first target latency, and a second target latency includes: using a sum of the first latency, the first target latency, and the second target latency as the third latency.

In a possible implementation, the first target latency is a maximum transmission latency of the flow between the UPF network element and the UE.

For the communication method in the twenty-first aspect, refer to the steps performed by the UE in the communication method described in FIG. 21 or FIG. 31.

According to a twenty-second aspect, this application provides a communication method. The communication method includes: receiving, by UE, first latency information of a flow, where the first latency information is used to indicate a first latency of transmitting the flow from a flow service provider in a TSN to the UE; sending, by the UE, information about the flow to an SMF network element, where the information about the flow is used to determine a quality of service parameter corresponding to the flow; receiving, by the UE, the quality of service parameter corresponding to the flow from the SMF network element; determining, by the UE, a first target latency based on the quality of service parameter corresponding to the flow, where the first target latency is a latency of transmitting the flow between the UE and a user plane function UPF network element; determining, by the UE, a second latency based on the first latency and the first target latency, where the second latency is a latency of transmitting the flow from the flow service provider to the UPF network element; and sending, by the UE, second latency information to the UPF network element, where the second latency information is used to indicate the second latency.

In the communication method, an accumulated latency of transmitting the flow from the flow service provider to the UPF network element that is in 3GPP and that is used as an output port may be obtained, so that the UPF network element can calculate, based on the accumulated latency, a total latency of transmitting the flow from the flow service provider to the target network element that is in the TSN and that is used as a next hop of the UPF network element, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In a possible implementation, the determining, by the UE, a second latency based on the first latency and the first target latency includes: determining a sum of the first latency and the first target latency as the second latency.

In a possible implementation, the first target latency is a maximum transmission latency of the flow between the UPF network element and the UE.

For the communication method in the twenty-second aspect, refer to the steps performed by the UE in the communication method described in FIG. 29.

According to a twenty-third aspect, this application provides a communications apparatus. The communications apparatus includes modules configured to implement the communication method in any one of the fifteenth aspect to the twenty-second aspect.

The modules included in the communications apparatus in the twenty-third aspect may be implemented in a software and/or hardware manner.

For example, the receiving module may be a receiver, the sending module may be a transmitter, and the processing module may be a processor. The receiver and the transmitter may be integrated together and referred to as a transceiver. In this case, the communications apparatus may be an SMF network element, a UPF network element, or a terminal device.

For another example, the processing module may be a processor, and the receiving module and the sending module may be communications interfaces. In this case, the communications apparatus may be a chip, for example, may be a chip that can be integrated into the SMF network element, the UPF network element, or the UE.

Optionally, the communications apparatus may further include a memory, configured to store program code executed by the processor.

According to a twenty-fourth aspect, this application provides a computer-readable storage medium. The computer-readable storage medium stores program code to be executed by the communications apparatus. The program code includes an instruction used to perform the communication method in any one of the fifteenth aspect to the twenty-second aspect or the possible implementations of the fifteenth aspect to the twenty-second aspect.

According to a twenty-fifth aspect, this application provides a computer program product that includes an instruction. When the computer program product runs on a communications apparatus, the communications apparatus is enabled to perform the communication method in any one of the fifteenth aspect to the twenty-second aspect or the possible implementations of the fifteenth aspect to the twenty-second aspect.

DETAILED DESCRIPTION OF ILLUSTRATIVE EMBODIMENTS

The following describes technical solutions of this application with reference to the accompanying drawings.

Figure 1:
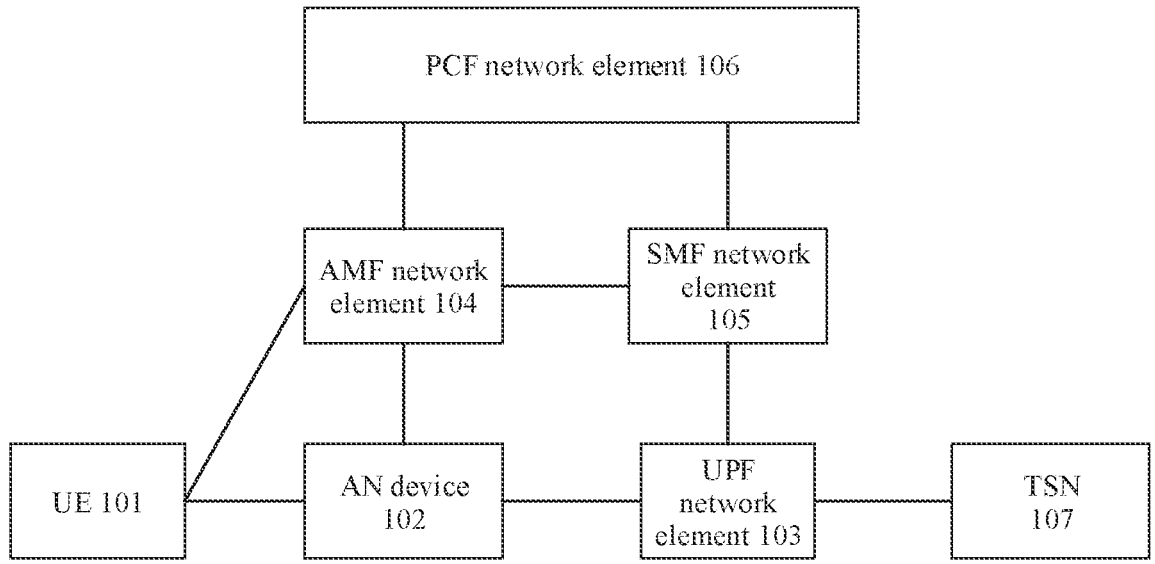
FIG. 1 is a schematic diagram of an application scenario to which a communication method according to an embodiment of this application may be applied.

As shown in FIG. 1, an application scenario to which a communication method according to an embodiment of this application may be applied may include UE 101, an access network (AN) device 102, a UPF network element 103, an access and mobility management function (AMF) network element 104, an SMF network element 105, a PCF network element 106, and a TSN 107.

The communications system shown in FIG. 1 may be a 5th generation (5G) communications network.

The UE may also be referred to as a terminal device. The terminal device may communicate with one or more core networks (CN) through the AN device. The terminal device may also be referred to as an access terminal, a terminal, a subscriber unit, a subscriber station, a mobile station, a mobile console, a remote station, a remote terminal, a mobile device, a user terminal, a wireless network device, a user agent, or a user apparatus. The terminal may be a cellular phone, a cordless phone, a session initiation protocol (SIP) phone, a wireless local loop (WLL) station, a personal digital assistant (PDA), a handheld device having a wireless communication function, a computing device, another device connected to a wireless modem, a vehicle-mounted device, a wearable device, or a terminal device in the Internet of Things and a vehicle network, any form of terminal device in a future network, and the like.

The AN device may be a radio access network (RAN) device. An example of the RAN device is a base station (BS).

The base station may also be referred to as a base station device, is a device that connects a terminal to a wireless network, and includes but is not limited to: a transmission reception point (TRP), a 5G NodeB (gNB), an evolved NodeB (eNB), a radio network controller (RNC), a NodeB (NB), a base station controller (BSC), a base transceiver station (BTS), a home base station (for example, a home evolved nodeB, or a home node B, HNB), a baseband unit (BBU), a Wi-Fi access point (AP), a small cell device (pico), and the like.

It should be understood that a specific type of the base station is not limited in this specification. In systems using different radio access technologies, names of devices having functions of the base station may be different. For ease of description, in all the embodiments of this application, all the foregoing apparatuses that provide a wireless communication function for the terminal are collectively referred to as the base station.

The UPF network element has functions such as packet forwarding, encapsulation, and statistics collection of the terminal device.

The AMF network element is responsible for access and mobility management of the terminal device, for example, responsible for UE location update, UE registration with a network, or UE handover.

The SMF network element is responsible for selection and reselection of the UPF network element, assignment of an internet protocol (IP) address, and the like, and may be further responsible for establishment, modification, release, and the like of a session.

The PCF network element is configured to implement functions such as managing a unified policy framework of network behavior, providing, for a control plane, a policy rule that needs to be executed, and obtaining subscription information related to a policy decision.

The TSN has constraint characteristics such as controlled latency, jitter, bandwidth, and reliability. In any case, the TSN can meet requirements of bounded end-to-end latency, jitter, and high reliability.

It should be understood that the embodiments of this application are not limited to the system architecture shown in FIG. 1. For example, a communications system to which the communication method in this embodiment of this application may be applied may include more or fewer network elements or devices. The devices or the network elements in FIG. 1 may be hardware, or may be software obtained through functional division, or a combination thereof. The devices or the network elements in FIG. 1 may communicate with each other through another device or network element.

In the communications system shown in FIG. 1, the UE may serve as a flow service recipient to receive a flow sent by a flow service provider in the TSN. Alternatively, the UE may serve as a flow service provider to send a flow to a flow service recipient in the TSN.

As a boundary between the TSN and a 3GPP network, the UPF network element may have a basic function of a bridge in the TSN. For example, the UPF network element may process a stream reservation protocol (SRP) message from the TSN.

For example, the UE may receive a URLLC flow sent by the flow service provider in the TSN, or the UE may send a URLLC flow to the flow service recipient in the TSN.

The flow in this embodiment of this application may be a quality of service (QoS) flow. The QoS flow may be a QoS flow with a deterministic transmission requirement.

Figure 2:
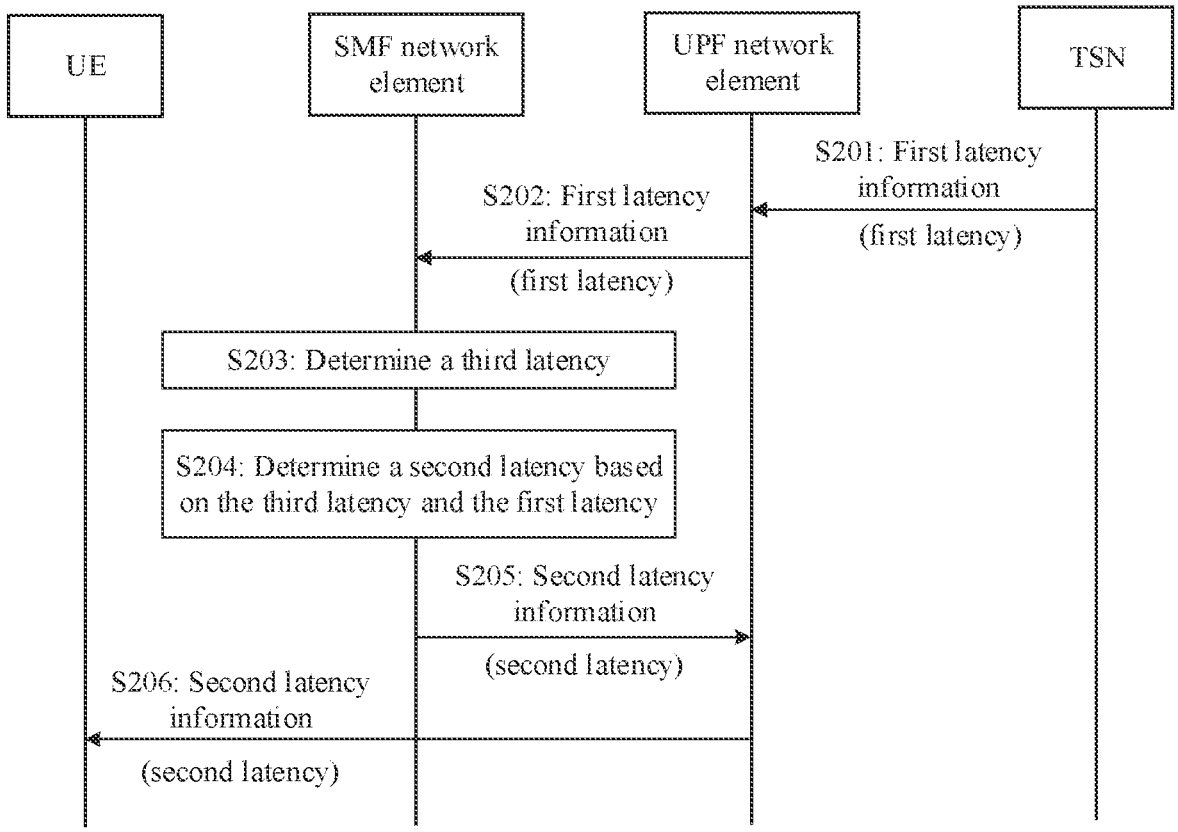
FIG. 2 is a schematic flowchart of a communication method according to an embodiment of this application.

A schematic flowchart of a communication method according to an embodiment of this application is shown in FIG. 2. It should be understood that FIG. 2 shows steps or operations of the communication method, but these steps or operations are merely examples. In this embodiment of this application, other operations or variations of the operations in FIG. 2 may be further performed.

S201: A UPF network element receives first latency information of a flow from a TSN, where the first latency information is used to indicate a first latency of transmitting the flow from a flow service provider in the TSN to the UPF network element. Alternatively, in other words, the first latency is an accumulated latency (AccumulatedLatency) of transmitting the flow from the flow service provider in the TSN to the UPF network element.

The flow service provider refers to a host or a server that provides the flow, and is a source of the flow.

The UPF network element may be the UPF network element 103 in FIG. 1, and the TSN may be the TSN 107 in FIG. 1.

The first latency information may be carried in a flow service provider broadcast declaration (Talk Advertise Declaration) message. The flow service provider broadcast declaration message may be used to broadcast a QoS requirement corresponding to the flow.

The flow service provider broadcast declaration message may further carry a flow identifier (stream identity, Stream ID) in addition to the first latency information. In addition, the flow service provider broadcast declaration message may further carry one or more of the following information: a destination address (destination_address), a source address (source_address), a maximum frame size (MaxFrameSize), a maximum frame interval (MaxIntervalFrames), a priority of a frame (PriorityAndRank), a maximum allowable latency of transmitting a single frame of the flow from a talker to a listener, a reliability requirement of the flow, or a resource reservation failure cause (FailureInformation).

S202: The UPF network element sends the first latency information to an SMF network element. Correspondingly, the SMF network element receives the first latency information from the UPF network element.

The SMF network element may be the SMF network element 105 in FIG. 1.

The UPF network element may forward, to the SMF network element, the flow service provider broadcast declaration message that is received by the UPF network element from the TSN. The flow service provider broadcast declaration message carries the first latency information.

Certainly, the UPF network element may alternatively obtain the first latency information from the flow service provider broadcast declaration message, and then include the first latency information in another message and send the another message to the SMF network element. A manner in which the UPF network element sends the first latency information to the SMF network element is not limited in this embodiment of this application.

S203: The SMF network element determines, according to a PCC rule of the flow, a third latency of transmitting the flow from the UPF network element to UE.

The UE may be the UE 101 in FIG. 1. The third latency may be a maximum transmission latency of transmitting the flow from the UPF network element to the UE.

The PCC rule is a rule related to policy and charging.

For example, the SMF network element determines, according to the PCC rule, a 5G QoS identifier (5QI) corresponding to the flow, and further determines a packet delay budget (PDB) that is between the UPF and the UE and that corresponds to the 5QI. The PDB is used as a maximum transmission latency of transmitting the flow from the UPF to the UE.

Alternatively, after receiving information about the flow from the UE, the SMF network element obtains the PCC rule of the flow based on the information about the flow, determines, according to the PCC rule of the flow, the 5QI corresponding to the flow, and sends the 5QI to the UPF. The UPF determines, based on the 5QI, the PDB that is between the UPF and the UE and that corresponds to the 5QI. The PDB is used as a maximum transmission latency of transmitting the flow from the UPF network element to the UE.

S204: The SMF network element determines, based on the first latency of transmitting the flow from the flow service provider in the TSN to the UPF network element and the third latency of transmitting the flow from the UPF network element to the UE, a second latency of transmitting the flow from the flow service provider in the TSN to the UE.

The SMF network element first obtains, from the first latency information, the first latency indicated by the first latency information, and then determines the second latency based on the first latency and the third latency.

A possible implementation in which the SMF network element determines the second latency based on the first latency and the third latency may include: determining, by the SMF network element, a sum of the first latency and the third latency as the second latency.

Certainly, the SMF network element may alternatively determine the second latency based on the first latency and the third latency in another manner. For example, after adding the first latency and the third latency, the SMF network element may correct (for example, add a specified or default value, for example, add a latency of processing, by the UPF, the flow to) a sum that is obtained by adding the first latency and the third latency, to obtain the second latency. A manner of determining the second latency based on the first latency and the third latency is not limited in this embodiment of this application.

S205: The SMF network element sends second latency information to the UPF network element, where the second latency information is used to indicate the second latency.

For example, after determining the second latency, the SMF network element may modify, to the second latency information, the first latency information that is in the flow service provider broadcast declaration message and that is received by the SMF network element from the UPF network element, to modify the first latency recorded in the flow service provider broadcast declaration message to the second latency. Then, the SMF network element may send, to the UPF network element, a flow service provider broadcast declaration message obtained after modification.

In other words, the SMF network element may send the second latency information to the UPF network element through the flow service provider broadcast declaration message. In this way, the UPF network element may send the second latency information to the UE by forwarding the flow service provider broadcast declaration message to the UE.

Alternatively, the SMF network element may send, to the UPF network element, a flow service recipient ready (Listen Ready) message carrying the second latency information, that is, send the second latency information to the UPF network element through the flow service recipient message. In this way, the UPF network element may send the second latency information by sending the flow service recipient message to the TSN.

S206: The UPF network element sends the second latency information to the UE. After receiving the second latency information from the UPF network element, the UE may determine whether the second latency exceeds a requirement of a maximum transmission latency of transmitting the flow from the flow service provider in the TSN to a flow service recipient.

When sending the second latency information to the UE, the UPF network element may further send identification information of the flow.

For example, the UPF network element may forward, to the UE, the flow service provider broadcast declaration message that is received by the UPF network element from the SMF network element in S205, where the message carries the second latency information and the identification information of the flow.

It should be understood that the UPF network element may determine, according to an indication of the SMF network element, whether to send the flow service provider broadcast declaration message to the SMF network element or the UE.

It should be understood that S206 is not a step that needs to be performed. In other words, the UPF network element may not send the second latency information to the UE.

For example, if the first latency exceeds the requirement of the maximum transmission latency of transmitting the flow from the flow service provider in the TSN to the flow service recipient, the UPF network element may not send the second latency information to the UE.

In the communication method in this embodiment of this application, the SMF network element determines, according to the PCC rule, the maximum transmission latency of transmitting the flow from the UPF network element to the UE, and uses the maximum transmission latency as an accumulated latency of transmitting the flow from the UPF network element to the UE, so that the SMF network element can determine, based on the maximum transmission latency and the first latency of transmitting the flow from the flow provider in the TSN to the UPF network element, the second latency of transmitting the flow from the flow service provider in the TSN to the UE. In this way, in a communications network in which a 3GPP network interworks with the TSN, it can be determined, based on the second latency, that QoS of the flow can be ensured, and the flow can be transmitted.

In addition, according to the solution in this application, the SMF network element determines, according to the PCC rule, the maximum transmission latency of transmitting the flow from the UPF network element to the UE, and uses the maximum transmission latency as the accumulated latency of transmitting the flow from the UPF network element to the UE. However, in the prior art, clock synchronization needs to be performed between every two adjacent nodes between the UPF network element and the UE, to finally implement clock synchronization between all nodes between the UPF network element and the UE, to support the TSN network on all transmission nodes between the UPF network element and the UE, so as to calculate the accumulated latency of transmitting the flow from the UPF network element to the UE. Compared with the method in the prior art, the solution in this application is simple and easy to implement.

Figure 3:
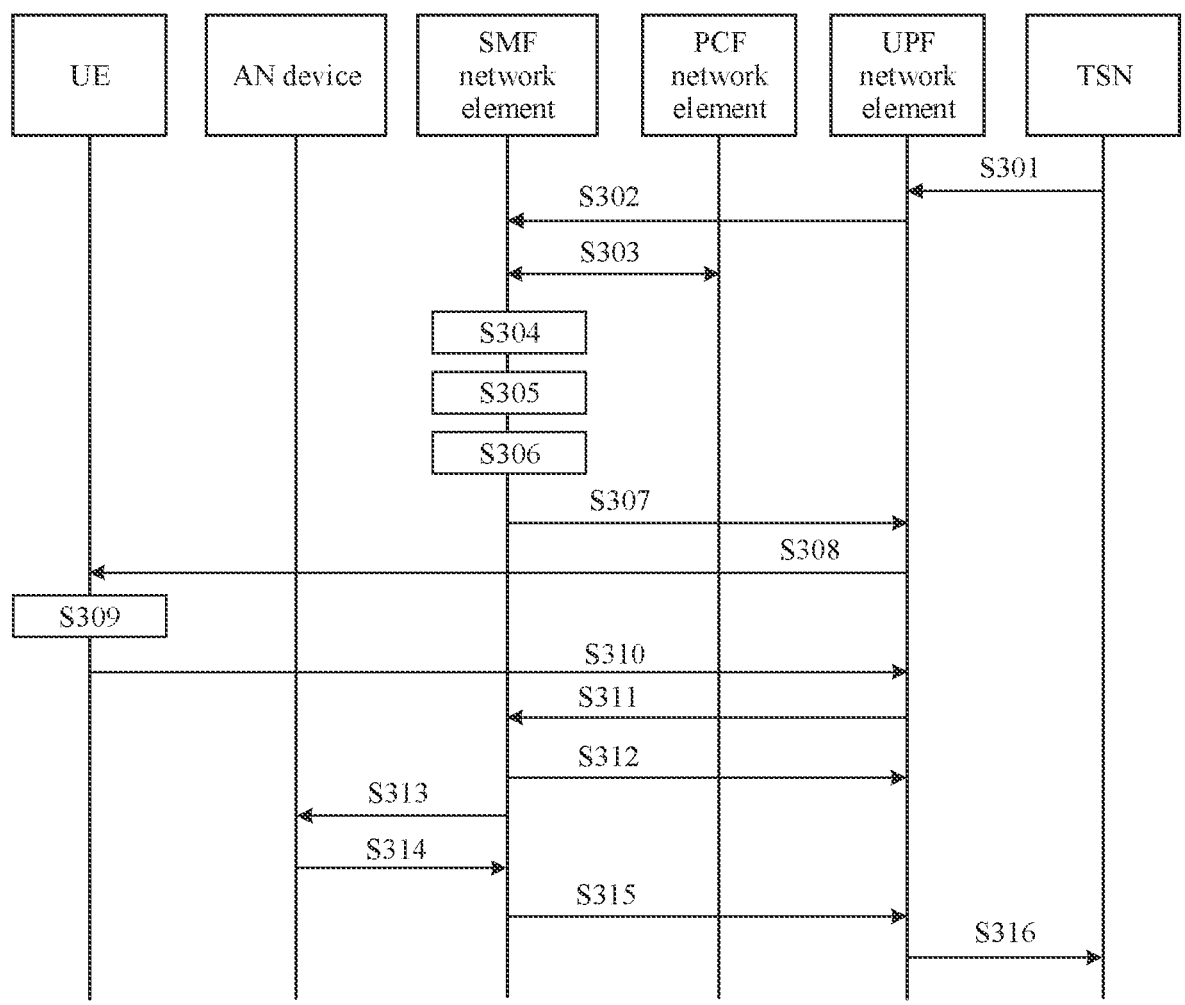
FIG. 3 is a schematic flowchart of a communication method according to another embodiment of this application.

A schematic flowchart of a communication method according to another embodiment of this application is shown in FIG. 3. It should be understood that FIG. 3 shows steps or operations of the communication method, but these steps or operations are merely examples. In this embodiment of this application, other operations or variations of the operations in FIG. 3 may be further performed. In addition, the steps in FIG. 3 may be performed in a sequence different from that presented in FIG. 3, and possibly, not all operations in FIG. 3 need to be performed.

S301: A UPF network element receives first latency information from a TSN, where the first latency information is used to indicate a first latency of transmitting a flow from a flow service provider in the TSN to the UPF network element.

For this step, refer to S201. Details are not described herein again.

S302: The UPF network element sends the first latency information to an SMF network element. Correspondingly, the SMF network element receives the first latency information from the UPF network element.

For this step, refer to S202. Details are not described herein again.

S303: The SMF network element obtains, from a policy control function (policy control function, PCF) network element, a PCC rule corresponding to the flow.

For example, the SMF network element sends information about the flow to the PCF network element, and the PCF network element receives the information about the flow from the SMF network element. The PCF network element determines, based on the information about the flow, the PCC rule corresponding to the flow, and the PCC rule may include a 5QI corresponding to the flow. The SMF network element receives, from the PCF network element, the PCC rule corresponding to the flow.

For example, that the PCC network element determines, based on the information about the flow, the PCC rule corresponding to the flow includes: determining, by the PCC network element based on the information that is about the flow and that is sent by the SMF network element, at least one of a bandwidth requirement, a latency requirement, or a reliability requirement of the flow, and generates the PCC rule of the flow for the UE based on subscription information of the UE.

The information that is about the flow and that is sent by the SMF network element to the PCF network element may include at least one or more of the following: an identifier ID of the flow, a source address and a destination address of the flow, a size of a maximum frame used for transmitting the flow, an interval between frames used for transmitting the flow, a priority of the flow, a maximum allowable latency of transmitting a single frame of the flow from a talker to a listener, or a reliability requirement of the flow.

In other words, the SMF network element may send one or more pieces of the information to the PCF network element, so that the PCF network element can determine the corresponding PCC rule based on the one or more pieces of the information and return the corresponding PCC rule to the SMF network element.

Optionally, S303 may not be performed in the communication method in this embodiment of this application.

For example, the PCC rule may be locally configured on the SMF network element, and the SMF network element matches the corresponding PCC rule based on the information about the flow. For another example, after obtaining the PCC rule corresponding to the flow from the PCF network element, the SMF network element may buffer the PCC rule. In this way, when the SMF network element needs to use the PCC rule corresponding to the flow next time, the SMF network element may directly obtain the PCC rule from the SMF network element instead of performing S303, thereby improving efficiency.

S304: The SMF network element determines, according to the PCC rule of the flow, a third latency of transmitting the flow from the UPF network element to UE. For this step, refer to S203. Details are not described herein again.

S305: The SMF network element determines, based on the third latency determined in S304 and the first latency indicated by the first latency information, a second latency of transmitting the flow from the flow service provider in the TSN to the UE.

For this step, refer to S204. Details are not described herein again.

S306: The SMF network element determines, according to the PCC rule corresponding to the flow, whether a bandwidth resource can be reserved for the flow. If determining, according to the PCC rule corresponding to the flow, that the bandwidth resource can be reserved for the flow, the SMF network element may perform S307; otherwise, may perform the communication method in FIG. 7.

That the SMF network element determines, according to the PCC rule corresponding to the flow, whether a bandwidth resource can be reserved for the flow may be understood as follows: The SMF network element determines, according to the PCC rule corresponding to the flow, whether a core network and a radio access network can meet a bandwidth requirement and a latency requirement of the flow.

That the SMF network element determines, according to the PCC rule corresponding to the flow, whether the core network and the radio access network can reserve the bandwidth resource for the flow may include: determining, by the SMF network element according to the PCC rule corresponding to the flow, the bandwidth requirement of the flow and determining whether the core network and the radio access network can meet the bandwidth requirement and the latency requirement of the flow.

That the SMF network element determines, according to the PCC rule corresponding to the flow, whether the core network and the radio access network can meet the bandwidth requirement and the latency requirement of the flow may include: determining, by the SMF network element according to the PCC rule corresponding to the flow, whether the UPF network element can meet the bandwidth requirement and/or the latency requirement of the flow.

Optionally, in the method in this embodiment of this application, S306 may not be performed. To be specific, after determining the second latency in S305, the SMF network element may directly perform S307.

S307: The SMF network element sends second latency information to the UPF network element, where the second latency information is used to indicate the second latency. The SMF network element may also send identification information of the flow to the UPF network element.

For example, the SMF network element may modify, to the second latency information, the first latency information that is in a flow service provider broadcast declaration message and that is received by the SMF network element from the UPF network element in S302, to modify the first latency recorded in the flow service provider broadcast declaration message to the second latency. Then, the SMF network element may send, to the UPF network element, a flow service provider broadcast declaration message obtained after modification.

S308: The UPF network element sends the second latency information to the UE. Correspondingly, the UE receives the second latency information from the UPF network element. The SMF network element may also send the identification information of the flow to the UPF network element.

For example, the UPF network element may forward, to the UE, the flow service provider broadcast declaration message that is received from the SMF network element in S307.

Optionally, S308 may not be performed in the communication method in this embodiment of this application. Correspondingly, S309 to S311 may not be performed.

S309: The UE determines, based on the second latency information received in S308, whether the second latency can meet a latency requirement of the flow.

For example, the latency requirement of the flow may be a maximum allowable latency of transmitting a single frame of the flow from the flow service provider to a flow service recipient, and the latency requirement of the flow may be carried in the flow service provider broadcast declaration message as the information about the flow.

If it is determined that the second latency can meet the latency requirement of the flow, S310 may be performed. Otherwise, the UE may initiate a flow service recipient inquiry failure declaration (Listener Asking Failed declaration) message to the UPF network element, and then the UPF network element forwards the flow service recipient inquiry failure declaration message to the flow service provider in the TSN.

Optionally, the UE may further determine whether the UE is interested in the flow. If it is determined that the UE is interested in the flow, and that the second latency can meet the latency requirement of the flow, S310 may be performed. Otherwise, the UE may initiate a flow service recipient inquiry failure declaration message to the UPF network element, and then the UPF network element forwards the flow service recipient inquiry failure declaration message to the flow service provider in the TSN.

Whether the UE is interested means whether the UE is willing to receive the flow. For example, the UE may prompt a user whether the flow needs to be received, and determine, based on an input of the user, whether the flow needs to be received. If the user selects that the flow needs to be received, it is determined that the UE is interested; otherwise, it is determined that the UE is not interested.

S310: The UE sends a message to the UPF network element, to indicate that the UE can receive the flow. The message may include the identification information of the flow. Optionally, the message may further include the second latency information.

For example, the UE may send a flow service recipient ready (Listener Ready) message to the UPF network element, and the message includes the identification information of the flow and the second latency information.

S311: The UPF network element sends, to the SMF network element, the message that is received by the UPF network element from the UE in S310, to indicate that the UE can receive the flow.

For example, the UPF network element may forward, to the SMF network element, the flow service recipient ready message that is received by the UPF network element from the UE in S310.

S312: The SMF network element sends bandwidth requirement information of the flow to the UPF network element. In addition, the SMF network element may further update a credit scheduling parameter of the UPF network element.

After receiving the bandwidth requirement message of the flow from the SMF network element, the UPF network element may reserve the bandwidth resource for the flow based on the bandwidth requirement information. In this way, when the flow is transmitted to the UPF network element, the UPF network element may have a corresponding bandwidth resource to transmit the flow, thereby improving transmission reliability of the flow.

Optionally, S312 may not be performed in the communication method in this embodiment of this application. In other words, the bandwidth resource does not need to be reserved for the flow on the UPF network element in advance.

S313: The SMF network element sends the bandwidth requirement information of the flow to an AN device corresponding to the UE, to indicate the AN device to reserve the bandwidth resource for the flow.

After receiving the bandwidth requirement information from the SMF network element, the AN device may reserve the bandwidth resource for the flow based on the bandwidth requirement information, so that an access network may have a corresponding bandwidth resource to transmit the flow, thereby improving transmission reliability of the flow.

It should be understood that, in this implementation, the AN device corresponding to the UE is a device that provides an access network service for the UE.

Optionally, S313 may not be performed in the communication method in this embodiment of this application. In other words, the bandwidth resource does not need to be reserved for the flow on the AN device in advance.

If S313 is not performed in the communication method in this embodiment of this application, correspondingly, S314 and S315 may not be performed.

S314: The AN device sends first information to the SMF network element, where the first information is used to indicate whether the access network device successfully reserves the bandwidth resource for the flow based on the bandwidth requirement information of the flow.

Optionally, in the communication method, when S313 is performed, S314 and S315 may not be performed.

S315: If the SMF network element receives the first information from the AN device, and the first information indicates that the AN device successfully reserves the resource for the flow, the SMF network element sends, to the UPF network element, information indicating that the resource is successfully reserved.

Figure 7:
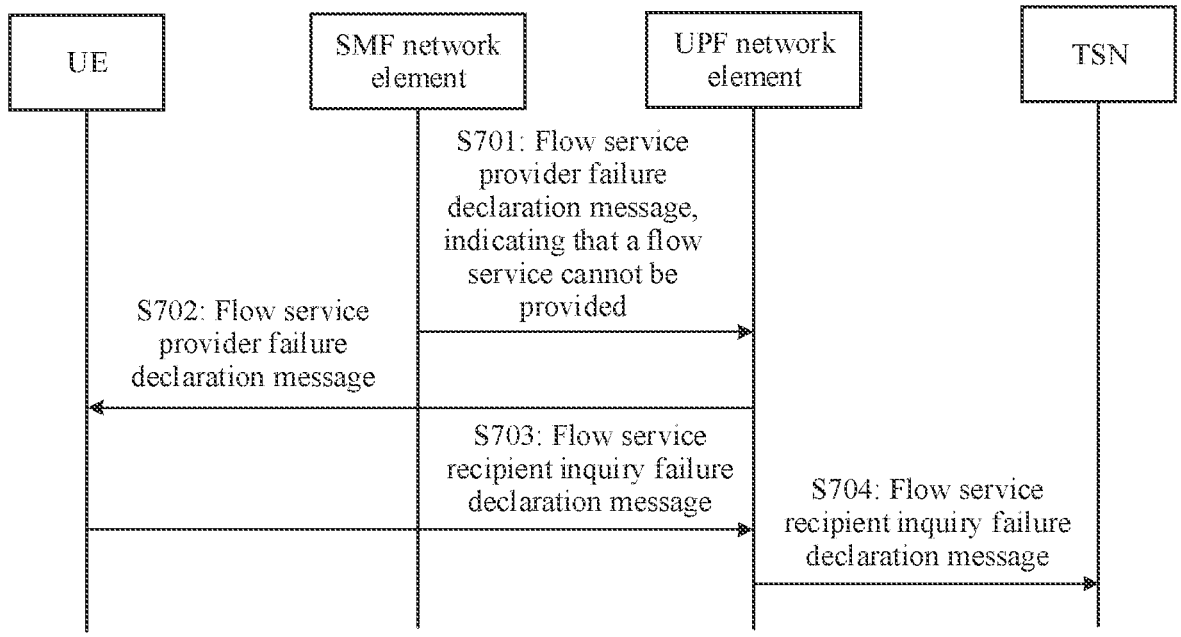
FIG. 7 is a schematic flowchart of a communication method according to another embodiment of this application.

If the first information indicates that the AN device fails to reserve the resource for the flow, the communication method shown in FIG. 7 may be performed.

S316: The UPF network element sends the identification information of the flow and the second latency information to the TSN.

For example, if S310 is further performed in the communication method, the UPF network element may forward, to the TSN, the flow service recipient ready message that is received by the UPF network element from the UE in S310, and the flow service recipient ready message carries the identification information of the flow and the second latency information.

For example, if S310 is not performed in the communication method, the UPF network element may send, to the TSN, the identification information of the flow and the second latency information that are received by the UPF network element from the SMF network element in S307.

For example, if S315 is performed in the communication method, after receiving, from the SMF network element, the information indicating that the resource is successfully reserved, the UPF network element sends the identification information of the flow and the second latency information to the TSN.

For example, if S315 is not performed in the communication method, after receiving the identification information of the flow and the second latency information from the SMF network element, the UPF network element may send the identification information of the flow and the second latency information to the TSN.

It should be understood that an execution sequence of S306 is not limited in the communication method in this embodiment of this application. For example, S306 may be performed before S305, or S306 may be performed before S304.

It should be understood that an execution sequence of S312 is not limited in the communication method in this embodiment of this application, provided that S312 is performed after S306.

It should be understood that an execution sequence of S313 is not limited in the communication method in this embodiment of this application, provided that S313 is performed after S306, and is performed before S314.

Figure 4:
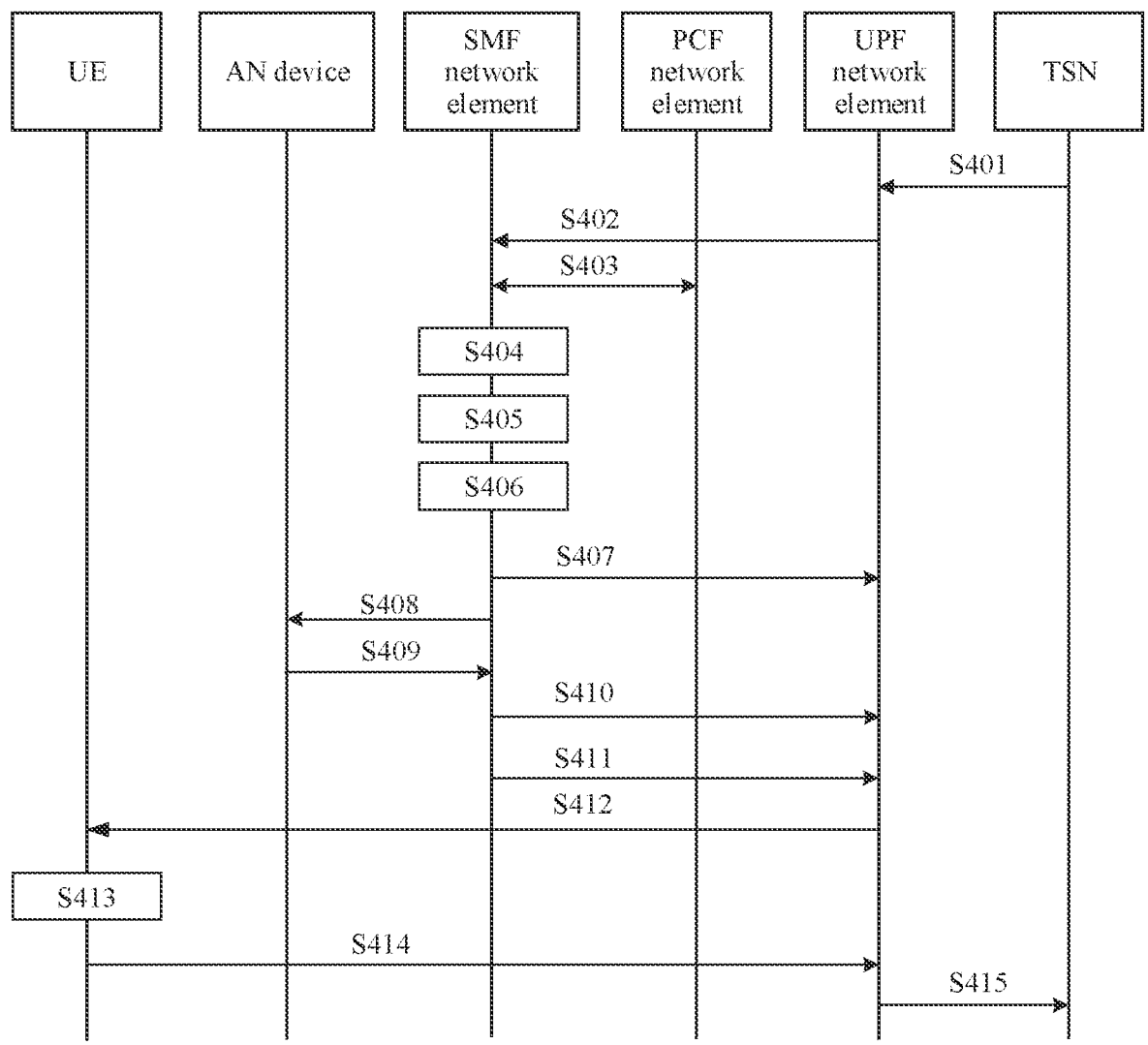
FIG. 4 is a schematic flowchart of a communication method according to another embodiment of this application.

FIG. 4 is a schematic flowchart of a communication method according to another embodiment of this application. It should be understood that FIG. 4 shows steps or operations of the communication method, but these steps or operations are merely examples. In this embodiment of this application, other operations or variations of the operations in FIG. 4 may be further performed. In addition, the steps in FIG. 4 may be performed in a sequence different from that presented in FIG. 4, and possibly, not all operations in FIG. 4 need to be performed.

For S401 to S405, refer to S301 to S305. Details are not described herein again.

S406: The SMF network element determines, according to the PCC rule corresponding to the flow, whether a bandwidth resource can be reserved for the flow. If determining, according to the PCC rule corresponding to the flow, that the bandwidth resource can be reserved for the flow, the SMF network element may perform S407; otherwise, may perform the communication method in FIG. 7.

That the SMF network element determines, according to the PCC rule corresponding to the flow, whether a bandwidth resource can be reserved for the flow may be understood as follows: The SMF network element determines, according to the PCC rule corresponding to the flow, whether a core network and a radio access network can meet a bandwidth requirement of the flow.

That the SMF network element determines, according to the PCC rule corresponding to the flow, whether the core network and the radio access network can reserve the bandwidth resource for the flow may include: determining, by the SMF network element according to the PCC rule corresponding to the flow, the bandwidth requirement of the flow and determining whether the core network and the radio access network can meet the bandwidth requirement of the flow.

S407: The SMF network element sends bandwidth requirement information of the flow to the UPF network element. In addition, the SMF network element may further update a credit scheduling parameter of the UPF network element.

After receiving the bandwidth requirement message of the flow from the SMF network element, the UPF network element may reserve the bandwidth resource for the flow based on the bandwidth requirement information. In this way, when the flow is transmitted to the UPF network element, the UPF network element may have a corresponding bandwidth resource to transmit the flow, thereby improving transmission reliability of the flow.

S408: The SMF network element sends the bandwidth requirement information of the flow to an AN device corresponding to the UE, to indicate the AN device to reserve the bandwidth resource for the flow.

After receiving the bandwidth requirement information from the SMF network element, the AN device may reserve the bandwidth resource for the flow based on the bandwidth requirement information, so that an access network may have a corresponding bandwidth resource to transmit the flow, thereby improving transmission reliability of the flow.

It should be understood that, in this implementation, the AN device corresponding to the UE is a device that provides an access network service for the UE.

S409: The AN device sends first information to the SMF network element, where the first information is used to indicate whether the access network device successfully reserves the bandwidth resource for the flow based on the bandwidth requirement information of the flow.

S410: If the SMF network element receives the first information from the AN device, and the first information indicates that the AN device successfully reserves the resource for the flow, the SMF network element sends, to the UPF network element, information indicating that the resource is successfully reserved.

If the first information indicates that the AN device fails to reserve the resource for the flow, the communication method shown in FIG. 7 may be performed.

S411: The SMF network element sends second latency information to the UPF network element, where the second latency information is used to indicate the second latency. The SMF network element may also send identification information of the flow to the UPF network element.

For example, the SMF network element may modify, to the second latency information, the first latency information that is in a flow service provider broadcast declaration message and that is received by the SMF network element from the UPF network element in S402, to modify the first latency recorded in the flow service provider broadcast declaration message to the second latency. Then, the SMF network element may send, to the UPF network element, a flow service provider broadcast declaration message obtained after modification.

Optionally, the information indicating that the resource is successfully reserved in S410 and the second latency information in S411 may be sent to the UPF together. Alternatively, S410 may not be performed. After the SMF receives the first information sent by the AN device, and the first information indicates that the AN device successfully reserves the resource for the flow, the SMF performs step S411. The UPF receives the second latency information sent by the SMF, that is, determines that the resource is successfully reserved, and performs step S412.

S412: The UPF network element sends the second latency information to the UE. Correspondingly, the UE receives the second latency information from the UPF network element. The SMF network element may also send the identification information of the flow to the UPF network element.

For example, the UPF network element may forward, to the UE, the flow service provider broadcast declaration message that is received from the SMF network element in S411.

S413: The UE determines, based on the second latency information received in S412, whether the second latency can meet a latency requirement of the flow.

If it is determined that the second latency can meet the latency requirement of the flow, S414 may be performed. Otherwise, the UE may initiate a flow service recipient inquiry failure declaration (Listener Asking Failed declaration) message to the UPF network element, and then the UPF network element forwards the flow service recipient inquiry failure declaration message to the flow service provider in the TSN.

Optionally, the UE may further determine whether the UE is interested in the flow. If it is determined that the UE is interested in the flow, and that the second latency can meet the latency requirement of the flow, S414 may be performed. Otherwise, the UE may initiate a flow service recipient inquiry failure declaration message to the UPF network element, and then the UPF network element forwards the flow service recipient inquiry failure declaration message to the flow service provider in the TSN.

S414: The UE sends a message to the UPF network element, to indicate that the UE can receive the flow. The message may include the identification information of the flow and the second latency information.

For example, the UE may send a flow service recipient ready (Listener Ready) message to the UPF network element, and the message includes the identification information of the flow and the second latency information.

S415: The UPF network element sends the identification information of the flow and the second latency information to the TSN.

For example, the UPF network element may forward, to the TSN, the flow service recipient ready message that is received by the UPF network element from the UE in S414, and the flow service recipient ready message carries the identification information of the flow and the second latency information.

Figure 5:
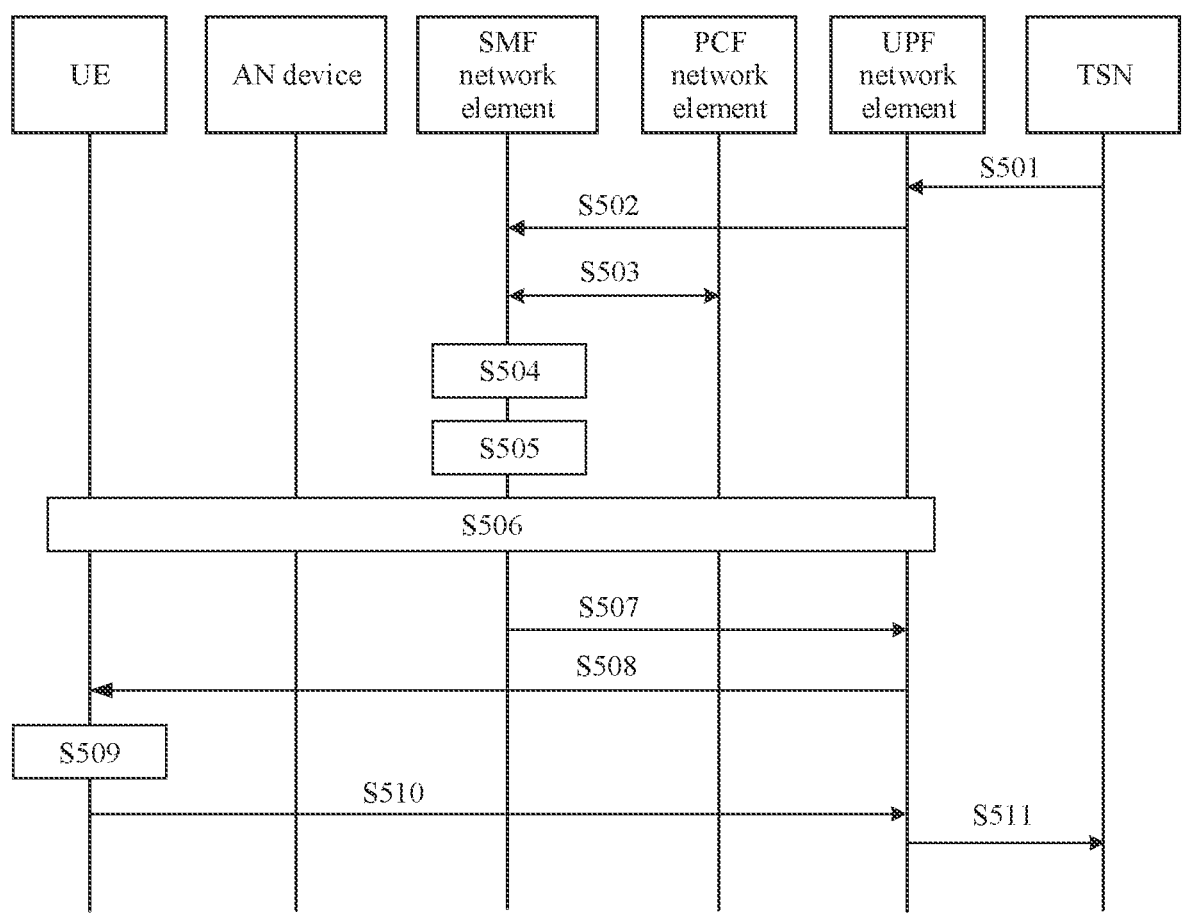
FIG. 5 is a schematic flowchart of a communication method according to another embodiment of this application.

FIG. 5 is a schematic flowchart of a communication method according to another embodiment of this application. It should be understood that FIG. 5 shows steps or operations of the communication method, but these steps or operations are merely examples. In this embodiment of this application, other operations or variations of the operations in FIG. 5 may be further performed. In addition, the steps in FIG. 5 may be performed in a sequence different from that presented in FIG. 5, and possibly, not all operations in FIG. 5 need to be performed.

For S501 to S505, refer to S301 to S305. Details are not described herein again.

S506: The SMF network element determines, according to the PCC rule corresponding to the flow, whether a session modification procedure or a session establishment procedure can be triggered for the flow, to establish a corresponding QoS flow for the flow. If determining, according to the PCC rule corresponding to the flow, that the corresponding QoS flow can be established for the flow, the SMF network element may perform S507; otherwise, may perform the communication method in FIG. 7.

That the SMF network element determines, according to the PCC rule corresponding to the flow, whether the corresponding QoS flow can be established for the flow may be understood as follows: The SMF network element determines, according to the PCC rule corresponding to the flow, whether a core network and a radio access network can meet a bandwidth requirement and a latency requirement of the flow.

S507: The SMF network element sends second latency information to the UPF network element, where the second latency information is used to indicate the second latency. The SMF network element may also send identification information of the flow to the UPF network element.

For example, the SMF network element may modify, to the second latency information, the first latency information that is in a flow service provider broadcast declaration message and that is received by the SMF network element from the UPF network element in S502, to modify the first latency recorded in the flow service provider broadcast declaration message to the second latency. Then, the SMF network element may send, to the UPF network element, a flow service provider broadcast declaration message obtained after modification.

S508: The UPF network element sends the second latency information to the UE. Correspondingly, the UE receives the second latency information from the UPF network element. The UPF network element also sends the identification information of the flow to the UE.

For example, the UPF network element may forward, to the UE, the flow service provider broadcast declaration message that is received from the SMF network element in S507.

S509: The UE determines, based on the second latency information received in S508, whether the second latency can meet a latency requirement of the flow.

If it is determined that the second latency can meet the latency requirement of the flow, S510 may be performed. Otherwise, the UE may initiate a flow service recipient inquiry failure declaration (Listener Asking Failed declaration) message to the UPF network element, and then the UPF network element forwards the flow service recipient inquiry failure declaration message to the flow service provider in the TSN.

Optionally, the UE may further determine whether the UE is interested in the flow. If it is determined that the UE is interested in the flow, and that the second latency can meet the latency requirement of the flow, S510 may be performed. Otherwise, the UE may initiate a flow service recipient inquiry failure declaration message to the UPF network element, and then the UPF network element forwards the flow service recipient inquiry failure declaration message to the flow service provider in the TSN.

S510: The UE sends a message to the UPF network element, to indicate that the UE can receive the flow. The message may include the identification information of the flow and the second latency information.

For example, the UE may send a flow service recipient ready (Listener Ready) message to the UPF network element, and the message includes the identification information of the flow and the second latency information.

S511: The UPF network element sends the identification information of the flow and the second latency information to the TSN.

For example, the UPF network element may forward, to the TSN, the flow service recipient ready message that is received by the UPF network element from the UE in S510, and the flow service recipient ready message carries the identification information of the flow and the second latency information.

Figure 6:
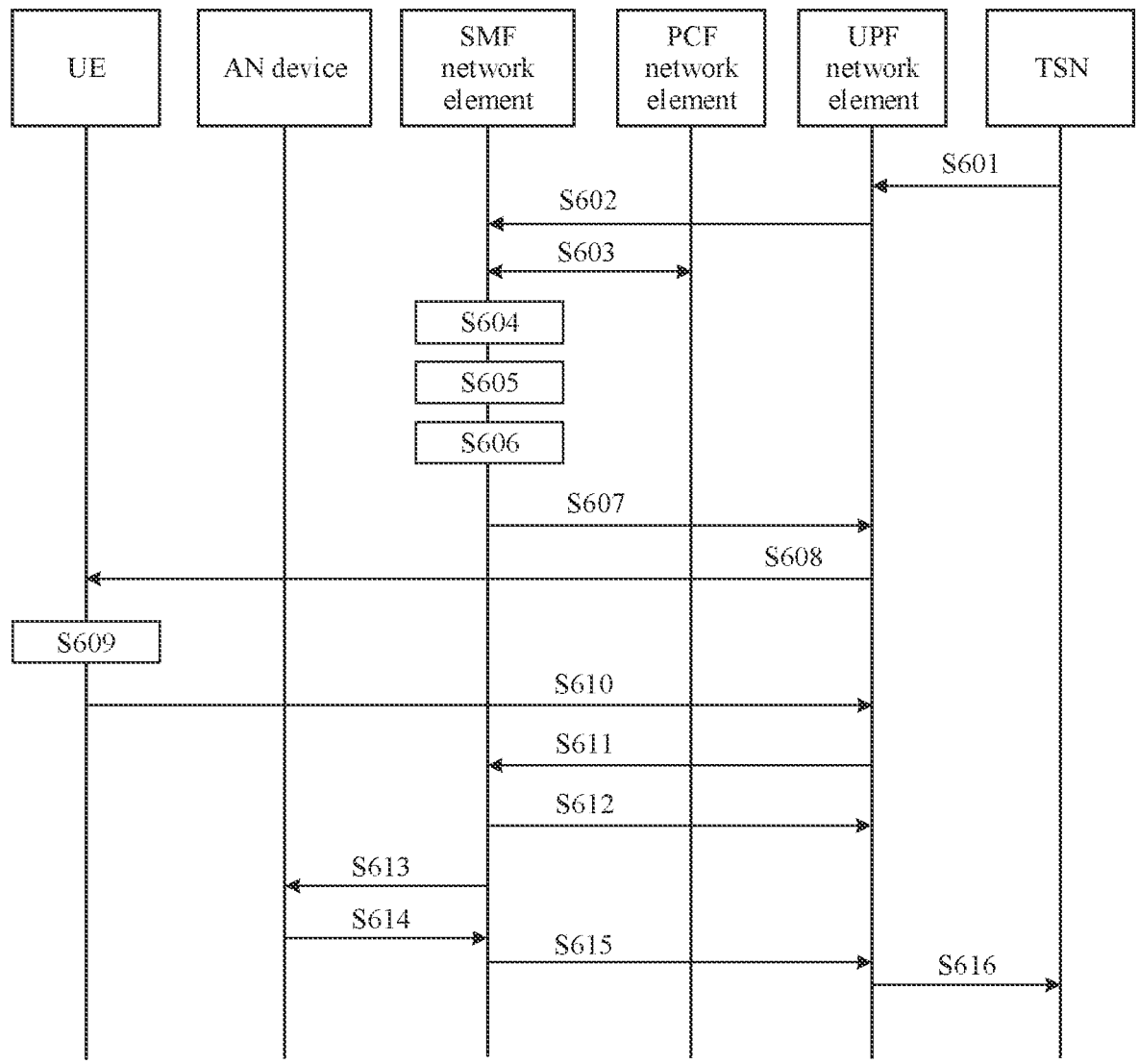
FIG. 6 is a schematic flowchart of a communication method according to another embodiment of this application.

FIG. 6 is a schematic flowchart of a communication method according to another embodiment of this application. It should be understood that FIG. 6 shows steps or operations of the communication method, but these steps or operations are merely examples. In this embodiment of this application, other operations or variations of the operations in FIG. 6 may be further performed. In addition, the steps in FIG. 6 may be performed in a sequence different from that presented in FIG. 6, and possibly, not all operations in FIG. 6 need to be performed.

S601: A UPF network element receives first latency information from a TSN, where the first latency information is used to indicate a first latency of transmitting a flow from a flow service provider in the TSN to the UPF network element.

For this step, refer to S201. Details are not described herein again.

S602: The UPF network element sends the first latency information to an SMF network element. Correspondingly, the SMF network element receives the first latency information from the UPF network element.

For this step, refer to S202. Details are not described herein again.

S603: The SMF network element obtains, from a PCF network element, a PCC rule corresponding to the flow.

For this step, refer to S303. Details are not described herein again.

Optionally, S603 may not be performed in the communication method in this embodiment of this application.

For example, the PCC rule may be locally configured on the SMF network element, and the SMF network element matches the corresponding PCC rule based on the information about the flow.

For another example, after obtaining the PCC rule corresponding to the flow from the PCF network element, the SMF network element may buffer the PCC rule. In this way, when the SMF network element needs to use the PCC rule corresponding to the flow next time, the SMF network element may directly obtain the PCC rule from the SMF network element instead of performing S603, thereby improving efficiency.

S604: The SMF network element determines, according to the PCC rule of the flow, a third latency of transmitting the flow from the UPF network element to UE. For this step, refer to S203. Details are not described herein again.

S605: The SMF network element determines, based on the third latency determined in S604 and the first latency indicated by the first latency information, a second latency of transmitting the flow from the flow service provider in the TSN to the UE.

For this step, refer to S204. Details are not described herein again.

S606: The SMF network element determines, according to the PCC rule corresponding to the flow, whether a bandwidth resource can be reserved for the flow.

For this step, refer to S306. Details are not described herein again.

If determining, according to the PCC rule corresponding to the flow, that a core network and an access network can reserve the bandwidth resource for the flow, the SMF network element may perform S607; otherwise, may perform the communication method in FIG. 7.

Optionally, in the method in this embodiment of this application, S406 may not be performed. To be specific, after determining the second latency in S605, the SMF network element may directly perform S607.

S607: The SMF network element sends identification information of the flow to the UPF network element.

For example, the SMF network element sends a flow service provider broadcast declaration message to the UPF network element, and the message carries only the identification information of the flow.

Optionally, S607 may not be performed in the communication method in this embodiment of this application. Correspondingly, S608 to S611 may not be performed.

S608: The UPF network element sends, to the UE, the identification information of the flow that is received by the UPF network element in S607.

For example, the UPF network element forwards, to the UE, the flow service provider broadcast declaration message received from the SMF network element, and the message carries the identification information of the flow.

Optionally, S608 may not be performed in the communication method in this embodiment of this application. Correspondingly, S609 to S611 may not be performed.

S609: The UE determines whether the UE is interested in the flow, and if the UE is interested in the flow, the UE performs S610. Otherwise, the UE may initiate a flow service recipient inquiry failure declaration message to the UPF network element, and then the UPF network element forwards the flow service recipient inquiry failure declaration message to the flow service provider in the TSN.

For example, the UE determines whether the UE is interested in the flow indicated by the identification information that is of the flow and that is carried in the flow service provider broadcast declaration message.

S610: The UE sends a message to the UPF network element, to indicate that the UE can receive the flow. The message may include the identification information of the flow.

For example, the UE sends a flow service recipient ready message to the UPF network element, and the message includes the identification information of the flow.

S611: The UPF network element sends a message to the SMF network element, to indicate that the UE can receive the flow.

For example, the UPF network element may forward, to the SMF network element, the flow service recipient ready message that is received by the UPF network element from the UE in S610.

S612: The SMF network element sends bandwidth requirement information of the flow to the UPF network element. In addition, the SMF network element may further update a credit scheduling parameter of the UPF network element.

For this step, refer to S312. Details are not described herein again.

Optionally, S612 may not be performed in the communication method in this embodiment of this application. In other words, the bandwidth resource does not need to be reserved for the flow on the UPF network element in advance.

S613: The SMF network element sends the bandwidth requirement information of the flow to an AN device corresponding to the UE, to indicate the AN device to reserve the bandwidth resource for the flow.

For this step, refer to S313. Details are not described herein again.

Optionally, S613 may not be performed in the communication method in this embodiment of this application. In other words, the bandwidth resource does not need to be reserved for the flow on the AN device in advance.

If S613 is not performed in the communication method in this embodiment of this application, correspondingly, S614 and S615 may not be performed.

S614: The AN device sends first information to the SMF network element, where the first information is used to indicate whether the access network device successfully reserves the bandwidth resource for the flow based on the bandwidth requirement information of the flow.

Optionally, in the communication method, when S613 is performed, S614 may not be performed. S615: The SMF network element sends the identification information of the flow and the second latency information to the UPF network element.

For example, the SMF network element may send, to the UPF network element, the flow service recipient ready message, and the flow service recipient ready message carries the identification information of the flow and the second latency information.

If S614 is performed in the communication method, the SMF network element may perform S615 after the SMF network element receives the first information, and the first information indicates that the AN device successfully reserves the resource for the flow. If S614 is not performed in the communication method, the SMF network element may perform S615 after S611.

Further, if S607 is not performed in the communication method, the SMF network element may perform S615 after S606.

If the SMF network element does not receive the first information sent by the AN device, or receives, from the AN device, information indicating that the resource fails to be reserved, the SMF network element may perform the communication method shown in FIG. 7.

S616: The UPF network element sends the identification information of the flow and the second latency information to the TSN.

The UPF network element sends, to the TSN, the flow service recipient ready message that is received by the UPF network element from the SMF network element in S615.

It should be understood that an execution sequence of S606 is not limited in the communication method in this embodiment of this application. For example, S606 may be performed before S605, or S606 may be performed before S604.

It should be understood that an execution sequence of S612 is not limited in the communication method in this embodiment of this application, provided that S612 is performed after S606.

It should be understood that an execution sequence of S613 is not limited in the communication method in this embodiment of this application, provided that S613 is performed after S605, and is performed before S614.

FIG. 7 is a schematic flowchart of a communication method according to another embodiment of this application. It should be understood that FIG. 7 shows steps or operations of the communication method, but these steps or operations are merely examples. In this embodiment of this application, other operations or variations of the operations in FIG. 7 may be further performed. In addition, the steps in FIG. 7 may be performed in a sequence different from that presented in FIG. 7, and possibly, not all operations in FIG. 7 need to be performed.

S701: An SMF network element sends a flow service provider failure declaration (Talker failed declaration) message to a UPF network element, where the message is used to indicate that a flow service cannot be provided due to a bandwidth limitation or another limitation.

For example, when determining that the UPF network element or an AN device cannot reserve a bandwidth resource for a flow or cannot meet a QoS requirement of the flow, the SMF network element may send the flow service provider failure declaration message to the UPF network element.

For example, when a flow with a higher priority needs to be transmitted, or after UE moves and is handed over to a new base station, an output port corresponding to the UPF network element changes, and consequently, the output port exceeds an upper limit of reservation. Alternatively, when a PCF does not allow a bandwidth resource to be reserved for the flow, the SMF network element may determine that the QoS requirement of the flow cannot be met.

S702: The UPF network element forwards the flow service provider failure declaration message to the UE.

S703: UE initiates a flow service recipient inquiry failure declaration (Listener Asking Failed Declaration) message to the UPF network element.

S704: The UPF network element forwards the flow service provider inquiry failure declaration message to a flow service provider in a TSN.

It should be understood that message names shown in FIG. 7 are merely examples. Any message that can implement a response function in the communication method falls within the protection scope of the embodiments of this application.

Figure 8:
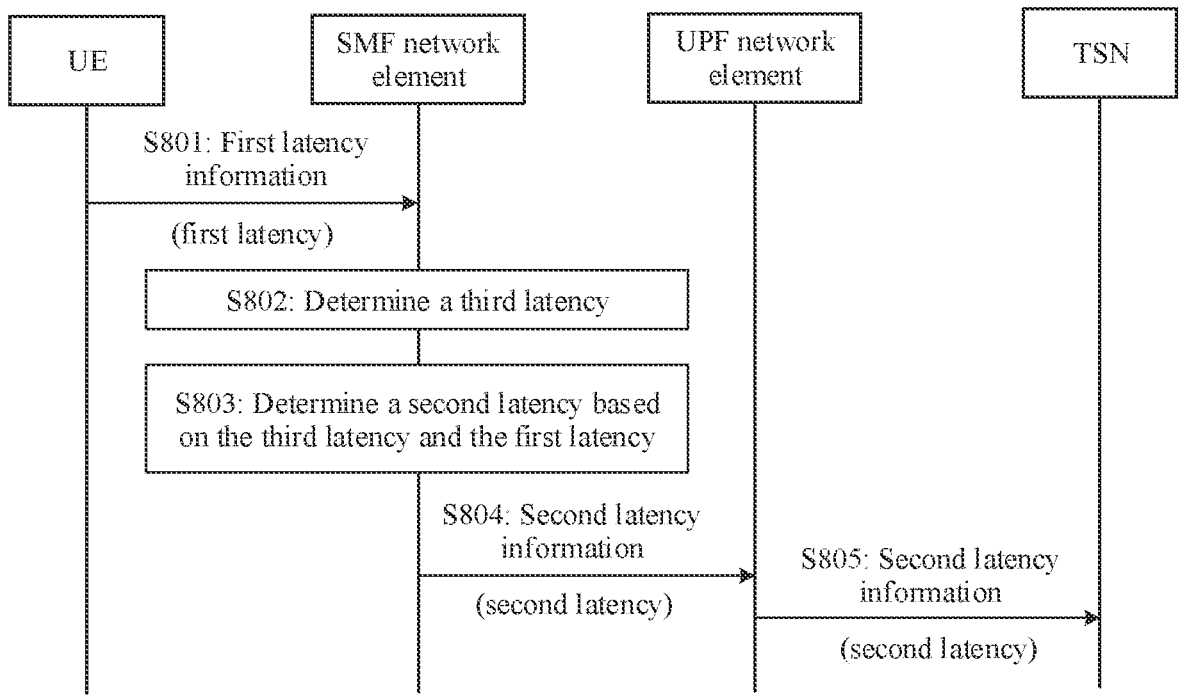
FIG. 8 is a schematic flowchart of a communication method according to another embodiment of this application.

A schematic flowchart of a communication method according to an embodiment of this application is shown in FIG. 8. It should be understood that FIG. 8 shows steps or operations of the communication method, but these steps or operations are merely examples. In this embodiment of this application, other operations or variations of the operations in FIG. 8 may be further performed.

S801: UE sends first latency information of a flow to an SMF network element, and the SMF network element receives the first latency information from the UE, where the first latency information is used to indicate a first latency.

The first latency is an accumulated latency that is determined by the UE and that is of transmitting the flow from the UE to a UPF network element. In this case, the UE serves as a flow service provider, and a network element in a TSN serves as a flow service recipient.

In some possible implementations, the first latency is obtained by the UE by adding a latency of locally processing a single frame of the flow and a default value of a transmission latency of transmitting the flow from the UE to the UPF network element. An example of the default value of the transmission latency of transmitting the flow from the UE to the UPF network element is 500 nanoseconds.

The UPF network element may be the UPF network element 103 in FIG. 1, the UE may be the UE 101 in FIG. 1, and the SMF network element may be the SMF network element 105 in FIG. 1.

The first latency information may be carried in a flow service provider broadcast declaration message. The flow service provider broadcast declaration message may be used to broadcast the flow and a QoS requirement corresponding to the flow.

The flow service provider broadcast declaration message may further carry a flow identifier in addition to the first latency information. In addition, the flow service provider broadcast declaration message may further carry one or more of the following information: a destination address, a source address, a maximum frame size, a maximum frame interval, a priority of a frame, a maximum allowable latency of transmitting a single frame of the flow from a talker to a listener, a reliability requirement of the flow, or a resource reservation failure cause.

An implementation in which the UE sends the first latency information of the flow to the SMF network element may include: The UE directly sends the first latency information to the SMF network element. For example, the UE sends the flow service provider broadcast declaration message to the SMF network element through an AMF network element, and the flow service provider broadcast declaration message carries the first latency information.

Another implementation in which the UE sends the first latency information of the flow to the SMF network element may include: The UE sends the first latency information to the UPF network element, and then the UPF network element sends the first latency information to the SMF network element. For example, the UE sends the flow service provider broadcast declaration message to the UPF network element, and the UPF network element forwards the flow service provider broadcast declaration message to the SMF network element. The flow service provider broadcast declaration message carries the first latency information.

S802: The SMF network element determines, according to a PCC rule of the flow, a third latency of transmitting the flow from the UE to the UPF network element. The third latency may be a maximum transmission latency of transmitting the flow from the UE to the UPF network element.

The maximum transmission latency of transmitting the flow from the UE to the UPF network element may be equivalent to a maximum transmission latency of transmitting the flow from the UPF network element to the UE. Therefore, for this step, refer to S203. For brevity, details are not described herein again.

S803: The SMF network element determines, based on the first latency and the third latency, a second latency of transmitting the flow from the UE to the UPF network element.

In some possible implementations, the determining, by the SMF network element based on the first latency and the third latency, a second latency of transmitting the flow from the UE to the UPF may include: determining, by the SMF network element, a value obtained by subtracting a default value of a transmission latency of transmitting the flow from the UE to the UPF network element from a sum of the first latency and the third latency as the second latency.

The default value of the transmission latency of transmitting the flow from the UE to the UPF network element may be preconfigured.

For example, an example of the default value of the transmission latency of transmitting the flow from the UE to the UPF network element is 500 nanoseconds. In this case, a value obtained by subtracting 500 nanoseconds from the sum of the first latency and the third latency may be determined as the second latency.

S804: The SMF network element sends second latency information to the UPF network element, where the second latency information is used to indicate the second latency.

For example, the SMF network element may send the second latency information to the UPF network element through the flow service provider broadcast declaration message. In this way, the UPF network element may send the second latency information to the TSN by forwarding the flow service provider broadcast declaration message to the TSN.

S805: The UPF network element sends fourth latency information and identification information of the flow to the TSN. After receiving the fourth latency information, a node in the TSN may determine whether a fourth latency exceeds a requirement of a maximum transmission latency of transmitting the flow from the UE to the flow service recipient in the TSN.

For example, the UPF network element sends, to the TSN, the flow service provider broadcast declaration message that is received by the UPF in S804, and the UPF updates the second latency carried in the flow service provider broadcast declaration message to the fourth latency.

The fourth latency information is a value obtained after the UPF network element adds a latency of transmitting the flow from the UPF to a next-hop bridge (Bridge) in the TSN to the second latency information. If a next hop of the UPF is the flow service recipient, the fourth latency information is a value obtained after the UPF network element adds the second latency information and a latency of transmitting the flow from the UPF to the flow service recipient.

In the communication method, the SMF network element receives the first latency information from the UE, and learns, based on the first latency information, of the first latency that is determined by the UE and that is of transmitting the flow from the UE to the UPF network element. In addition, the SMF network element determines, according to the PCC rule, the maximum transmission latency of transmitting the flow from the UE to the UPF network element, and then, the SMF network element adjusts the first latency determined by the UE and the maximum transmission latency determined by the SMF network element, to obtain the second latency of transmitting the flow from the UE to the UPF network element, so that the flow can be transmitted based on the second latency in a communications network in which a 3GPP network interworks with the TSN.

In addition, the SMF network element determines, based on the maximum transmission latency of transmitting the flow from the UE to the UPF network element and the first latency that is determined by the UE, an accumulated latency of transmitting the flow from the UE to the UPF network element. However, in the prior art, clock synchronization needs to be performed between every two adjacent nodes between the UE and the UPF network element, and finally, clock synchronization between all nodes between the UE and the UPF network element is implemented, to support the TSN network on all transmission nodes between the UPF network element and the UE, so as to calculate the accumulated latency of transmitting the flow from the UE to the UPF network element. Compared with that in the prior art, the solution for the communication method is simple and easy to implement.

Figure 9:
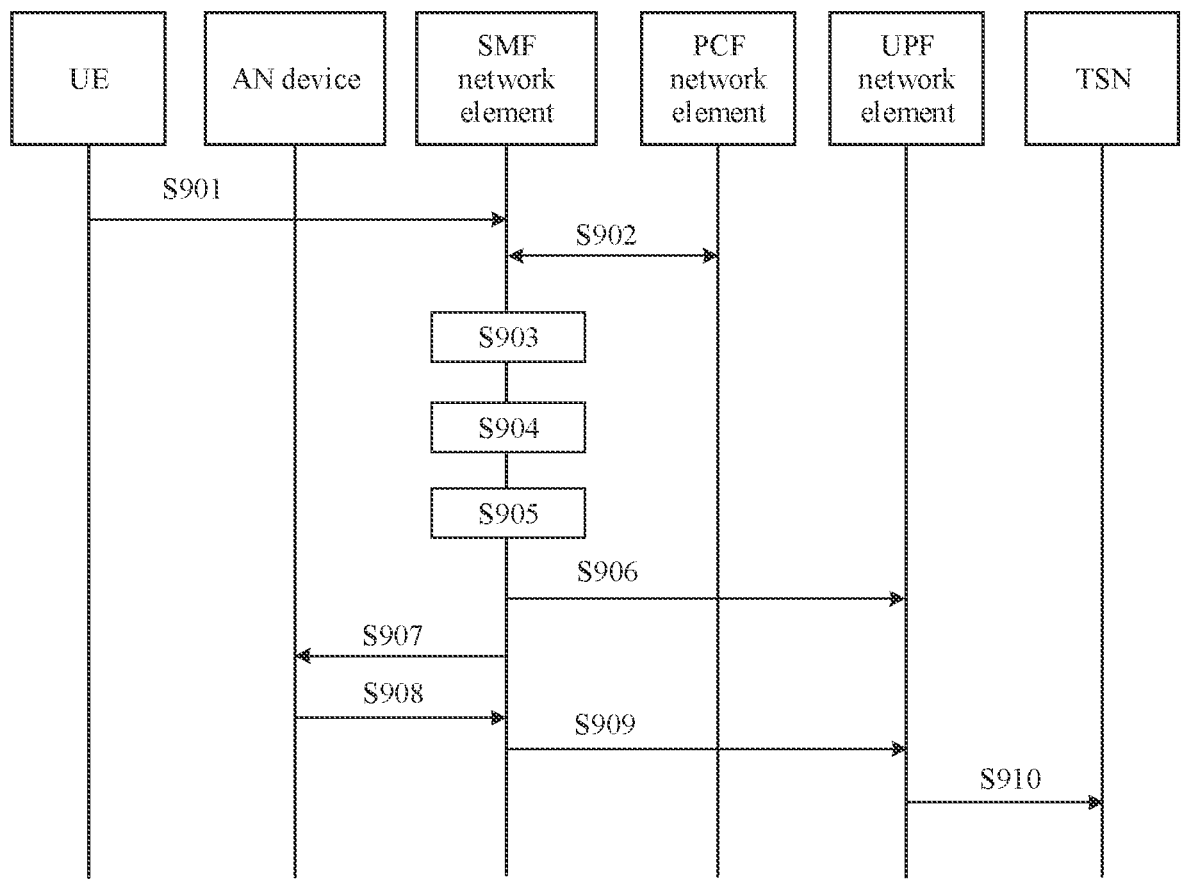
FIG. 9 is a schematic flowchart of a communication method according to another embodiment of this application.

FIG. 9 is a schematic flowchart of a communication method according to an embodiment of this application. It should be understood that FIG. 9 shows steps or operations of the communication method, but these steps or operations are merely examples. In this embodiment of this application, other operations or variations of the operations in FIG. 9 may be further performed. In addition, the steps in FIG. 9 may be performed in a sequence different from that presented in FIG. 9, and possibly, not all operations in FIG. 9 need to be performed.

S901: UE sends first latency information of a flow to an SMF network element, and the SMF network element receives the first latency information from the UE, where the first latency information is used to indicate a first latency.

For this step, refer to S801. Details are not described herein again.

S902: The SMF network element obtains, from a PCF network element, a PCC rule corresponding to the flow. For this step, refer to S303. Details are not described herein again.

Optionally, S902 may not be performed in the communication method in this embodiment of this application.

For example, the SMF network element may obtain, from another network element, the PCC rule corresponding to the flow.

For another example, after obtaining the PCC rule corresponding to the flow from the PCF network element or another network element, the SMF network element may buffer the PCC rule. In this way, when the SMF network element needs to use the PCC rule corresponding to the flow next time, the SMF network element may directly obtain the PCC rule from the SMF network element instead of performing S902, thereby improving efficiency.

S903: The SMF network element determines, according to a PCC rule of the flow, a third latency of transmitting the flow from the UE to the UPF network element. The third latency may be a maximum transmission latency of transmitting the flow from the UE to the UPF network element.

The maximum transmission latency of transmitting the flow from the UE to the UPF network element may be equivalent to a maximum transmission latency of transmitting the flow from the UPF network element to the UE. Therefore, for this step, refer to S203. Details are not described herein again.

S904: The SMF network element determines, based on the third latency determined in S903 and the first latency indicated by the first latency information, a second latency of transmitting the flow from UE to the UPF.

For this step, refer to S803. Details are not described herein again.

S905: The SMF network element determines, according to the PCC rule corresponding to the flow, whether a bandwidth resource can be reserved for the flow.

For this step, refer to S306. Details are not described herein again.

If determining, according to the PCC rule corresponding to the flow, that a core network and an access network can reserve the bandwidth resource for the flow, the SMF network element may perform S906; otherwise, may not perform S906 to S908.

Optionally, in the method in this embodiment of this application, S905 may not be performed. To be specific, after determining the second latency in S904, the SMF network element may directly perform S906, S907, or S909.

S906: The SMF network element sends bandwidth requirement information of the flow to the UPF network element. In addition, the SMF network element may further update a credit scheduling parameter of the UPF network element.

For this step, refer to S312. Details are not described herein again.

Optionally, S906 may not be performed in the communication method in this embodiment of this application. In other words, the bandwidth resource does not need to be reserved for the flow on the UPF network element in advance.

S907: The SMF network element sends the bandwidth requirement information of the flow to an AN device corresponding to the UE, to indicate the AN device to reserve the bandwidth resource for the flow.

For this step, refer to S313. Details are not described herein again.

Optionally, S907 may not be performed in the communication method in this embodiment of this application. In other words, the bandwidth resource does not need to be reserved for the flow on the AN device in advance.

If S907 is not performed in the communication method in this embodiment of this application, correspondingly, S908 may not be performed.

S908: The AN device sends first information to the SMF network element, where the first information is used to indicate whether the access network device successfully reserves the bandwidth resource for the flow based on the bandwidth requirement information of the flow.

Optionally, in the communication method, when S907 is performed, S908 may not be performed.

S909: The SMF network element sends second latency information to the UPF network element.

For example, the SMF network element sends a flow service provider broadcast declaration message to the UPF network element, and the message carries the second latency information.

If S908 is performed in the communication method, the SMF network element may perform S909 after the SMF network element receives the first information, and the first information indicates that the AN device successfully reserves the resource for the flow. If the SMF network element does not receive the first information sent by the AN device, or receives, from the AN device, information indicating that the resource fails to be reserved, the SMF network element may perform the communication method shown in FIG. 7.

S910: The UPF network element sends fourth latency information and identification information of the flow to the TSN. After receiving the fourth latency information, a node in the TSN may determine whether a fourth latency exceeds a requirement of a maximum transmission latency of transmitting the flow from the UE to the flow service recipient in the TSN.

For example, the UPF network element sends, to the TSN, the flow service provider broadcast declaration message that is received by the UPF in S910, and the UPF updates the second latency carried in the flow service provider broadcast declaration message to the fourth latency.

The fourth latency information is a value obtained after the UPF network element adds a latency of transmitting the flow from the UPF to a next-hop bridge (Bridge) in the TSN to the second latency information. If a next hop of the UPF is the flow service recipient, the fourth latency information is a value obtained after the UPF network element adds the second latency information and a latency of transmitting the flow from the UPF to the flow service recipient.

It should be understood that an execution sequence of S905 is not limited in the communication method in this embodiment of this application. For example, S905 may be performed before S904, or S905 may be performed before S903.

It should be understood that an execution sequence of S906 is not limited in the communication method in this embodiment of this application, provided that S906 is performed after S905.

It should be understood that an execution sequence of S907 is not limited in the communication method in this embodiment of this application, provided that S907 is performed after S904, and is performed before S908.

Figure 10:
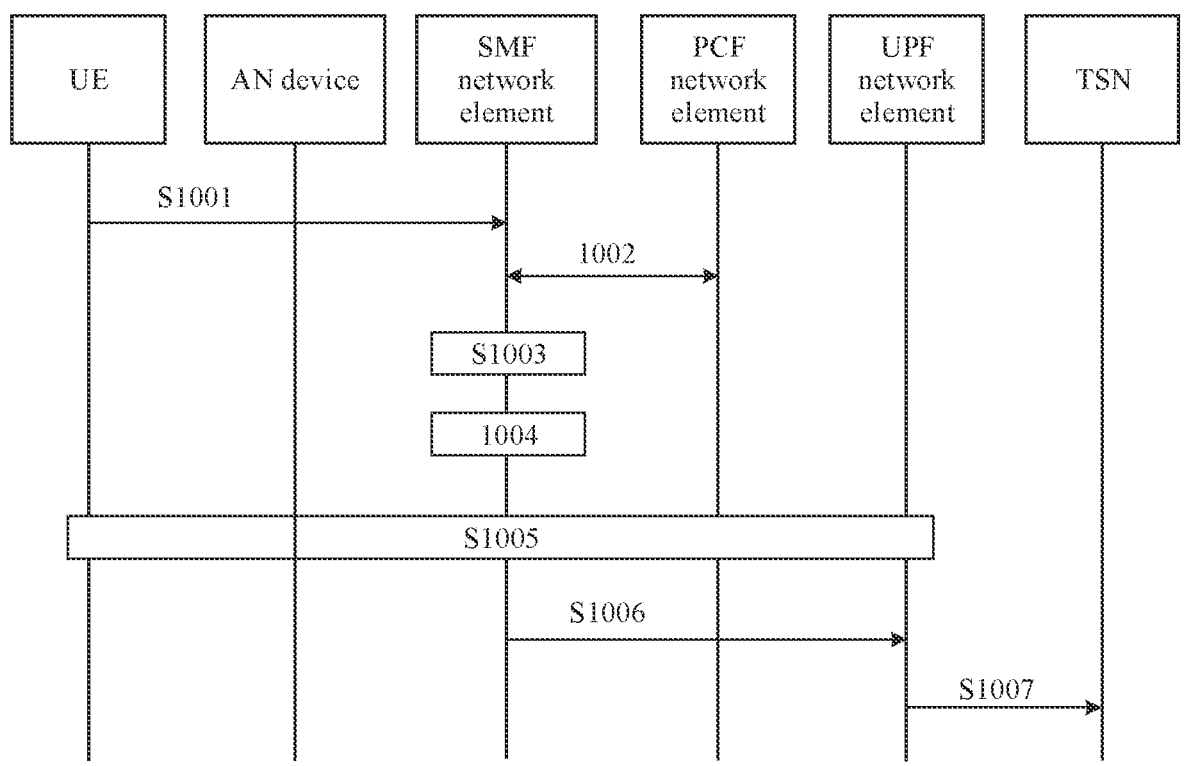
FIG. 10 is a schematic flowchart of a communication method according to another embodiment of this application.

FIG. 10 is a schematic flowchart of a communication method according to an embodiment of this application. It should be understood that FIG. 10 shows steps or operations of the communication method, but these steps or operations are merely examples. In this embodiment of this application, other operations or variations of the operations in FIG. 10 may be further performed. In addition, the steps in FIG. 10 may be performed in a sequence different from that presented in FIG. 10, and possibly, not all the operations in FIG. 10 need to be performed.

For S1001 to S1004, refer to S901 to S904. Details are not described herein again.

S1005: The SMF network element determines, according to the PCC rule corresponding to the flow, whether a session modification procedure or a session establishment procedure can be triggered for the flow, to establish a corresponding QoS flow (QoS Flow) for the flow. If the SMF network element determines, according to the PCC rule corresponding to the flow, that the corresponding QoS flow can be established for the flow, S1006 may be performed; otherwise, the communication method in FIG. 7 may be performed.

That the SMF network element determines, according to the PCC rule corresponding to the flow, whether the corresponding QoS flow can be established for the flow may be understood as follows: The SMF network element determines, according to the PCC rule corresponding to the flow, whether a core network and a radio access network can meet a bandwidth requirement and a latency requirement of the flow.

S1006: The SMF network element sends second latency information to the UPF network element.

For example, the SMF network element sends a flow service provider broadcast declaration message to the UPF network element, and the message carries the second latency information.

S1007: The UPF network element sends fourth latency information and identification information of the flow to the TSN. After receiving the fourth latency information, a node in the TSN may determine whether a fourth latency exceeds a requirement of a maximum transmission latency of transmitting the flow from the UE to the flow service recipient in the TSN.

For example, the UPF network element sends, to the TSN, the flow service provider broadcast declaration message that is received by the UPF in S1006, and the UPF updates the second latency carried in the flow service provider broadcast declaration message to the fourth latency.

The fourth latency information is a value obtained after the UPF network element adds a latency of transmitting the flow from the UPF to a next-hop bridge in the TSN to the second latency information. If a next hop of the UPF is the flow service recipient, the fourth latency information is a value obtained after the UPF network element adds the second latency information and a latency of transmitting the flow from the UPF to the flow service recipient.

Figure 11:
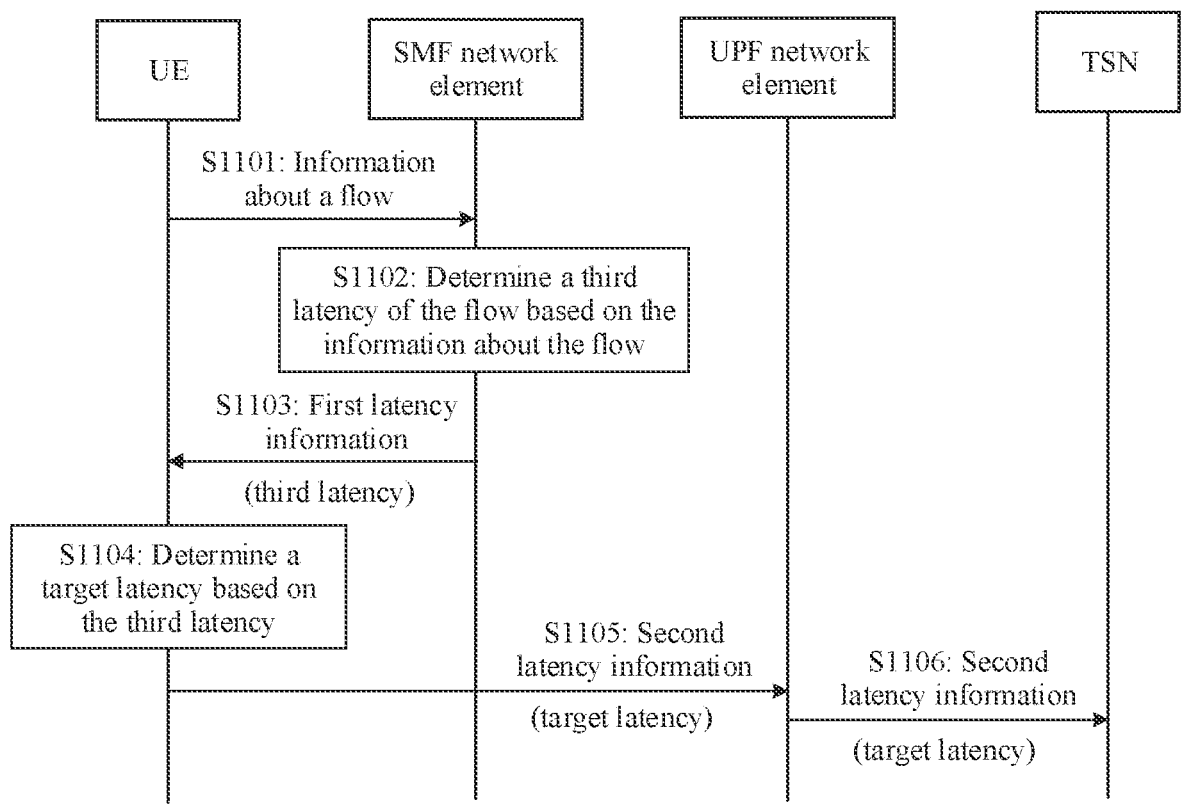
FIG. 11 is a schematic flowchart of a communication method according to another embodiment of this application.

A schematic flowchart of a communication method according to an embodiment of this application is shown in FIG. 11. It should be understood that FIG. 11 shows steps or operations of the communication method, but these steps or operations are merely examples. In this embodiment of this application, other operations or variations of the operations in FIG. 11 may be further performed.

S1101: UE sends information about a flow to an SMF network element. Correspondingly, the SMF network element receives the information about the flow from the UE.

The information about the flow may include at least one or more of the following: an identifier ID of the flow, a source address and a destination address of the flow, a size of a maximum frame used for transmitting the flow, an interval between frames used for transmitting the flow, a priority of the flow, a maximum allowable latency of transmitting a single frame of the flow from a talker to a listener, a reliability requirement of the flow, or information about a latency that is determined by the UE and that is of transmitting the flow from the UE to a UPF network element.

The UE sends the information about the flow to the SMF network element, to request the SMF network element to reserve a bandwidth resource for the flow and/or update the latency information. In this case, the UE serves as a flow service provider, and a network element in a TSN serves as a flow service recipient.

For example, the UE may send a resource reservation request message to the SMF network element, to request the SMF network element to reserve the bandwidth resource for the flow. The message carries the information about the flow.

The SMF network element may be the SMF network element 105 in FIG. 1, and the UE may be the UE 101 in FIG. 1.

S1102: The SMF network element determines, based on the information about the flow and a PCC rule of the flow, a third latency of transmitting the flow from the UE to the UPF network element. The third latency may be a maximum transmission latency of transmitting the flow from the UE to the UPF network element.

The maximum transmission latency of transmitting the flow from the UE to the UPF network element may be equivalent to a maximum transmission latency of transmitting the flow from the UPF network element to the UE. Therefore, for this step, refer to S203. Details are not described herein again.

S1103: The SMF network element sends first latency information to the UE, where the first latency information is used to indicate the third latency determined by the SMF network element. Correspondingly, the UE receives the first latency information from the SMF network element.

For example, the SMF network element may send a resource reservation response message to the UE, and the message carries the first latency information.

The SMF network element may send the first latency information to the UE through an AMF network element, or may send the first latency information to the UE through the UPF network element.

S1104: The UE determines, based on the third latency indicated by the first latency information, a target latency of transmitting the flow from the UE to the UPF network element.

In some possible implementations, that the UE determines, based on the third latency indicated by the first latency information, a target latency of transmitting the flow from the UE to the UPF network element may include: determining, by the UE, a sum of the third latency and a latency of locally processing a single frame of the flow as the target latency.

S1105: The UE sends second latency information to the UPF network element, where the second latency information is used to indicate the target latency determined by the UE.

For example, the UE may send a flow service provider broadcast declaration message to the UPF network element, and the message carries the second latency information. Certainly, the message may further carry other information, for example, the information about the flow mentioned in S101.

S1106: The UPF network element sends fourth latency information and identification information of the flow to the TSN. After receiving the fourth latency information, a node in the TSN may determine whether a fourth latency exceeds a requirement of a maximum transmission latency of transmitting the flow from the UE to the flow service recipient in the TSN.

For example, the UPF network element may send, to the TSN, the flow service provider broadcast declaration message that is received by the UPF network element from the UE in S1105, and the UPF updates a second latency carried in the flow service provider broadcast declaration message to a fourth latency.

The fourth latency information is a value obtained after the UPF network element adds a latency of transmitting the flow from the UPF to a next-hop bridge (Bridge) in the TSN to the second latency information. If a next hop of the UPF is the flow service recipient, the fourth latency information is a value obtained after the UPF network element adds the second latency information and a latency of transmitting the flow from the UPF to the flow service recipient.

In the communication method, the SMF network element determines, according to the PCC rule, the maximum transmission latency of transmitting the flow from the UE to the UPF network element, and indicates the maximum transmission latency to the UE, so that the UE can determine, based on the maximum transmission latency, an accumulated latency of transmitting the flow from the UE to the UPF network element. In this way, in a communications network in which a 3GPP network interworks with the TSN, the flow can be transmitted based on the accumulated latency.

In addition, the SMF network element determines, according to the PCC rule, the maximum transmission latency of transmitting the flow from the UE to the UPF network element, and indicates the maximum transmission latency to the UE, so that the UE can determine, based on the maximum transmission latency, the accumulated latency of transmitting the flow from the UE to the UPF network element. However, in the prior art, clock synchronization needs to be performed between every two adjacent nodes between the UE and the UPF network element, and finally, clock synchronization between all nodes between the UE and the UPF network element is implemented, to support the TSN network on all transmission nodes between the UPF network element and the UE, so as to calculate the accumulated latency of transmitting the flow from the UE to the UPF network element. Compared with that in the prior art, the solution for the communication method is simple and easy to implement.

Figure 12:
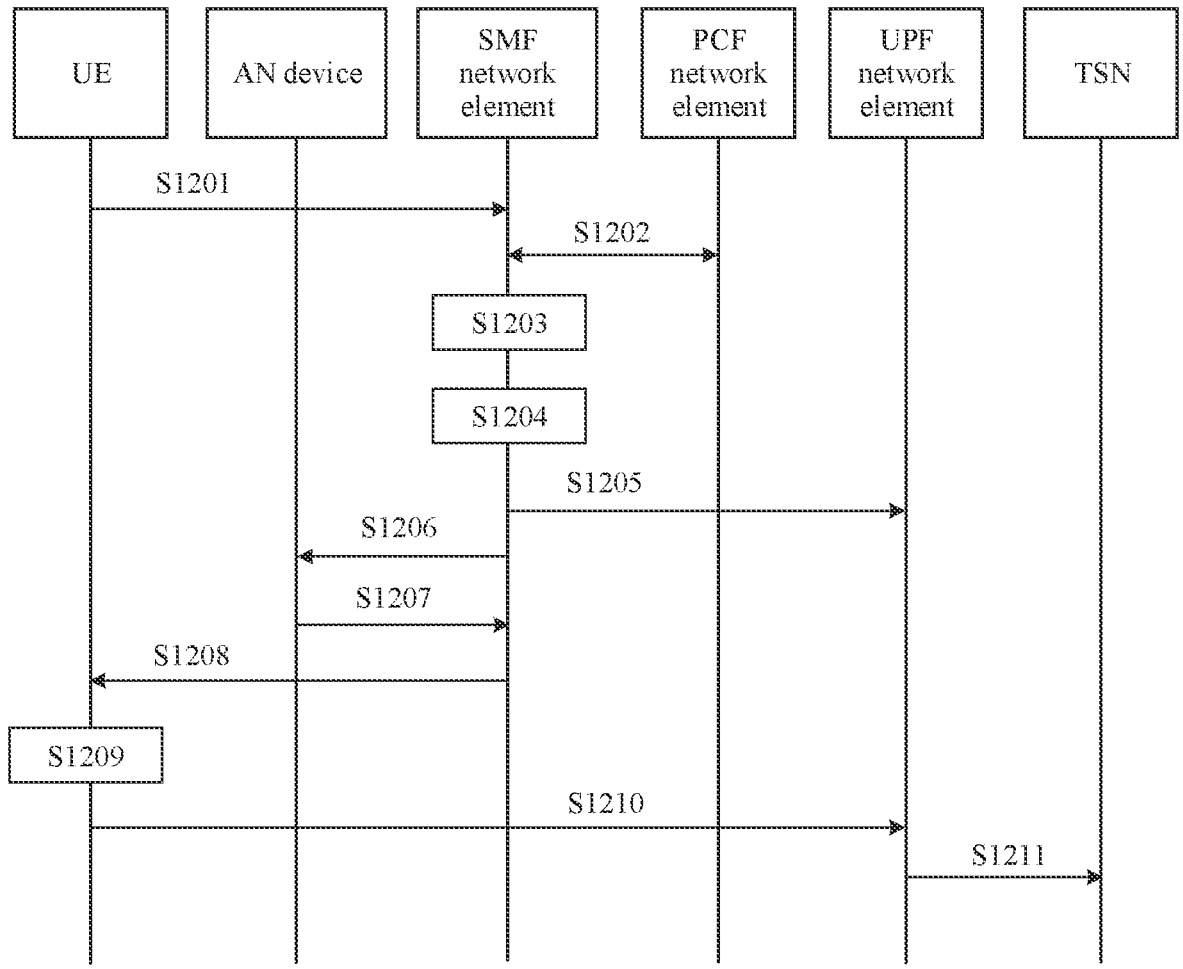
FIG. 12 is a schematic flowchart of a communication method according to another embodiment of this application.

A schematic flowchart of a communication method according to another embodiment of this application is shown in FIG. 12. It should be understood that FIG. 12 shows steps or operations of the communication method, but these steps or operations are merely examples. In this embodiment of this application, other operations or variations of the operations in FIG. 12 may be further performed. In addition, the steps in FIG. 12 may be performed in a sequence different from that presented in FIG. 12, and possibly, not all the operations in FIG. 12 need to be performed.

S1201: UE sends information about a flow to an SMF network element. Correspondingly, the SMF network element receives the information about the flow from the UE. For this step, refer to S1101. Details are not described herein again.

S1202: The SMF network element obtains, from a PCF network element, a PCC rule corresponding to the flow. For this step, refer to S303. Details are not described herein again.

Optionally, S1202 may not be performed in the communication method in this embodiment of this application.

For example, the SMF network element may obtain, from another network element, the PCC rule corresponding to the flow.

For another example, after obtaining the PCC rule corresponding to the flow from the PCF network element or another network element, the SMF network element may buffer the PCC rule. In this way, when the SMF network element needs to use the PCC rule corresponding to the flow next time, the SMF network element may directly obtain the PCC rule from the SMF network element instead of performing S1202, thereby improving efficiency.

S1203: The SMF network element determines, according to a PCC rule of the flow, a third latency of transmitting the flow from the UE to the UPF network element. The third latency may be a maximum transmission latency of transmitting the flow from the UE to the UPF network element.

The maximum transmission latency of transmitting the flow from the UE to the UPF network element may be equivalent to a maximum transmission latency of transmitting the flow from the UPF network element to the UE. Therefore, for this step, refer to S203. Details are not described herein again.

S1204: The SMF network element determines, according to the PCC rule corresponding to the flow, whether a bandwidth resource can be reserved for the flow.

For this step, refer to S306. Details are not described herein again.

If determining, according to the PCC rule corresponding to the flow, that a core network and an access network can reserve the bandwidth resource for the flow, the SMF network element may perform S1205; otherwise, may not perform S1205 to S1206.

S1205: The SMF network element sends bandwidth requirement information of the flow to the UPF network element. In addition, the SMF network element may further update a credit scheduling parameter of the UPF network element.

For this step, refer to S312. Details are not described herein again.

Optionally, S1205 may not be performed in the communication method in this embodiment of this application. In other words, the bandwidth resource does not need to be reserved for the flow on the UPF network element in advance.

S1206: The SMF network element sends the bandwidth requirement information of the flow to an AN device corresponding to the UE, to indicate the AN device to reserve the bandwidth resource for the flow.

For this step, refer to S313. Details are not described herein again.

Optionally, S1206 may not be performed in the communication method in this embodiment of this application. In other words, the bandwidth resource does not need to be reserved for the flow on the AN device in advance.

If S1206 is not performed in the communication method in this embodiment of this application, correspondingly, S1207 may not be performed.

S1207: The AN device sends first information to the SMF network element, where the first information is used to indicate whether the access network device successfully reserves the bandwidth resource for the flow based on the bandwidth requirement information of the flow.

Optionally, in the communication method, when S1206 is performed, S1207 may not be performed.

S1208: The SMF network element sends first latency information and identification information of the flow to the UE. The first latency information is used to indicate a maximum transmission latency that is determined by the SMF network element in step S1203 and that is of transmitting the flow from the UPF network element to the UE. Correspondingly, the UE receives the first latency information and the identification information of the flow from the SMF network element. For this step, refer to S1103. Details are not described herein again.

If S1207 is performed in the communication method, the SMF network element may perform S1208 after the SMF network element receives the first information, and the first information indicates that the AN device successfully reserves the resource for the flow. If the SMF network element does not receive the first information sent by the AN device, or receives, from the AN device, information indicating that the resource fails to be reserved, the SMF network element may not perform S1208 to S1210.

S1209: The UE determines, based on the maximum transmission latency indicated by the first latency information, a target latency of transmitting the flow from the UE to the UPF network element. For this step, refer to S1104. Details are not described herein again.

S1210: The UE sends second latency information to the UPF network element, where the second latency information is used to indicate the target latency in S1209. For this step, refer to S1105. Details are not described herein again.

S1211: The UPF network element sends fourth latency information and identification information of the flow to the TSN. After receiving the fourth latency information, a node in the TSN may determine whether a fourth latency exceeds a requirement of a maximum transmission latency of transmitting the flow from the UE to the flow service recipient in the TSN.

For example, the UPF network element sends, to the TSN, the flow service provider broadcast declaration message that is received by the UPF network element from the UE in S1210, and the UPF updates a second latency carried in the flow service provider broadcast declaration message to a fourth latency.

The fourth latency information is a value obtained after the UPF network element adds a latency of transmitting the flow from the UPF to a next-hop bridge in the TSN to the second latency information. If a next hop of the UPF is the flow service recipient, the fourth latency information is a value obtained after the UPF network element adds the second latency information and a latency of transmitting the flow from the UPF to the flow service recipient.

It should be understood that an execution sequence of S1204 is not limited in the communication method in this embodiment of this application. For example, S1204 may be performed before S1203.

It should be understood that an execution sequence of S1205 is not limited in the communication method in this embodiment of this application, provided that S1205 is performed after S1204.

It should be understood that an execution sequence of S1206 is not limited in the communication method in this embodiment of this application, provided that S1206 is performed before S1203 and before S1207.

Figure 13:
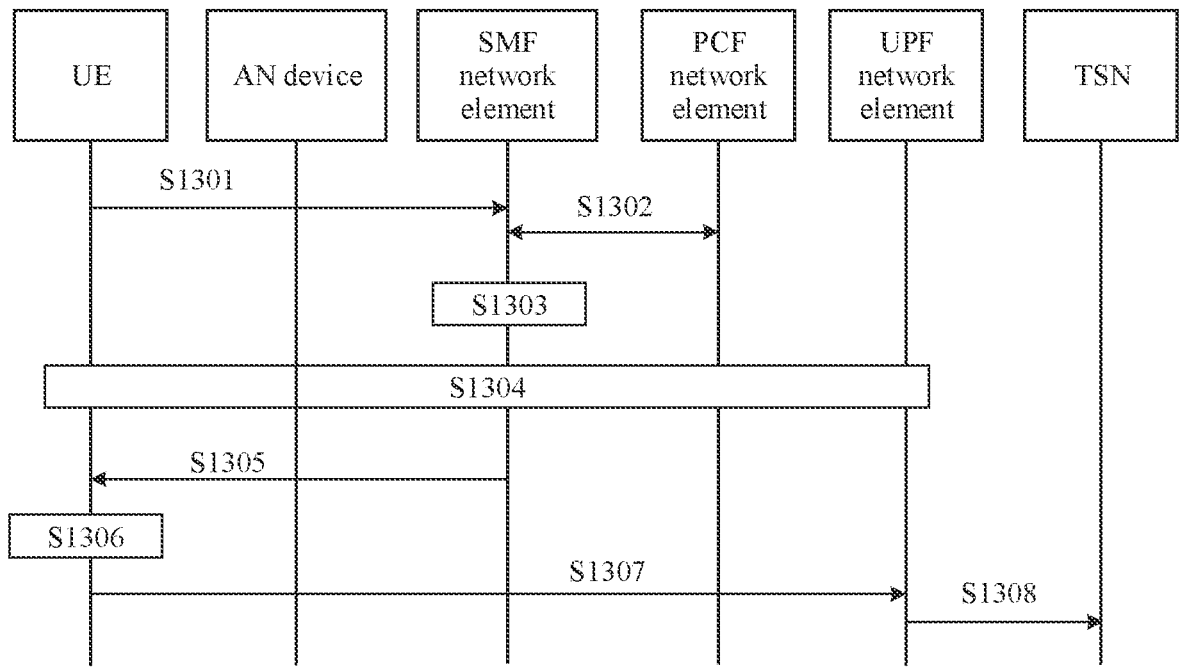
FIG. 13 is a schematic flowchart of a communication method according to another embodiment of this application.

A schematic flowchart of a communication method according to another embodiment of this application is shown in FIG. 13. It should be understood that FIG. 13 shows steps or operations of the communication method, but these steps or operations are merely examples. In this embodiment of this application, other operations or variations of the operations in FIG. 13 may be further performed. In addition, the steps in FIG. 13 may be performed in a sequence different from that presented in FIG. 13, and possibly, not all the operations in FIG. 13 need to be performed.

For S1301 to S1303, refer to S1201 to S1203. Details are not described herein again.

S1304: The SMF network element determines, according to the PCC rule corresponding to the flow, whether a session modification procedure or a session establishment procedure can be triggered for the flow, to establish a corresponding QoS flow for the flow. If the SMF network element determines, according to the PCC rule corresponding to the flow, that the corresponding QoS flow can be established for the flow, S1305 may be performed; otherwise, the communication method in FIG. 7 may be performed.

That the SMF network element determines, according to the PCC rule corresponding to the flow, whether the corresponding QoS flow can be established for the flow may be understood as follows: The SMF network element determines, according to the PCC rule corresponding to the flow, whether a core network and a radio access network can meet a bandwidth requirement and a latency requirement of the flow.

S1305: The SMF network element sends first latency information to the UE. Correspondingly, the UE receives the first latency information from the SMF network element. For this step, refer to S1208. Details are not described herein again.

For S1306 to S1308, refer to S1209 to S1211. Details are not described herein again.

Figure 14:
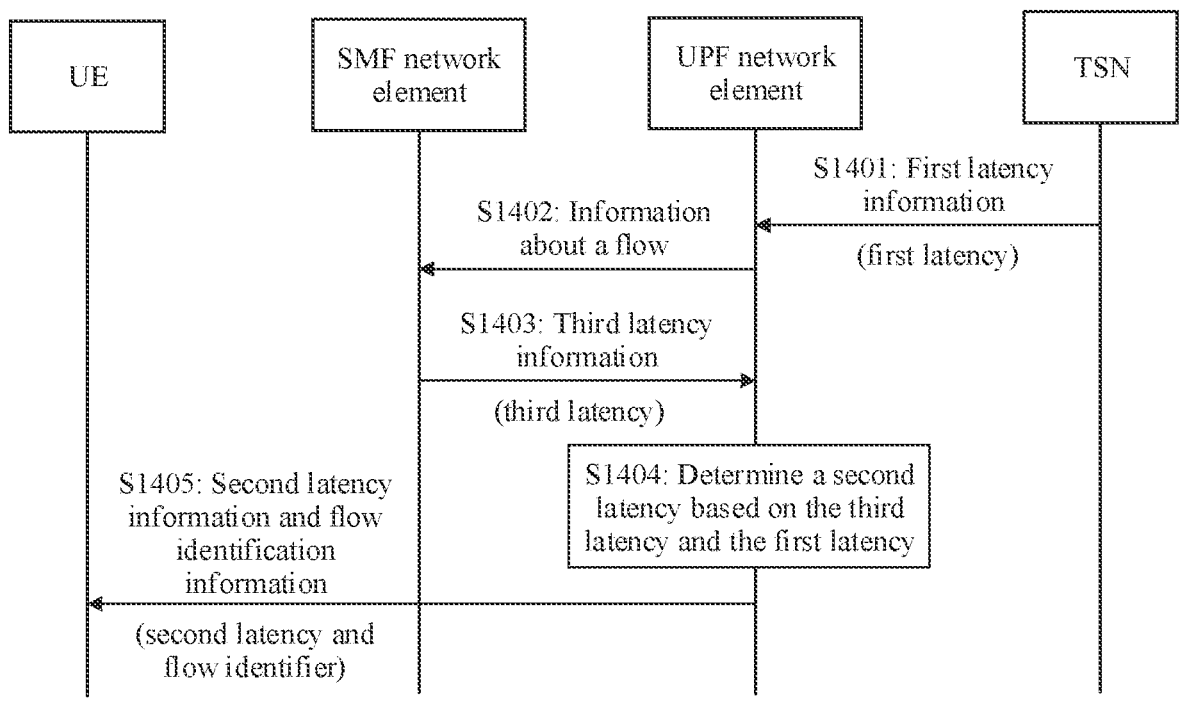
FIG. 14 is a schematic flowchart of a communication method according to another embodiment of this application.

A schematic flowchart of a communication method according to an embodiment of this application is shown in FIG. 14. It should be understood that FIG. 14 shows steps or operations of the communication method, but these steps or operations are merely examples. In this embodiment of this application, other operations or variations of the operations in FIG. 14 may be further performed.

S1401: A UPF network element receives first latency information of a flow from a TSN, where the first latency information is used to indicate a first latency of transmitting the flow from a flow service provider in the TSN to the UPF network element.

For this step, refer to S201. Details are not described herein again.

S1402: The UPF network element sends information about the flow to an SMF network element. Correspondingly, the SMF network element receives the information about the flow from the UPF network element.

The information about the flow includes at least one of the following: an identifier ID of the flow, a source address and a destination address of the flow, a size of a maximum frame used for transmitting the flow, an interval between frames used for transmitting the flow, a priority of the flow, a maximum allowable latency of transmitting a single frame of the flow from a talker to a listener, or a reliability requirement of the flow.

For example, the UPF network element may forward, to the SMF network element, the flow service provider broadcast declaration message that is received by the UPF network element from the TSN in S1401.

S1403: The SMF network element sends third latency information to the UPF network element based on the information about the flow, where the third latency information is used to indicate a third latency of transmitting the flow from the UPF network element to UE. The third latency may be a maximum transmission latency of transmitting the flow from the UPF network element to the UE. Correspondingly, the UPF network element receives the third latency information from the SMF network element. For example, after receiving the information about the flow from the UE, the SMF network element obtains a PCC rule of the flow based on the information about the flow, determines, according to the PCC rule of the flow, a 5QI corresponding to the flow, and further determines a PDB that is between the UPF and the UE and that corresponds to the 5QI, where the PDB is used as a maximum transmission latency of transmitting the flow from the UPF network element to the UE, and sends the third latency information to the UPF network element.

Alternatively, after receiving information about the flow from the UE, the SMF network element obtains the PCC rule of the flow based on the information about the flow, determines, according to the PCC rule of the flow, the 5QI corresponding to the flow, and sends the 5QI to the UPF. The UPF determines, based on the 5QI, the PDB that is between the UPF and the UE and that corresponds to the 5QI. The PDB is used as the maximum transmission latency of transmitting the flow from the UPF network element to the UE. For an implementation in which the SMF network element obtains the PCC rule of the flow, refer to S303. For an implementation in which the SMF network element determines the maximum transmission latency according to the PCC rule, refer to S304. Details are not described herein again.

For example, the SMF network element may send the flow service provider broadcast declaration message to the UPF network element, and the message carries the third latency information.

The UE may be the UE 101 in FIG. 1.

S1404: The UPF network element determines, based on the first latency indicated by the first latency information and the third latency indicated by the third latency information, a second latency of transmitting the flow from the flow service provider in the TSN to the UE.

For this step, refer to an implementation in which the SMF network element determines the second latency in S204. Details are not described herein again.

S1405: The UPF network element sends second latency information and identification information of the flow to the UE.

For example, the UPF network element may send the flow service provider broadcast declaration message to the UE, and the message carries the second latency information and the identification information of the flow. The identification information of the flow is used to indicate an identifier of the flow.

It should be understood that S1405 is not a step that needs to be performed. In other words, the UPF network element may not send the second latency information to the UE.

Optionally, the UPF network element may send the second latency information to the TSN. For example, the UPF network element may send a flow service recipient ready message to the TSN, and the message carries the second latency information and the identification information of the flow.

In the communication method, the UPF network element uses, as an accumulated latency of transmitting the flow from the UPF network element to the UE, the maximum transmission latency that is determined by the SMF network element and that is of transmitting the flow from the UPF network element to the UE. However, in the prior art, clock synchronization needs to be performed between every two adjacent nodes between the UPF network element and the UE, and finally, clock synchronization between all nodes between the UPF network element and the UE is implemented, to support the TSN network on all transmission nodes between the UPF network element and the UE, so as to calculate the accumulated latency of transmitting the flow from the UPF network element to the UE. Compared with that in the prior art, the solution for the communication method is simple and easy to implement.

Figure 15:
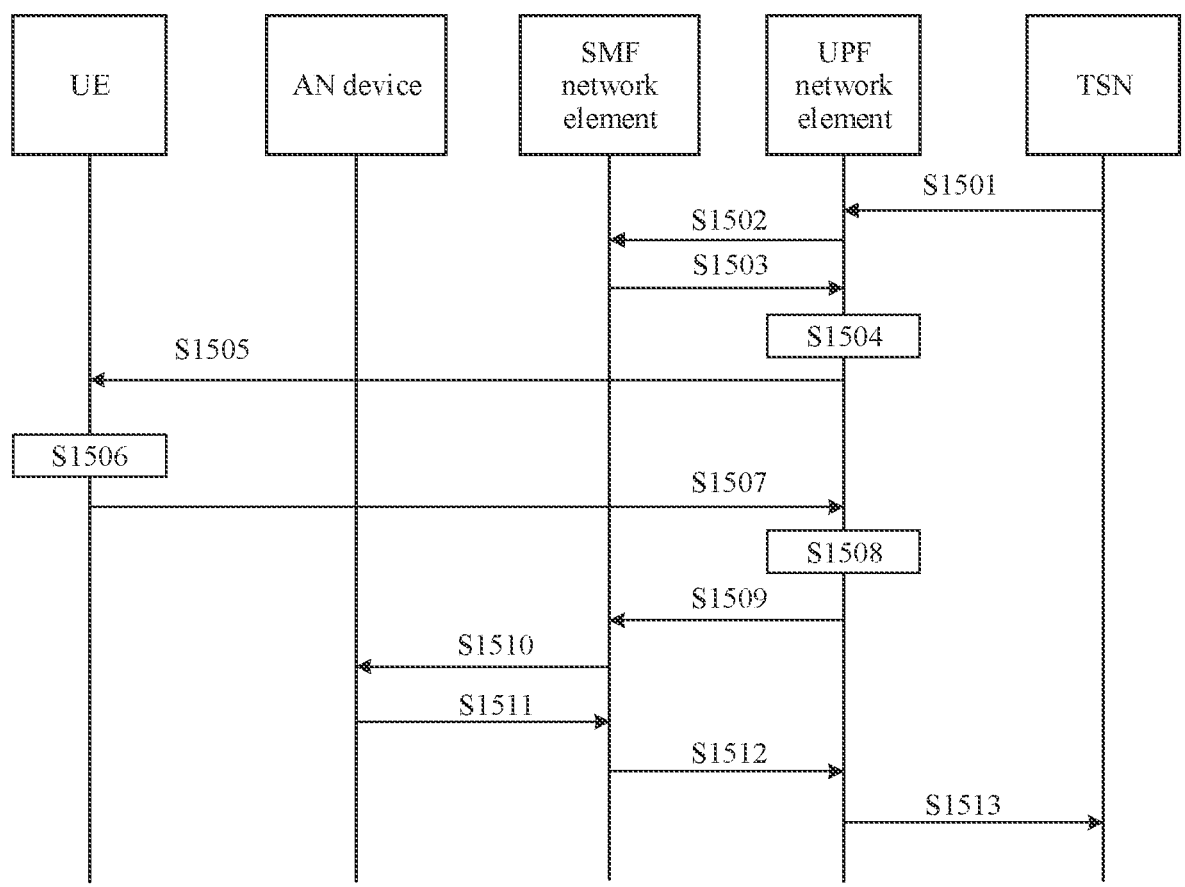
FIG. 15 is a schematic flowchart of a communication method according to another embodiment of this application.

A schematic flowchart of a communication method according to another embodiment of this application is shown in FIG. 15. It should be understood that FIG. 15 shows steps or operations of the communication method, but these steps or operations are merely examples. In this embodiment of this application, other operations or variations of the operations in FIG. 15 may be further performed. In addition, the steps in FIG. 15 may be performed in a sequence different from that presented in FIG. 15, and possibly, not all operations in FIG. 15 need to be performed.

S1501: A UPF network element receives first latency information from a TSN, where the first latency information is used to indicate a first latency of transmitting a flow from a flow service provider in the TSN to the UPF network element.

For this step, refer to S201. Details are not described herein again.

S1502: The UPF network element sends information about the flow to an SMF network element. Correspondingly, the SMF network element receives the information about the flow from the UPF network element.

For this step, refer to S1402. Details are not described herein again.

S1503: The SMF network element sends third latency information to the UPF network element based on the information about the flow, where the third latency information is used to indicate a maximum transmission latency of transmitting the flow from the UPF network element to UE. Correspondingly, the UPF network element receives the third latency information from the SMF network element.

For this step, refer to S1403. Details are not described herein again.

S1504: The UPF network element determines, based on the maximum transmission latency in S1503 and the first latency indicated by the first latency information, a second latency of transmitting the flow from the flow service provider in the TSN to the UE.

For this step, refer to S204. Details are not described herein again.

S1505: The UPF network element sends second latency information and identification information of the flow to the UE, where the second latency information is used to indicate the second latency. Correspondingly, the UE receives the second latency information from the UPF network element, and the identification information of the flow is used to indicate an identifier of the flow.

For example, the UPF network element may modify, to the second latency information, the first latency information that is in the flow service provider broadcast declaration message and that is received by the UPF network element from the TSN, to modify the first latency recorded in the flow service provider broadcast declaration message to the second latency. Then, the UPF network element may send, to the UE, a flow service provider broadcast declaration message obtained after modification.

S1506: The UE determines, based on the second latency information received in S1505, whether the second latency can meet a latency requirement of the flow.

For this step, refer to S309. Details are not described herein again.

S1507: The UE sends a message to the UPF network element, to indicate that the UE can receive the flow. The message may include the identification information of the flow. Optionally, the message may further include the second latency information.

For this step, refer to S310. Details are not described herein again.

S1508: The UPF network element reserves a bandwidth resource for the flow based on a bandwidth requirement of the flow. The bandwidth requirement of the flow may be received by the UPF network element from the SMF network element. The SMF network element may determine the bandwidth requirement of a flow according to a PCC rule of the flow.

Optionally, S1508 may not be performed in the communication method in this embodiment of this application. In other words, the bandwidth resource does not need to be reserved for the flow on the UPF network element in advance.

S1509: If the UPF network element successfully reserves the bandwidth resource for the flow, the UPF network element sends, to the SMF network element, information indicating that the UPF network element successfully reserves the bandwidth resource, so that the SMF network element sends bandwidth requirement information of the flow to an AN device corresponding to the UE. In addition, the UPF network element may further update a credit scheduling parameter of the UPF network element.

The UPF network element reserves the bandwidth resource for the flow based on the bandwidth requirement information of the flow. In this way, when the flow is transmitted to the UPF network element, the UPF network element may have a corresponding bandwidth resource to transmit the flow, thereby improving transmission reliability of the flow.

S1510: The SMF network element sends the bandwidth requirement information of the flow to the AN device corresponding to the UE, to indicate the AN device to reserve the bandwidth resource for the flow.

For this step, refer to S313. Details are not described herein again.

Optionally, S1510 may not be performed in the communication method in this embodiment of this application. In other words, the bandwidth resource does not need to be reserved for the flow on the AN device in advance.

If S1510 is not performed in the communication method in this embodiment of this application, correspondingly, S1511 and S1512 may not be performed.

S1511: The AN device sends first information to the SMF network element, where the first information is used to indicate whether the access network device successfully reserves the bandwidth resource for the flow based on the bandwidth requirement information of the flow.

Optionally, in the communication method, when S1510 is performed, S1511 and S1512 may not be performed.

S1512: If the SMF network element receives the first information from the AN device, the SMF network element sends the first information to the UPF network element.

S1513: The UPF network element sends the identification information of the flow and the second latency information to the TSN.

For example, the UPF network element may send, to the TSN, the flow service recipient ready message, and the flow service recipient ready message carries the identification information of the flow and the second latency information.

If S1512 is performed in the communication method, the UPF network element may perform S1513 after the UPF network element receives the first information from the SMF network element, and the first information indicates that the AN device successfully reserves the resource for the flow. If the UPF network element does not receive the first information sent by the SMF, the UPF network element may perform the communication method shown in FIG. 17.

It should be understood that, in the communication method in this embodiment of this application, an execution sequence of S1508 to S1512 is not limited. For example, S1508 to S1512 may be performed before S1505 or S1504.

Figure 16:
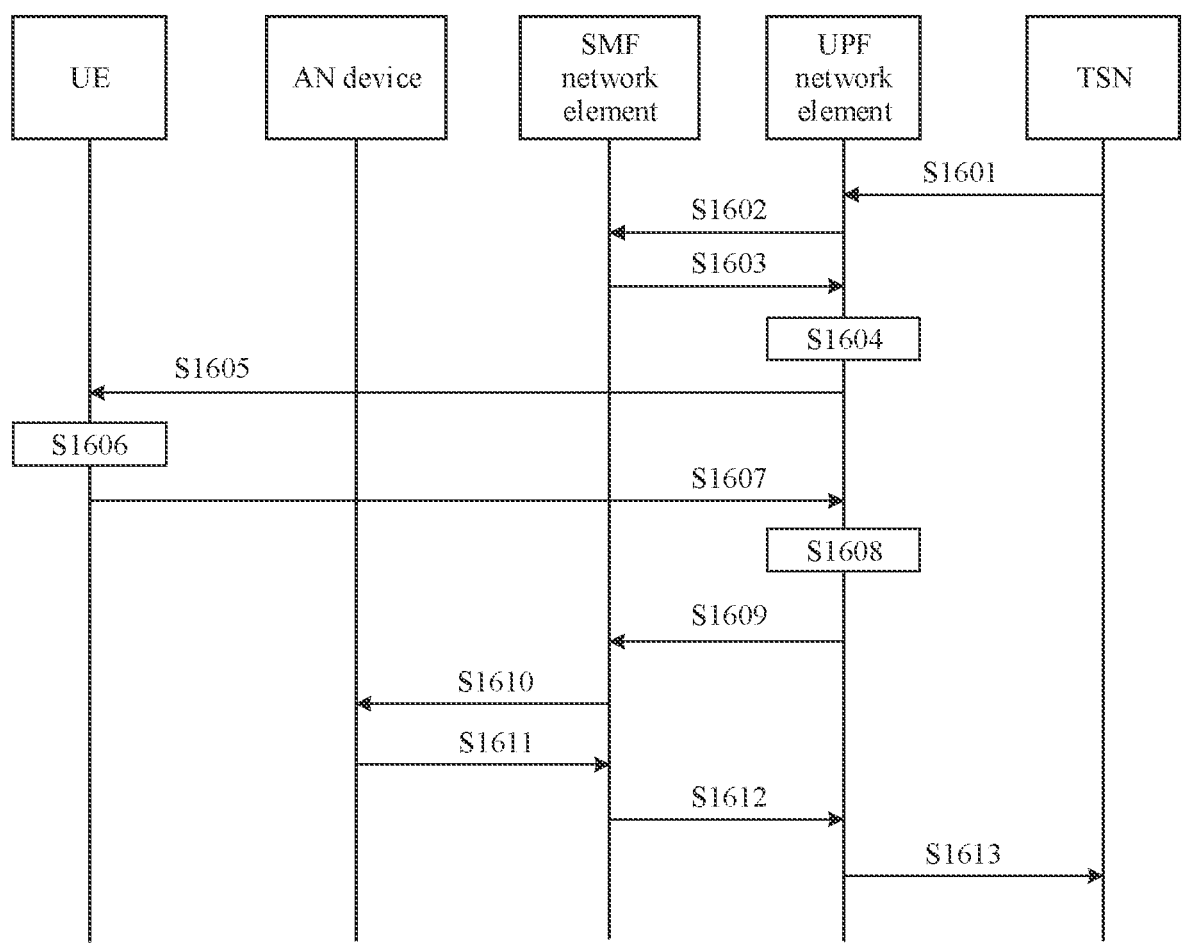
FIG. 16 is a schematic flowchart of a communication method according to another embodiment of this application.

FIG. 16 is a schematic flowchart of a communication method according to another embodiment of this application. It should be understood that FIG. 16 shows steps or operations of the communication method, but these steps or operations are merely examples. In this embodiment of this application, other operations or variations of the operations in FIG. 16 may be further performed. In addition, the steps in FIG. 16 may be performed in a sequence different from that presented in FIG. 16, and possibly, not all operations in FIG. 16 need to be performed.

S1601: A UPF network element receives first latency information from a TSN, where the first latency information is used to indicate a first latency of transmitting a flow from a flow service provider in the TSN to the UPF network element.

For this step, refer to S201. Details are not described herein again.

S1602: The UPF network element sends information about the flow to an SMF network element. Correspondingly, the SMF network element receives the information about the flow from the UPF network element.

For this step, refer to S202. Details are not described herein again.

S1603: The SMF network element sends third latency information to the UPF network element based on the information about the flow, where the third latency information is used to indicate a maximum transmission latency of transmitting the flow from the UPF network element to UE. Correspondingly, the UPF network element receives the third latency information from the SMF network element.

For this step, refer to S1403. Details are not described herein again.

S1604: The UPF network element determines, based on the maximum transmission latency in S1603 and the first latency indicated by the first latency information, a second latency of transmitting the flow from the flow service provider in the TSN to the UE.

For this step, refer to S204. Details are not described herein again.

S1605: The UPF network element sends identification information of the flow to the UE. Correspondingly, the UE receives the identification information of the flow from the UPF network element.

For this step, refer to S608. Details are not described herein again.

S1606: The UE determines, based on the identification information that is of the flow and that is received in S1605, whether the UE is interested in the flow. For this step, refer to S609. Details are not described herein again.

S1607: The UE sends a message to the UPF network element, to indicate that the UE can receive the flow. The message may include the identification information of the flow.

For this step, refer to S610. Details are not described herein again.

S1608: The UPF network element reserves a bandwidth resource for the flow based on a bandwidth requirement of the flow. The bandwidth requirement of the flow may be received by the UPF network element from the SMF network element. The SMF network element may determine the bandwidth requirement of a flow according to a PCC rule of the flow.

Optionally, S1608 may not be performed in the communication method in this embodiment of this application. In other words, the bandwidth resource does not need to be reserved for the flow on the UPF network element in advance.

S1609: If the UPF network element successfully reserves the bandwidth resource for the flow, the UPF network element sends, to the SMF network element, information indicating that the UPF network element successfully reserves the bandwidth resource, so that the SMF network element sends bandwidth requirement information of the flow to an AN device corresponding to the UE. In addition, the UPF network element may further update a credit scheduling parameter of the UPF network element.

The UPF network element reserves the bandwidth resource for the flow based on the bandwidth requirement information of the flow. In this way, when the flow is transmitted to the UPF network element, the UPF network element may have a corresponding bandwidth resource to transmit the flow, thereby improving transmission reliability of the flow.

S1610: The SMF network element sends the bandwidth requirement information of the flow to the AN device corresponding to the UE, to indicate the AN device to reserve the bandwidth resource for the flow.

For this step, refer to S313. Details are not described herein again.

Optionally, S1610 may not be performed in the communication method in this embodiment of this application. In other words, the bandwidth resource does not need to be reserved for the flow on the AN device in advance.

If S1610 is not performed in the communication method in this embodiment of this application, correspondingly, S1611 and S1612 may not be performed.

S1611: The AN device sends first information to the SMF network element, where the first information is used to indicate whether the access network device successfully reserves the bandwidth resource for the flow based on the bandwidth requirement information of the flow.

Optionally, in the communication method, when S1610 is performed, S1611 and S1612 may not be performed.

S1612: If the SMF network element receives the first information from the AN device, the SMF network element sends the first information to the UPF network element.

S1613: The UPF network element sends the identification information of the flow and the second latency information to the TSN.

For example, the UPF network element may send, to the TSN, the flow service recipient ready message, and the flow service recipient ready message carries the identification information of the flow and the second latency information.

If S1612 is performed in the communication method, the UPF network element may perform S1613 after the UPF network element receives the first information from the SMF network element, and the first information indicates that the AN device successfully reserves the resource for the flow. If the UPF network element does not receive the first information sent by the SMF, the UPF network element may perform the communication method shown in FIG. 17.

It should be understood that, in the communication method in this embodiment of this application, an execution sequence of S1608 to S1612 is not limited. For example, S1608 to S1612 may be performed before S1605 or S1604.

Figure 17:
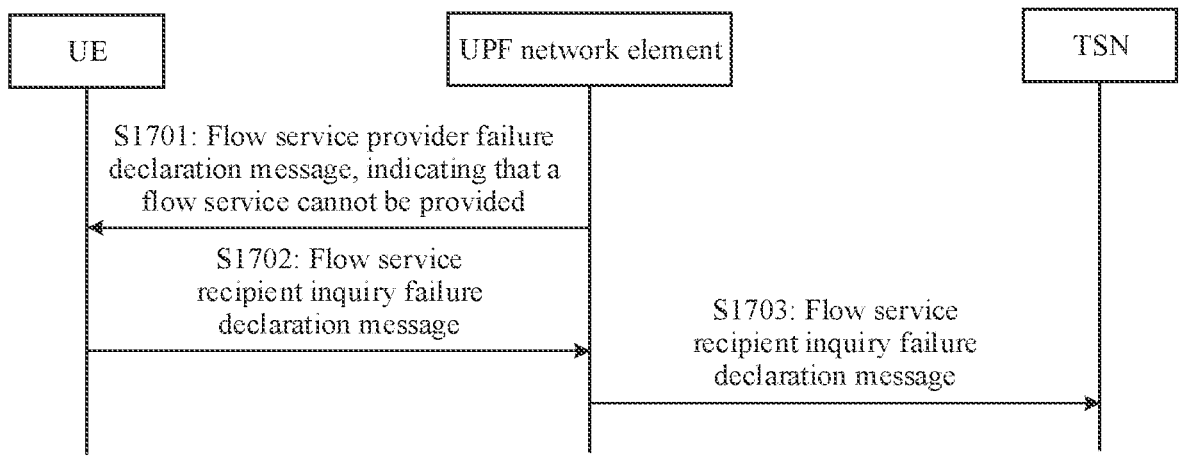
FIG. 17 is a schematic flowchart of a communication method according to another embodiment of this application.

FIG. 17 is a schematic flowchart of a communication method according to another embodiment of this application. It should be understood that FIG. 17 shows steps or operations of the communication method, but these steps or operations are merely examples. In this embodiment of this application, other operations or variations of the operations in FIG. 17 may be further performed. In addition, the steps in FIG. 17 may be performed in a sequence different from that presented in FIG. 17, and possibly, not all operations in FIG. 17 need to be performed.

S1701: A UPF network element sends a flow service provider failure declaration message to UE, where the message is used to indicate that a flow service cannot be provided due to a bandwidth limitation or another limitation.

For example, when determining that the UPF network element or an AN device cannot reserve a bandwidth resource for a flow or cannot meet a QoS requirement of the flow, the UPF network element may send the flow service provider failure declaration message to the UE.

For example, when a flow with a higher priority needs to be transmitted, or after UE moves and is handed over to a new base station, an output port corresponding to the UPF network element changes, and consequently, the output port exceeds an upper limit of reservation. Alternatively, when a PCF does not allow a bandwidth resource to be reserved for the flow, the UPF network element may determine that the QoS requirement of the flow cannot be met.

S1702: The UE initiates a flow service recipient request failure declaration message to the UPF network element.

S1703: The UPF network element forwards the flow service provider request failure declaration to a flow service provider in a TSN.

A function of the flow service recipient request failure declaration message is to notify the flow service provider in the TSN of a resource reservation failure and a cause of the failure.

It should be understood that message names shown in FIG. 17 are merely examples. Any message that can implement a corresponding function in the communication method falls within the protection scope of the embodiments of this application.

Figure 19:
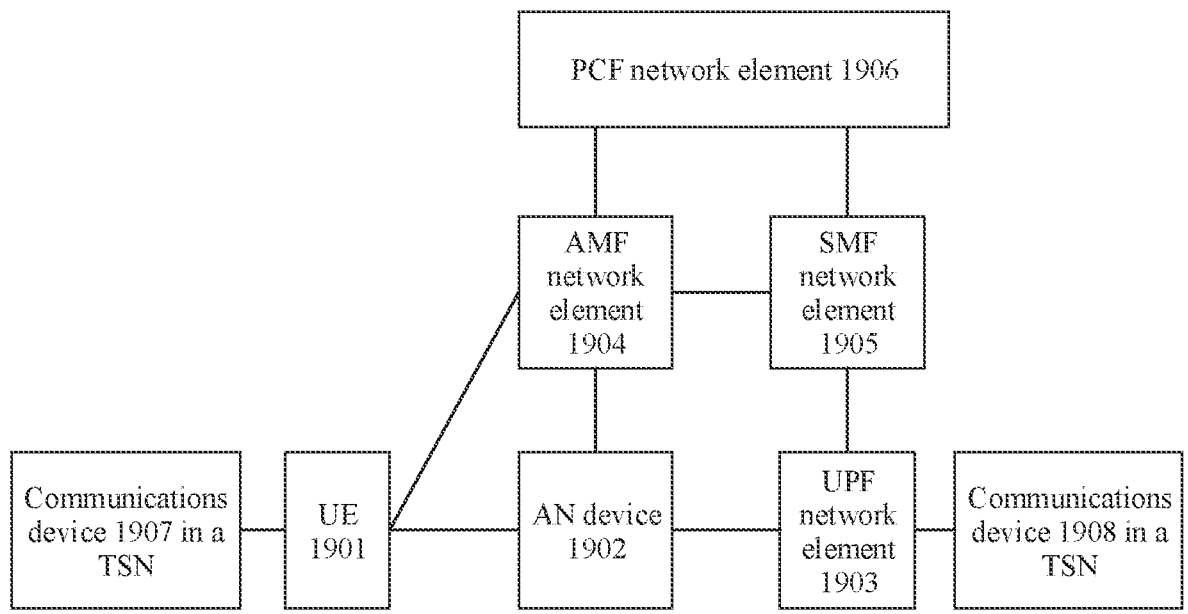
FIG. 19 is a schematic diagram of an application scenario to which a communication method according to an embodiment of this application may be applied.

As shown in FIG. 19, another application scenario to which the communication method in the embodiments of this application may be applied may include UE 1901, an access network device 1902, a UPF network element 1903, an AMF network element 1904, an SMF network element 1905, a PCF network element 1906, a communications device 1907, and a communications device 1908.

The communications device 1907 and the communications device 1908 may be respectively a flow service provider or a flow service recipient in a TSN. A communications system to which the UE 1901, the access network device 1902, the UPF network element 1903, the AMF network element 1904, the SMF network element 1905, and the PCF network element 1906 belong may be a 3GPP communications system (for example, a 5G communications system). A communications system to which the UE 1901, the access network device 1902, the UPF network element 1903, the AMF network element 1904, the SMF network element 1905, and the PCF network element 1906 belong may be used as a bridge of the TSN.

For example, when the communications device 1907 is used as the flow service provider in the TSN, and the communications device 1908 is used as the flow service recipient, the UE 1901 may be used as an input port of the bridge of the TSN, and the UPF network element 1903 may be used as an output port of the bridge of the TSN. Similarly, when the communications device 1908 is used as the flow service provider in the TSN, and the communications device 1907 is used as the flow service recipient, the UPF network element 1903 may be used as an input port of the bridge of the TSN, and the UE 1901 may be used as an output port of the bridge of the TSN. A network element or device that is in the TSN and that communicates with a communications device used as an output port in a 3GPP communications system may be referred to as a next-hop network element of the communications device used as the output port in the 3GPP communications system. The communications device 1907 may be integrated with the UE 1901.

In the application scenario shown in FIG. 19, an accumulated latency between the flow service provider and the next-hop network element of the communications device used as the output port in the 3GPP communications system needs to be calculated. For this problem, this application provides the following communication method.

Figure 20:
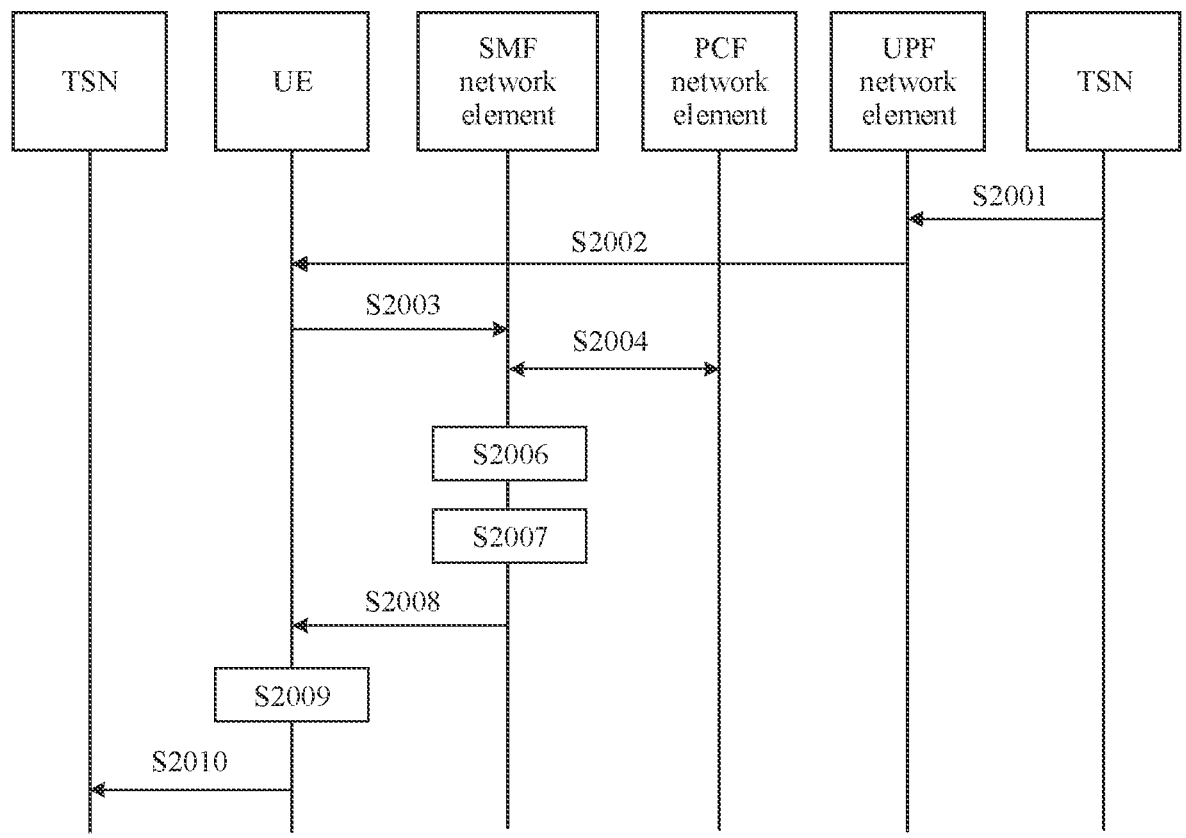
FIG. 20 is a schematic flowchart of a communication method according to another embodiment of this application.

FIG. 20 is a schematic flowchart of a communication method according to an embodiment of this application. It should be understood that FIG. 20 shows steps or operations of the communication method, but these steps or operations are merely examples. In this embodiment of this application, other operations or variations of the operations in FIG. 20 may be further performed. In addition, the steps in FIG. 20 may be performed in a sequence different from that presented in FIG. 20, and possibly, not all operations in FIG. 20 need to be performed.

S2001: A UPF network element receives first latency information from a TSN, where the first latency information is used to indicate a first latency, and the first latency is an accumulated latency of transmitting the flow from a flow service provider in the TSN to the UPF network element.

For example, the UPF network element 1903 receives a flow service provider broadcast declaration message from a network element that is in the TSN and that is used as a previous hop of the UPF network element 1903. The message may be used to broadcast a flow and a QoS requirement corresponding to the flow, and the message may include identification information of the flow and the first latency information. In this case, the first latency is an accumulated latency of transmitting the flow from the communications device 1908 used as the flow service provider to the UPF network element 1903. The previous-hop network element of the UPF network element 1903 may be the communications device 1908, or may be a device or a network element between the UPF network element 1903 and the communications device 1908.

Optionally, the message may further include one or more of the following information: a destination address, a source address, a maximum frame size, a maximum frame interval, a priority of a frame, a maximum allowable latency of transmitting a single frame of the flow from the flow service provider to a flow service recipient, a reliability requirement of the flow, or a resource reservation failure cause.

It should be understood that, in this embodiment of this application, for ease of description, all information other than the first latency information in information related to the flow is referred to as information about the flow. For example, the destination address, the source address, the maximum frame size, the maximum frame interval, the priority of the frame, the maximum allowable latency of transmitting the single frame of the flow from the flow service provider to the flow service recipient, the reliability requirement of the flow, the resource reservation failure cause, an identifier of the flow, a QoS parameter of the flow, or the like is referred to as the information about the flow.

S2002: The UPF network element sends the first latency information to UE. Correspondingly, the UE receives the first latency information from the UPF network element.

For example, after receiving the flow service provider broadcast declaration message from the TSN, the UPF network element 1903 forwards the flow service provider broadcast declaration message to the UE 1901. The flow service provider broadcast declaration message carries the first latency information and the information about the flow.

For example, after receiving the flow service provider broadcast declaration message from the TSN, the UPF network element 1903 obtains the first latency information and the information about the flow that are in the flow service provider broadcast declaration message, and sends the first latency information and the information about the flow to the UE 1901.

S2003: The UE sends the first latency information to an SMF network element. Correspondingly, the SMF network element receives the first latency information from the UE.

For example, after receiving the flow service provider broadcast declaration message from the UPF network element 1903, the UE 1901 forwards the flow service provider broadcast declaration message to the SMF network element 1905. The flow service provider broadcast declaration message carries the first latency information and the information about the flow.

For example, after receiving the flow service provider broadcast declaration message from the UPF network element 1903, the UE 1901 obtains the first latency information and the information about the flow that are in the flow service provider broadcast declaration message, and sends the first latency information and the information about the flow to the SMF network element 1905.

S2004: The SMF network element obtains, from a PCF network element, a PCC rule corresponding to the flow.

For example, the SMF network element sends the information about the flow to the PCF network element. The information about the flow may include identification information of the flow, a QoS parameter of the flow, or the like. Correspondingly, the PCF network element receives the information about the flow from the SMF network element.

Then, the PCF network element sends the PCC rule corresponding to the flow to the SMF network element. Correspondingly, the SMF network element receives the PCC rule corresponding to the flow from the PCF network element.

It should be understood that S2004 is not a step that needs to be performed. This step is performed to enable the SMF network element to obtain the PCC rule corresponding to the flow. An implementation in which the SMF network element obtains the PCC rule corresponding to the flow is not limited in this embodiment of this application.

S2006: The SMF network element determines a first target latency according to the PCC rule corresponding to the flow, and the first target latency is a transmission latency of the flow from the UPF network element to the UE.

In this embodiment of this application, the first target latency may also be referred to as an accumulated latency of transmitting the flow between the UPF network element and the UE.

An example of the first target latency may be a maximum transmission latency of the flow from the UPF network element to the UE. For example, the SMF network element may determine the maximum transmission latency of the flow from the UPF network element to the UE based on a 5QI in the PCC rule. For example, the SMF network element may use a PDB that is between the UPF and the UE and that corresponds to the 5QI as the maximum transmission latency of transmitting the flow from the UPF to the UE.

Optionally, after obtaining the PCC rule, the SMF network element may trigger a packet data unit (PDU) session modification process, to establish a QoS flow for the flow, to reserve a resource for the flow.

S2007: The SMF network element determines a second latency based on the first latency and the first target latency, where the second latency is a transmission latency of the flow from the flow service provider to the UE.

For example, the SMF network element determines the second latency based on the first latency indicated by the first latency information carried in the flow service provider broadcast declaration message and the maximum transmission latency that is determined in S2006.

If the first latency is denoted as an accumulated latency 1, the first target latency is denoted as T1, and the second latency is denoted as an accumulated latency 2, the accumulated latency 2=the accumulated latency 1+T1.

S2008: The SMF network element sends second latency information to the UE, where the second latency information is used to indicate the second latency. Correspondingly, the UE receives the second latency information from the SMF network element.

For example, the SMF network element modifies, to the second latency information, the first latency information that is in the flow service provider broadcast declaration message and that is received by the SMF network element from the UE, and sends, to the UE, a flow service provider broadcast declaration message obtained through modification.

Alternatively, the SMF network element sends the second latency information to the UE through another message.

S2009: The UE determines a third latency based on the second latency and a second target latency, where the second target latency is a latency of transmitting the flow from the UE to a target network element that is in the TSN network and that is used as a next hop of the UE, and the third latency is a latency of transmitting the flow from the flow service provider to the target network element that is in the TSN and that is used as the next hop of the UE.

For example, the second target latency is an accumulated transmission latency of the flow from the UE 1901 to the target network element that is in the TSN and that is used as the next hop of the UE. The third latency is an accumulated transmission latency of the flow from the communications device 108 to the next-hop network element. The next-hop network element may be the communications device 1907 or may be a communications device between the UE 1901 and the communications device 1907.

An implementation in which the UE determines the third latency based on the second latency and the second target latency may include: The UE adds the second target latency to the second latency. For example, if the second target latency is denoted as T2, the second latency is denoted as an accumulated latency 2, and the third latency is denoted as an accumulated latency 3, the accumulated latency 3=the accumulated latency 2+T2.

The second target latency may be obtained by the UE from the target network element, or may be configured. A manner in which the UE obtains the second target latency is not limited in this embodiment of this application.

S2010: The UE sends third latency information to the target network element that is in the TSN and that is used as the next hop of the UE, where the third latency information is used to indicate the third latency.

For example, the UE modifies, to the third latency information, the first latency information that is in the flow service provider broadcast declaration message and that is received by the UE from the UPF network element, or the UE modifies, to the third latency information, the second latency information that is in the flow service provider broadcast declaration message and that is received by the UE from the SMF network element, and sends, to the target network element, a flow service provider broadcast declaration message obtained through modification.

If the target network element is the flow service recipient, the target network element may determine whether the target network element is interested in the flow, and if the target network element is interested in the flow, determine whether the third latency can meet a latency requirement of the flow. If the third latency can meet the latency requirement of the flow, the target network element sends the third latency information to the UE.

For example, the target network element sends, to the UE, a flow service recipient ready message, and the flow service recipient ready message includes the identification information of the flow and the third latency information. Then, the UE may forward the flow service recipient ready message to the UPF network element, and then the UPF network element forwards the flow service recipient ready message to a next-hop network element of the UPF network element in the TSN.

In the communication method shown in FIG. 20, the SMF network element learns, from the UE, of the first latency of the flow from the flow service provider to the UPF network element, determines, according to the PCC rule of the flow, the first target latency of transmitting the flow between the UPF network element and the UE, determines, based on the first latency and the first target latency, the second latency of transmitting the flow from the flow service provider to the UE, and notifies the UE of the second latency. Then, the UE determines, based on the second latency and the second target latency of the flow from the UE to the network element that is in the TSN and that is used as the next hop of the UE, the third latency of the flow from the flow service provider to the next-hop network element.

It should be understood that names of messages shown in FIG. 20 are merely examples. Any message that can implement a corresponding function in the communication method falls within the protection scope of the embodiments of this application.

In the communication method shown in FIG. 20, an accumulated latency of transmitting the flow from the flow service provider to the target network element that is in the TSN network and that is used as the next hop of the UE may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In addition, in the communication method shown in FIG. 20, a 3GPP system is considered as a bridge in the TSN network, and may receive a flow reservation protocol message (an SRP message) from a node that is in the TSN network and that is used as a previous node of the bridge, provide a method for processing the SRP message, and send the SRP message to a node that is in the TSN and that is used as a next hop of the bridge, so that a latency requirement of a URLLC service flow can be ensured and a bandwidth resource can be reserved in a scenario in which the 3GPP network interworks with the TSN network.

Figure 21:
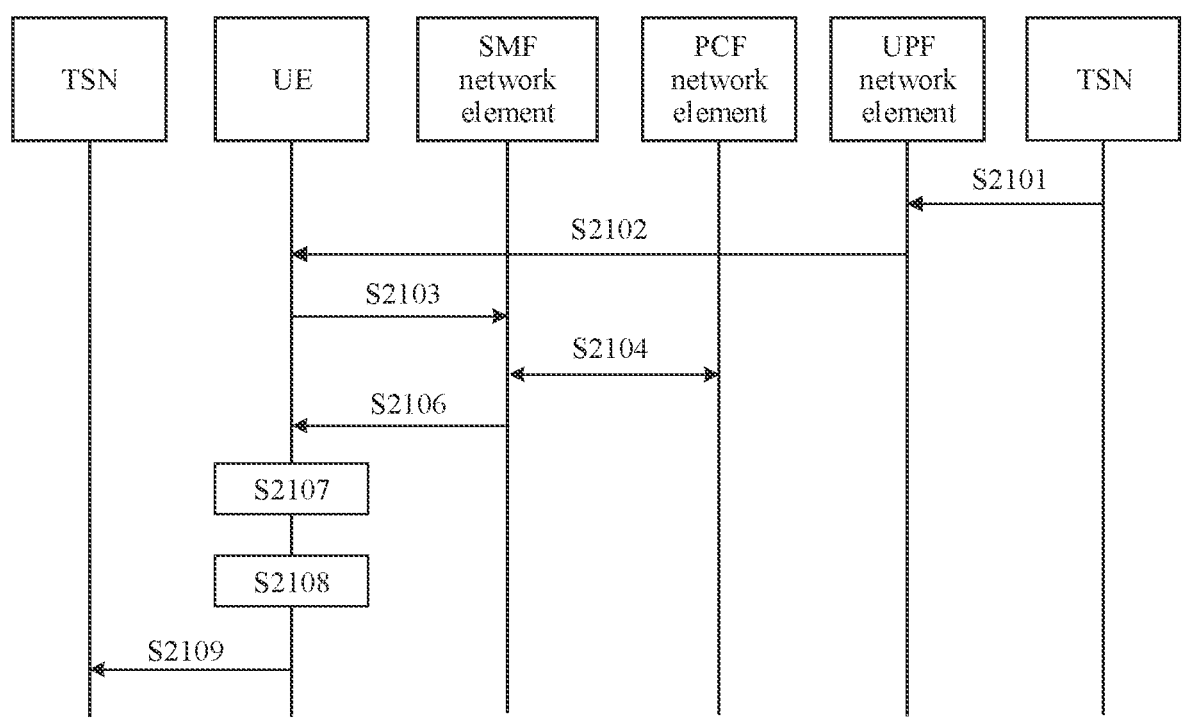
FIG. 21 is a schematic flowchart of a communication method according to another embodiment of this application.

FIG. 21 is a schematic flowchart of a communication method according to an embodiment of this application. It should be understood that FIG. 21 shows steps or operations of the communication method, but these steps or operations are merely examples. In this embodiment of this application, other operations or variations of the operations in FIG. 21 may be further performed. In addition, the steps in FIG. 21 may be performed in a sequence different from that presented in FIG. 21, and possibly, not all operations in FIG. 21 need to be performed.

S2101: A UPF network element receives first latency information from a TSN, where the first latency information is used to indicate a first latency, and the first latency is an accumulated latency of transmitting a flow from a flow service provider in the TSN to the UPF network element.

For example, the UPF network element 1903 receives a flow service provider broadcast declaration message from a network element that is in the TSN and that is used as a previous hop of the UPF network element 1903. The message may be used to broadcast a flow and a QoS requirement corresponding to the flow, and the message includes identification information of the flow and the first latency information. In this case, the first latency is an accumulated latency of transmitting the flow from the communications device 1908 used as the flow service provider to the UPF network element 1903. The previous-hop network element of the UPF network element 1903 may be the communications device 1908, or may be a device or a network element between the UPF network element 1903 and the communications device 1908.

Optionally, the message may further include one or more of the following information: a destination address, a source address, a maximum frame size, a maximum frame interval, a priority of a frame, a maximum allowable latency of transmitting a single frame of the flow from the flow service provider to a flow service recipient, a reliability requirement of the flow, or a resource reservation failure cause.

It should be understood that, in this embodiment of this application, for ease of description, all information other than the first latency information in information related to the flow is referred to as information about the flow. For example, the destination address, the source address, the maximum frame size, the maximum frame interval, the priority of the frame, the maximum allowable latency of transmitting the single frame of the flow from the flow service provider to the flow service recipient, the reliability requirement of the flow, the resource reservation failure cause, an identifier of the flow, a QoS parameter of the flow, or the like is referred to as the information about the flow.

S2102: The UPF network element sends the first latency information to UE. Correspondingly, the UE receives the first latency information from the UPF network element.

For example, after receiving the flow service provider broadcast declaration message from the TSN, the UPF network element 1903 forwards the flow service provider broadcast declaration message to the UE 1901. The flow service provider broadcast declaration message carries the first latency information and the information about the flow.

For example, after receiving the flow service provider broadcast declaration message from the TSN, the UPF network element 1903 obtains the first latency information and the information about the flow that are in the flow service provider broadcast declaration message, and sends the first latency information and the information about the flow to the UE 1901.

S2103: UE sends information about a flow to an SMF network element. Correspondingly, the SMF network element receives the information about the flow from the UE.

For example, after receiving the flow service provider broadcast declaration message from the UPF network element 1903, the UE 1901 forwards the flow service provider broadcast declaration message to the SMF network element 1905. The flow service provider broadcast declaration message carries the information about the flow.

For example, after receiving the flow service provider broadcast declaration message from the UPF network element 1903, the UE 1901 obtains the information about the flow in the flow service provider broadcast declaration message, and sends the information about the flow to the SMF network element 1905.

S2104: The SMF network element obtains, from a PCF network element, a PCC rule corresponding to the flow.

For example, the SMF network element sends the information about the flow to the PCF network element. The information about the flow may include identification information of the flow and the like. Correspondingly, the PCF network element receives the information about the flow from the SMF network element.

The PCF network element sends the PCC rule corresponding to the flow to the SMF network element. Correspondingly, the SMF network element receives the PCC rule corresponding to the flow from the PCF network element.

It should be understood that S2104 is not a step that needs to be performed. This step is performed to enable the SMF network element to obtain the PCC rule corresponding to the flow. An implementation in which the SMF network element obtains the PCC rule corresponding to the flow is not limited in this embodiment of this application.

S2106: The SMF network element sends, to the UE according to the PCC rule, a quality of service parameter corresponding to the flow. Correspondingly, the UE network element receives the quality of service parameter from the SMF network element.

For example, the SMF network element determines, according to the PCC rule, a 5QI corresponding to the flow, or determines a PDB between the UPF network element and the UE according to the PCC rule, and sends the 5QI or the PDB to the UE. Alternatively, the SMF network element sends, to the UE, QoS flow identification information corresponding to the flow.

Optionally, after obtaining the PCC rule, the SMF network element may trigger a PDU session modification process, to establish a QoS flow for the flow, to reserve a resource for the flow.

S2107: The UE determines a first target latency based on the quality of service parameter corresponding to the flow, where the first target latency is a latency of transmitting the flow between the UPF network element and the UE.

An example of the first target latency may be a maximum transmission latency of the flow from the UPF network element to the UE. For example, the UE may determine the maximum transmission latency of the flow from the UPF network element to the UE based on the 5QI, the PDB, or the QoS flow identification information received from the SMF network element.

For example, if the UE obtains the PDB from the SMF network element, the UE may use the PDB as the first target latency.

For example, if the UE obtains the QoS flow identification information from the SMF network element, the UE may obtain a PDB in a corresponding QoS parameter based on the QoS flow identification information, and use the PDB as the first target latency.

For example, if the UE obtains the 5QI corresponding to the flow from the SMF network element, the UE may obtain the PDB in the corresponding QoS parameter based on the 5QI, and use the PDB as the first target latency.

S2108: The UE determines a third latency based on the first latency, the first target latency, and a second target latency, where the second target latency is a latency of transmitting the flow from the UE to a target network element that is in the TSN network and that is used as a next hop of the UE, and the third latency is a latency of transmitting the flow from the flow service provider to the target network element that is in the TSN and that is used as the next hop of the UE.

If the first latency is denoted as an accumulated latency 1, the first target latency is denoted as T1, the second target latency is denoted as T2, and the third latency is denoted as an accumulated latency 3, a possible implementation in which the UE determines the third latency based on the first latency, the first target latency, and the second target latency is as follows: The accumulated latency 3=the accumulated latency 1+T1+T2.

The second target latency may be obtained by the UE from the target network element, or may be configured. A manner in which the UE obtains the second target latency is not limited in this embodiment of this application.

S2109: The UE sends third latency information to the target network element, where the third latency information is used to indicate the third latency.

For example, the UE modifies, to the third latency information, the first latency information that is in the flow service provider broadcast declaration message and that is received by the UE from the UPF network element, and sends, to the target network element, a flow service provider broadcast declaration message obtained through modification.

If the target network element is the flow service recipient, the target network element may determine whether the target network element is interested in the flow, and if the target network element is interested in the flow, determine whether the third latency can meet a latency requirement of the flow. If the third latency can meet the latency requirement of the flow, the target network element sends the third latency information to the UE.

For example, the target network element sends, to the UE, a flow service recipient ready message, and the flow service recipient ready message includes the identification information of the flow and the third latency information. Then, the UE may forward the flow service recipient ready message to the UPF network element, and then the UPF network element forwards the flow service recipient ready message to a next-hop network element of the UPF network element in the TSN.

In the communication method shown in FIG. 21, the SMF network element learns of the information about the flow from the UE, sends, to the UE based on the information about the flow, the QoS parameter corresponding to the flow, and sends the QoS parameter to the UE. The UE determines, based on the QoS parameter, the first target latency of transmitting the flow between the UPF network element and the UE, and determines, based on the first latency of transmitting the flow from the flow service provider to the UPF network element, the first target latency, and the second target latency of the flow from the UE to the target network element that is in the TSN and that is used as the next hop of the UE, the third latency of the flow from the flow service provider to the target network element.

It should be understood that names of messages shown in FIG. 21 are merely examples. Any message that can implement a corresponding function in the communication method falls within the protection scope of the embodiments of this application.

In the communication method shown in FIG. 21, an accumulated latency of transmitting the flow from the flow service provider to the target network element that is in the TSN network and that is used as the next hop of the UE may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In addition, in the communication method shown in FIG. 21, a 3GPP system is considered as a bridge in the TSN network, and may receive a flow reservation protocol message (an SRP message) from a node that is in the TSN network and that is used as a previous node of the bridge, provide a method for processing the SRP message, and send the SRP message to a node that is in the TSN and that is used as a next hop of the bridge, so that a latency requirement of a URLLC service flow can be ensured and a bandwidth resource can be reserved in a scenario in which the 3GPP network interworks with the TSN network.

Figure 22:
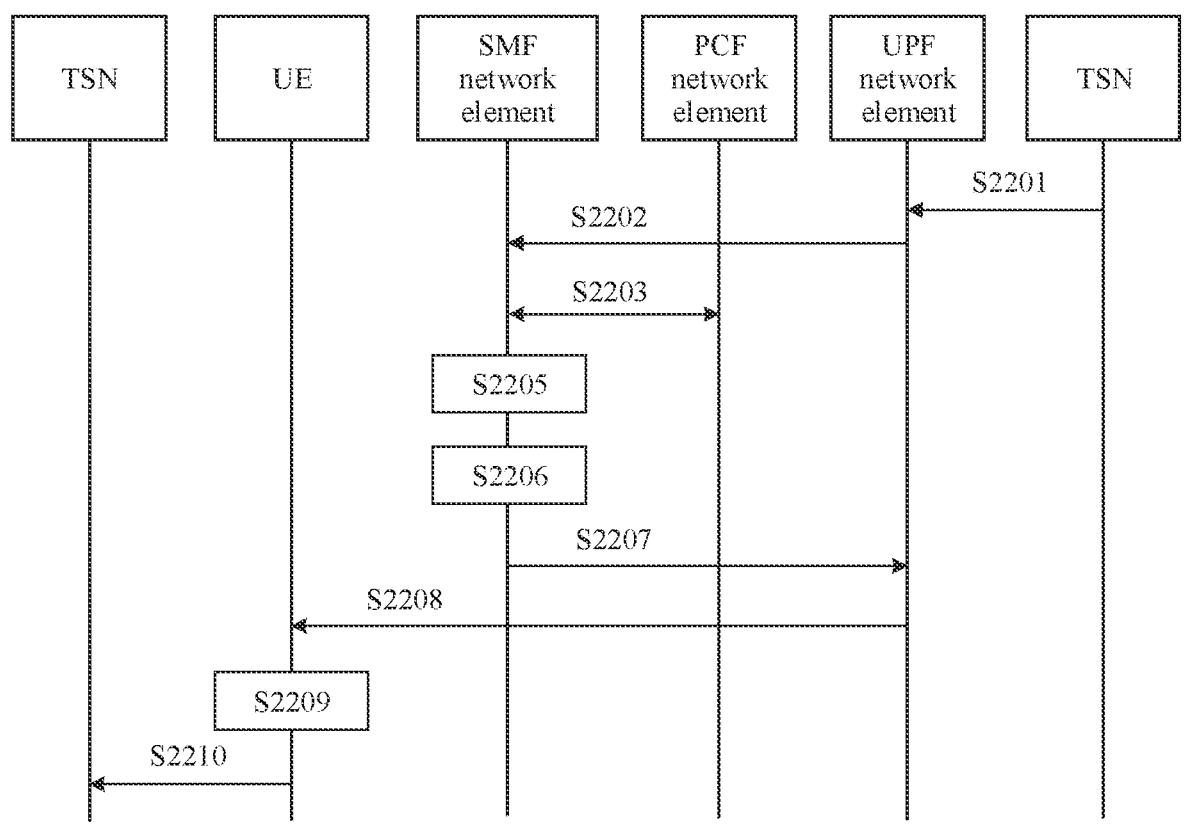
FIG. 22 is a schematic flowchart of a communication method according to another embodiment of this application.

FIG. 22 is a schematic flowchart of a communication method according to an embodiment of this application. It should be understood that FIG. 22 shows steps or operations of the communication method, but these steps or operations are merely examples. In this embodiment of this application, other operations or variations of the operations in FIG. 22 may be further performed. In addition, the steps in FIG. 22 may be performed in a sequence different from that presented in FIG. 22, and possibly, not all operations in FIG. 22 need to be performed.

S2201: A UPF network element receives first latency information from a TSN, where the first latency information is used to indicate a first latency, and the first latency is an accumulated latency of transmitting a flow from a flow service provider in the TSN to the UPF network element.

For example, the UPF network element 1903 receives a flow service provider broadcast declaration message from a network element that is in the TSN and that is used as a previous hop of the UPF network element 1903. The message may be used to broadcast a flow and a QoS requirement corresponding to the flow, and the message includes identification information of the flow and the first latency information. In this case, the first latency is an accumulated latency of transmitting the flow from the communications device 1908 used as the flow service provider to the UPF network element 1903. The previous-hop network element of the UPF network element 1903 may be the communications device 1908, or may be a device or a network element between the UPF network element 1903 and the communications device 1908.

Optionally, the message may further include one or more of the following information: a destination address, a source address, a maximum frame size, a maximum frame interval, a priority of a frame, a maximum allowable latency of transmitting a single frame of the flow from the flow service provider to a flow service recipient, a reliability requirement of the flow, or a resource reservation failure cause.

It should be understood that, in this embodiment of this application, for ease of description, all information other than the first latency information in information related to the flow is referred to as information about the flow. For example, the destination address, the source address, the maximum frame size, the maximum frame interval, the priority of the frame, the maximum allowable latency of transmitting the single frame of the flow from the flow service provider to the flow service recipient, the reliability requirement of the flow, the resource reservation failure cause, an identifier of the flow, a QoS parameter of the flow, or the like is referred to as the information about the flow.

S2202: The UPF network element sends the first latency information to an SMF network element. Correspondingly, the SMF network element receives the first latency information from the UPF network element. In addition, the UPF network element may further send the information about the flow to the SMF network element.

For example, after receiving the flow service provider broadcast declaration message from the TSN, the UPF network element 1903 forwards the flow service provider broadcast declaration message to the SMF network element 1905. The flow service provider broadcast declaration message carries the first latency information and the information about the flow.

For example, after receiving the flow service provider broadcast declaration message from the TSN, the UPF network element 1903 obtains the first latency information and the information about the flow that are in the flow service provider broadcast declaration message, and sends the first latency information and the information about the flow to the SMF network element 1905.

S2203: The SMF network element obtains, from a PCF network element, a PCC rule corresponding to the flow.

For example, the SMF network element sends the information about the flow to the PCF network element. The information about the flow may include identification information of the flow, a QoS parameter of the flow, or the like. Correspondingly, the PCF network element receives the information about the flow from the SMF network element.

The PCF network element sends the PCC rule corresponding to the flow to the SMF network element. Correspondingly, the SMF network element receives the PCC rule corresponding to the flow from the PCF network element.

It should be understood that S2203 is not a step that needs to be performed. This step is performed to enable the SMF network element to obtain the PCC rule corresponding to the flow. An implementation in which the SMF network element obtains the PCC rule corresponding to the flow is not limited in this embodiment of this application.

S2205: The SMF network element determines a first target latency according to the PCC rule corresponding to the flow, and the first target latency is a transmission latency of the flow from the UPF network element to the UE.

In this embodiment of this application, the first target latency may also be referred to as an accumulated latency of transmitting the flow between the UPF network element and the UE.

An example of the first target latency may be a maximum transmission latency of the flow from the UPF network element to the UE. For example, the SMF network element may determine the maximum transmission latency of the flow from the UPF network element to the UE based on a 5QI in the PCC rule. For example, the SMF network element may use a PDB that is between the UPF and the UE and that corresponds to the 5QI as the maximum transmission latency of transmitting the flow from the UPF to the UE.

Optionally, after obtaining the PCC rule, the SMF network element may trigger a PDU session modification process, to establish a QoS flow for the flow, to reserve a resource for the flow.

S2206: The SMF network element determines a second latency based on the first latency and the first target latency, where the second latency is a transmission latency of the flow from the flow service provider to the UE.

For example, the SMF network element determines the second latency based on the first latency indicated by the first latency information carried in the flow service provider broadcast declaration message and the maximum transmission latency that is determined in S2205.

If the first latency is denoted as an accumulated latency 1, the first target latency is denoted as T1, and the second latency is denoted as an accumulated latency 2, the accumulated latency 2=the accumulated latency 1+T1.

S2207: The SMF network element sends second latency information to the UPF network element, where the second latency information is used to indicate the second latency. Correspondingly, the UPF network element receives the second latency information from the SMF network element.

For example, the SMF network element modifies, to the second latency information, the first latency information that is in the flow service provider broadcast declaration message and that is received by the SMF network element from the UPF network element, and sends, to the UPF network element, a flow service provider broadcast declaration message obtained through modification.

Alternatively, the SMF network element may send the second latency information to the UPF network element in another manner.

S2208: The UPF network element sends the second latency information to the UE. Correspondingly, the UE receives the second latency information from the UPF network element.

For example, the UPF network element sends, to the UE, the flow service provider broadcast declaration message received from the SMF network element, and the flow service provider broadcast declaration message carries the second latency information.

Alternatively, the UPF network element sends, to the UE, the flow service provider broadcast declaration message that is received by the UPF network element from the TSN, and the first latency information in the flow service provider broadcast declaration message is modified to the second latency information.

S2209: The UE determines a third latency based on the second latency and a second target latency, where the second target latency is a latency of transmitting the flow from the UE to a target network element that is in the TSN network and that is used as a next hop of the UE, and the third latency is a latency of transmitting the flow from the flow service provider to the target network element that is in the TSN and that is used as the next hop of the UE.

For example, the second target latency is an accumulated transmission latency of the flow from the UE 1901 to the target network element that is in the TSN and that is used as the next hop of the UE. The third latency is an accumulated transmission latency of the flow from the communications device 108 to the next-hop network element. The next-hop network element may be the communications device 107 or may be a communications device between the UE 1901 and the communications device 1907.

An implementation in which the UE determines the third latency based on the second latency and the second target latency may include: The UE adds the second target latency to the second latency. For example, if the second target latency is denoted as T2, the second latency is denoted as an accumulated latency 2, and the third latency is denoted as an accumulated latency 3, the accumulated latency 3=the accumulated latency 2+T2.

The second target latency may be obtained by the UE from the target network element, or may be configured. A manner in which the UE obtains the second target latency is not limited in this embodiment of this application.

S2210: The UE sends third latency information to the target network element.

For example, the UE modifies, to the third latency information, the second latency information that is in the flow service provider broadcast declaration message and that is received by the UE from the UPF network element, and sends, to the target network element, a flow service provider broadcast declaration message obtained through modification.

If the target network element is the flow service recipient, the target network element may determine whether the target network element is interested in the flow, and if the target network element is interested in the flow, determine whether the third latency can meet a latency requirement of the flow.

If the third latency can meet the latency requirement of the flow, the target network element sends the third latency information to the UE.

For example, the target network element sends, to the UE, a flow service recipient ready message, and the flow service recipient ready message includes the identification information of the flow and the third latency information. Then, the UE may forward the flow service recipient ready message to the UPF network element, and then the UPF network element forwards the flow service recipient ready message to a next-hop network element of the UPF network element in the TSN.

In the communication method shown in FIG. 22, the SMF network element learns, from the UPF network element, of the first latency of the flow from the flow service provider to the UPF network element, determines, according to the PCC rule of the flow, the first target latency of transmitting the flow between the UPF network element and the UE, determines, based on the first latency and the first target latency, the second latency of transmitting the flow from the flow service provider to the UE, and sends the second latency to the UE through the UPF network element. The UE determines, based on the second latency and the second target latency of the flow from the UE to the network element that is in the TSN and that is used as the next hop of the UE, the third latency of the flow from the flow service provider to the next-hop network element.

It should be understood that names of messages shown in FIG. 22 are merely examples. Any message that can implement a corresponding function in the communication method falls within the protection scope of the embodiments of this application.

In the communication method shown in FIG. 22, an accumulated latency of transmitting the flow from the flow service provider to the target network element that is in the TSN network and that is used as the next hop of the UE may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In addition, in the communication method shown in FIG. 22, a 3GPP system is considered as a bridge in the TSN network, and may receive a flow reservation protocol message (an SRP message) from a node that is in the TSN network and that is used as a previous node of the bridge, provide a method for processing the SRP message, and send the SRP message to a node that is in the TSN and that is used as a next hop of the bridge, so that a latency requirement of a URLLC service flow can be ensured and a bandwidth resource can be reserved in a scenario in which the 3GPP network interworks with the TSN network.

Figure 23:
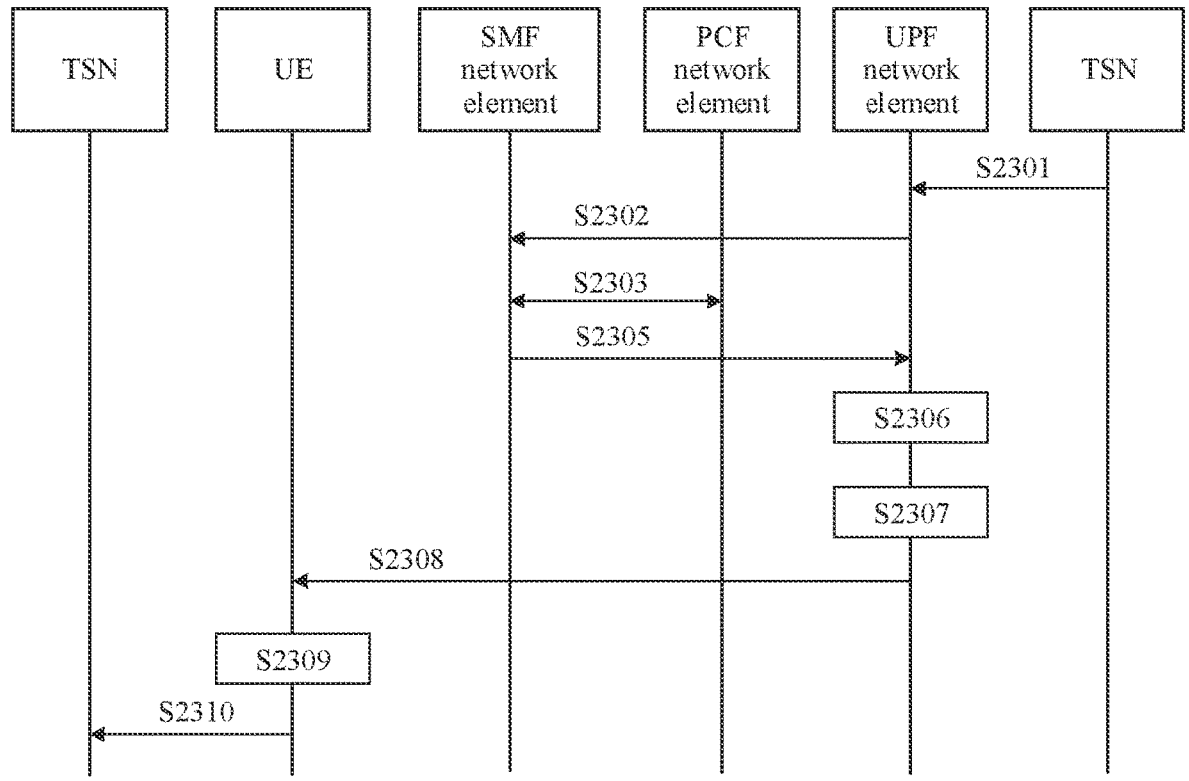
FIG. 23 is a schematic flowchart of a communication method according to another embodiment of this application.

FIG. 23 is a schematic flowchart of a communication method according to an embodiment of this application. It should be understood that FIG. 23 shows steps or operations of the communication method, but these steps or operations are merely examples. In this embodiment of this application, other operations or variations of the operations in FIG. 23 may be further performed. In addition, the steps in FIG. 23 may be performed in a sequence different from that presented in FIG. 23, and possibly, not all operations in FIG. 23 need to be performed.

S2301: A UPF network element receives first latency information from a TSN, where the first latency information is used to indicate a first latency, and the first latency is an accumulated latency of transmitting a flow from a flow service provider in the TSN to the UPF network element.

For example, the UPF network element 1903 receives a flow service provider broadcast declaration message from a network element that is in the TSN and that is used as a previous hop of the UPF network element 1903. The message may be used to broadcast a flow and a QoS requirement corresponding to the flow, and the message includes identification information of the flow and the first latency information. In this case, the first latency is an accumulated latency of transmitting the flow from the communications device 1908 used as the flow service provider to the UPF network element 1903. The previous-hop network element of the UPF network element 1903 may be the communications device 1908, or may be a device or a network element between the UPF network element 1903 and the communications device 1908.

Optionally, the message may further include one or more of the following information: a destination address, a source address, a maximum frame size, a maximum frame interval, a priority of a frame, a maximum allowable latency of transmitting a single frame of the flow from the flow service provider to a flow service recipient, a reliability requirement of the flow, or a resource reservation failure cause.

It should be understood that, in this embodiment of this application, for ease of description, all information other than the first latency information in information related to the flow is referred to as information about the flow. For example, the destination address, the source address, the maximum frame size, the maximum frame interval, the priority of the frame, the maximum allowable latency of transmitting the single frame of the flow from the flow service provider to the flow service recipient, the reliability requirement of the flow, the resource reservation failure cause, an identifier of the flow, a QoS parameter of the flow, or the like is referred to as the information about the flow.

S2302: The UPF network element sends information about the flow to an SMF network element. Correspondingly, the SMF network element receives the information about the flow from the UPF network element.

For example, after receiving the flow service provider broadcast declaration message from the TSN, the UPF network element 1903 forwards the flow service provider broadcast declaration message to the SMF network element 1905. The flow service provider broadcast declaration message carries the information about the flow.

For example, after receiving the flow service provider broadcast declaration message from the TSN, the UPF network element 1903 obtains the information about the flow in the flow service provider broadcast declaration message, and sends the information about the flow to the SMF network element 1905.

S2303: The SMF network element obtains, from a PCF network element, a PCC rule corresponding to the flow.

For example, the SMF network element sends the information about the flow to the PCF network element. The information about the flow may include identification information of the flow and the like. Correspondingly, the PCF network element receives the information about the flow from the SMF network element.

The PCF network element sends the PCC rule corresponding to the flow to the SMF network element. Correspondingly, the SMF network element receives the PCC rule corresponding to the flow from the PCF network element.

It should be understood that S2303 is not a step that needs to be performed. This step is performed to enable the SMF network element to obtain the PCC rule corresponding to the flow. An implementation in which the SMF network element obtains the PCC rule corresponding to the flow is not limited in this embodiment of this application.

S2305: The SMF network element sends, to the UPF network element according to the PCC rule, a quality of service parameter corresponding to the flow. Correspondingly, the UPF network element receives the quality of service parameter from the SMF network element.

For example, the SMF network element determines, according to the PCC rule, a 5QI corresponding to the flow, or determines a PDB between the UPF network element and the UE according to the PCC rule, and sends the 5QI or the PDB to the UPF network element. Alternatively, the SMF network element sends, to the UPF network element, QoS flow identification information corresponding to the flow.

Optionally, after obtaining the PCC rule, the SMF network element may trigger a PDU session modification process, to establish a QoS flow for the flow, to reserve a resource for the flow.

S2306: The UPF network element determines a first target latency based on the quality of service parameter corresponding to the flow, where the first target latency is a latency of transmitting the flow between the UPF network element and the UE.

An example of the first target latency may be a maximum transmission latency of the flow from the UPF network element to the UE. For example, the UPF network element may determine the maximum transmission latency of the flow from the UPF network element to the UE based on the 5QI, the PDB, or the QoS flow identification information received from the SMF network element.

For example, if the UPF network element obtains the PDB from the SMF network element, the UPF network element may use the PDB as the first target latency.

For example, if the UPF network element obtains the QoS flow identification information from the SMF network element, the UPF network element may obtain a PDB in a corresponding QoS parameter based on the QoS flow identification information, and use the PDB as the first target latency.

For example, if the UPF network element obtains the 5QI corresponding to the flow from the SMF network element, the UPF network element may obtain the PDB in the corresponding QoS parameter based on the 5QI, and use the PDB as the first target latency.

S2307: The UPF network element determines a second latency based on the first latency and the first target latency, where the second latency is a transmission latency of the flow from the flow service provider to the UE.

For example, the UPF network element determines the second latency based on the first latency indicated by the first latency information carried in the flow service provider broadcast declaration message and the maximum transmission latency that is determined in S2306.

If the first latency is denoted as an accumulated latency 1, the first target latency is denoted as T1, and the second latency is denoted as an accumulated latency 2, the accumulated latency 2=the accumulated latency 1+T1.

S2308: The UPF network element sends second latency information to the UE. Correspondingly, the UE receives the second latency information from the UPF network element.

For example, the UPF network element sends, to the UE, the flow service provider broadcast declaration message, and the flow service provider broadcast declaration message carries the second latency information.

S2309: The UE determines a third latency based on the second latency and a second target latency, where the second target latency is a latency of transmitting the flow from the UE to a target network element that is in the TSN network and that is used as a next hop of the UE, and the third latency is a latency of transmitting the flow from the flow service provider to the target network element that is in the TSN and that is used as the next hop of the UE.

For example, the second target latency is an accumulated transmission latency of the flow from the UE 1901 to the target network element that is in the TSN and that is used as the next hop of the UE. The third latency is an accumulated transmission latency of the flow from the communications device 108 to the next-hop network element. The next-hop network element may be the communications device 1907 or may be a communications device between the UE 1901 and the communications device 1907.

An implementation in which the UE determines the third latency based on the second latency and the second target latency may include: The UE adds the second target latency to the second latency. For example, if the second target latency is denoted as T2, the second latency is denoted as an accumulated latency 2, and the third latency is denoted as an accumulated latency 3, the accumulated latency 3=the accumulated latency 2+T2.

The second target latency may be obtained by the UE from the target network element, or may be configured. A manner in which the UE obtains the second target latency is not limited in this embodiment of this application.

S2310: The UE sends third latency information to the target network element.

For example, the UE modifies, to the third latency information, the second latency information that is in the flow service provider broadcast declaration message and that is received by the UE from the UPF network element, and sends, to the target network element, a flow service provider broadcast declaration message obtained through modification.

If the target network element is the flow service recipient, the target network element may determine whether the target network element is interested in the flow, and if the target network element is interested in the flow, determine whether the third latency can meet a latency requirement of the flow. If the third latency can meet the latency requirement of the flow, the target network element sends the third latency information to the UE.

For example, the target network element sends, to the UE, a flow service recipient ready message, and the flow service recipient ready message includes the identification information of the flow and the third latency information. Then, the UE may forward the flow service recipient ready message to the UPF network element, and then the UPF network element forwards the flow service recipient ready message to a next-hop network element of the UPF network element in the TSN.

In the communication method shown in FIG. 23, the UPF network element learns, from the SMF network element, of the QoS parameter corresponding to the flow, determines, based on the QoS parameter, the first target latency of transmitting the flow between the UPF network element and the UE, determines, based on the first target latency and the first latency of transmitting the flow from the flow service provider to the UPF network element, the second latency of transmitting the latency from the flow service provider to the UE, and notifies the UE of the second latency. The UE determines, based on the second latency and the second target latency of the flow from the UE to the network element that is in the TSN and that is used as the next hop of the UE, the third latency of the flow from the flow service provider to the next-hop network element.

It should be understood that names of messages shown in FIG. 23 are merely examples. Any message that can implement a corresponding function in the communication method falls within the protection scope of the embodiments of this application.

In the communication method shown in FIG. 23, an accumulated latency of transmitting the flow from the flow service provider to the target network element that is in the TSN network and that is used as the next hop of the UE may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In addition, in the communication method shown in FIG. 23, a 3GPP system is considered as a bridge in the TSN network, and may receive a flow reservation protocol message (an SRP message) from a node that is in the TSN network and that is used as a previous node of the bridge, provide a method for processing the SRP message, and send the SRP message to a node that is in the TSN and that is used as a next hop of the bridge, so that a latency requirement of a URLLC service flow can be ensured and a bandwidth resource can be reserved in a scenario in which the 3GPP network interworks with the TSN network.

Figure 24:
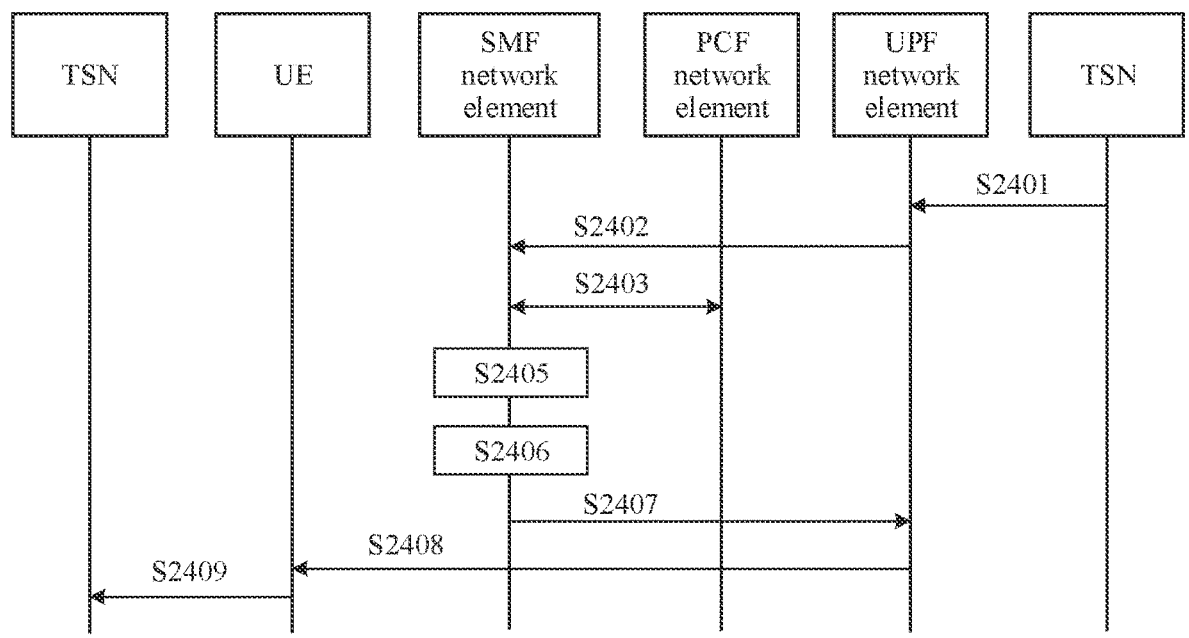
FIG. 24 is a schematic flowchart of a communication method according to another embodiment of this application.

FIG. 24 is a schematic flowchart of a communication method according to an embodiment of this application. It should be understood that FIG. 24 shows steps or operations of the communication method, but these steps or operations are merely examples. In this embodiment of this application, other operations or variations of the operations in FIG. 24 may be further performed. In addition, the steps in FIG. 24 may be performed in a sequence different from that presented in FIG. 24, and possibly, not all operations in FIG. 24 need to be performed.

S2401: A UPF network element receives first latency information from a TSN, where the first latency information is used to indicate a first latency, and the first latency is an accumulated latency of transmitting a flow from a flow service provider in the TSN to the UPF network element.

For example, the UPF network element 1903 receives a flow service provider broadcast declaration message from a network element that is in the TSN and that is used as a previous hop of the UPF network element 1903. The message may be used to broadcast a flow and a QoS requirement corresponding to the flow, and the message includes identification information of the flow and the first latency information. In this case, the first latency is an accumulated latency of transmitting the flow from the communications device 1908 used as the flow service provider to the UPF network element 1903. The previous-hop network element of the UPF network element 1903 may be the communications device 1908, or may be a device or a network element between the UPF network element 1903 and the communications device 1908.

Optionally, the message may further include one or more of the following information: a destination address, a source address, a maximum frame size, a maximum frame interval, a priority of a frame, a maximum allowable latency of transmitting a single frame of the flow from the flow service provider to a flow service recipient, a reliability requirement of the flow, or a resource reservation failure cause.

It should be understood that, in this embodiment of this application, for ease of description, all information other than the first latency information in information related to the flow is referred to as information about the flow. For example, the destination address, the source address, the maximum frame size, the maximum frame interval, the priority of the frame, the maximum allowable latency of transmitting the single frame of the flow from the flow service provider to the flow service recipient, the reliability requirement of the flow, the resource reservation failure cause, an identifier of the flow, a QoS parameter of the flow, or the like is referred to as the information about the flow.

S2402: The UPF network element sends the first latency information to an SMF network element. Correspondingly, the SMF network element receives the first latency information from the UPF network element. In addition, the UPF network element may further send the information about the flow to the SMF network element.

For example, after receiving the flow service provider broadcast declaration message from the TSN, the UPF network element 1903 forwards the flow service provider broadcast declaration message to the SMF network element 1905. The flow service provider broadcast declaration message carries the first latency information and the information about the flow.

For example, after receiving the flow service provider broadcast declaration message from the TSN, the UPF network element 1903 obtains the first latency information and the information about the flow that are in the flow service provider broadcast declaration message, and sends the first latency information and the information about the flow to the SMF network element 1905.

S2403: The SMF network element obtains, from a PCF network element, a PCC rule corresponding to the flow.

For example, the SMF network element sends the information about the flow to the PCF network element. The information about the flow may include identification information of the flow and the like. Correspondingly, the PCF network element receives the information about the flow from the SMF network element.

The PCF network element sends the PCC rule corresponding to the flow to the SMF network element. Correspondingly, the SMF network element receives the PCC rule corresponding to the flow from the PCF network element.

It should be understood that S2403 is not a step that needs to be performed. This step is performed to enable the SMF network element to obtain the PCC rule corresponding to the flow. An implementation in which the SMF network element obtains the PCC rule corresponding to the flow is not limited in this embodiment of this application.

S2405: The SMF network element determines a first target latency according to the PCC rule corresponding to the flow, and the first target latency is a transmission latency of the flow from the UPF network element to the UE.

In this embodiment of this application, the first target latency may also be referred to as an accumulated latency of transmitting the flow between the UPF network element and the UE.

An example of the first target latency may be a maximum transmission latency of the flow from the UPF network element to the UE. For example, the SMF network element may determine the maximum transmission latency of the flow from the UPF network element to the UE based on a 5QI in the PCC rule. For example, the SMF network element may use a PDB that is between the UPF and the UE and that corresponds to the 5QI as the maximum transmission latency of transmitting the flow from the UPF to the UE.

Optionally, after obtaining the PCC rule, the SMF network element may trigger a PDU session modification process, to establish a QoS flow for the flow, to reserve a resource for the flow.

S2406: The SMF network element determines a third latency based on the first latency, the first target latency, and a second target latency, where the second target latency is a latency of transmitting the flow from the UE to a target network element that is in the TSN network and that is used as a next hop of the UE, and the third latency is a latency of transmitting the flow from the flow service provider to the target network element that is in the TSN and that is used as the next hop of the UE.

If the first latency is denoted as an accumulated latency 1, the first target latency is denoted as T1, the second target latency is denoted as T2, and the third latency is denoted as an accumulated latency 3, a possible implementation in which the SMF network element determines the third latency based on the first latency, the first target latency, and the second target latency is as follows: The accumulated latency 3=the accumulated latency 1+T1+T2.

The second target latency may be obtained by the SMF network element from the UE, or may be configured. A manner in which the SMF network element obtains the second target latency is not limited in this embodiment of this application.

S2407: The SMF network element sends third latency information to the UPF network element. Correspondingly, the UPF network element receives the third latency information from the SMF network element.

For example, the SMF network element modifies, to the third latency information, the first latency information that is in the flow service provider broadcast declaration message and that is received by the SMF network element from the UPF network element, and sends, to the UPF network element, a flow service provider broadcast declaration message obtained through modification.

Alternatively, the SMF network element may send the third latency information to the UPF network element in another manner.

S2408: The UPF network element sends the third latency information to the UE. Correspondingly, the UE receives the third latency information from the UPF network element.

For example, the UPF network element sends, to the UE, the flow service provider broadcast declaration message that is received by the UPF network element from the SMF network element, and the flow service provider broadcast declaration message carries the third latency information.

S2409: The UE sends third latency information to the target network element.

For example, the UE forwards, to the target network element, the flow service provider broadcast declaration message that is received by the UE from the UPF network element, and the flow service provider broadcast declaration message carries the third latency information.

If the target network element is the flow service recipient, the target network element may determine whether the target network element is interested in the flow, and if the target network element is interested in the flow, determine whether the third latency can meet a latency requirement of the flow. If the third latency can meet the latency requirement of the flow, the target network element sends the third latency information to the UE.

For example, the target network element sends, to the UE, a flow service recipient ready message, and the flow service recipient ready message includes the identification information of the flow and the third latency information. Then, the UE may forward the flow service recipient ready message to the UPF network element, and then the UPF network element forwards the flow service recipient ready message to a next-hop network element of the UPF network element in the TSN.

In the communication method shown in FIG. 24, the SMF network element learns, from the UPF network element, of the first latency of transmitting the flow from the flow service provider to the UPF network element, determines the first target latency of transmitting the flow between the UPF network element and the UE, and determines, based on the first latency, the first target latency, and the second target latency of the flow from the UE to the target network element that is in the TSN and that is used as the next hop of the UE, the third latency of the flow from the flow service provider to the target network element.

It should be understood that names of messages shown in FIG. 24 are merely examples. Any message that can implement a corresponding function in the communication method falls within the protection scope of the embodiments of this application.

In the communication method shown in FIG. 24, an accumulated latency of transmitting the flow from the flow service provider to the target network element that is in the TSN network and that is used as the next hop of the UE may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In addition, in the communication method shown in FIG. 24, a 3GPP system is considered as a bridge in the TSN network, and may receive a flow reservation protocol message (an SRP message) from a node that is in the TSN network and that is used as a previous node of the bridge, provide a method for processing the SRP message, and send the SRP message to a node that is in the TSN and that is used as a next hop of the bridge, so that a latency requirement of a URLLC service flow can be ensured and a bandwidth resource can be reserved in a scenario in which the 3GPP network interworks with the TSN network.

Figure 25:
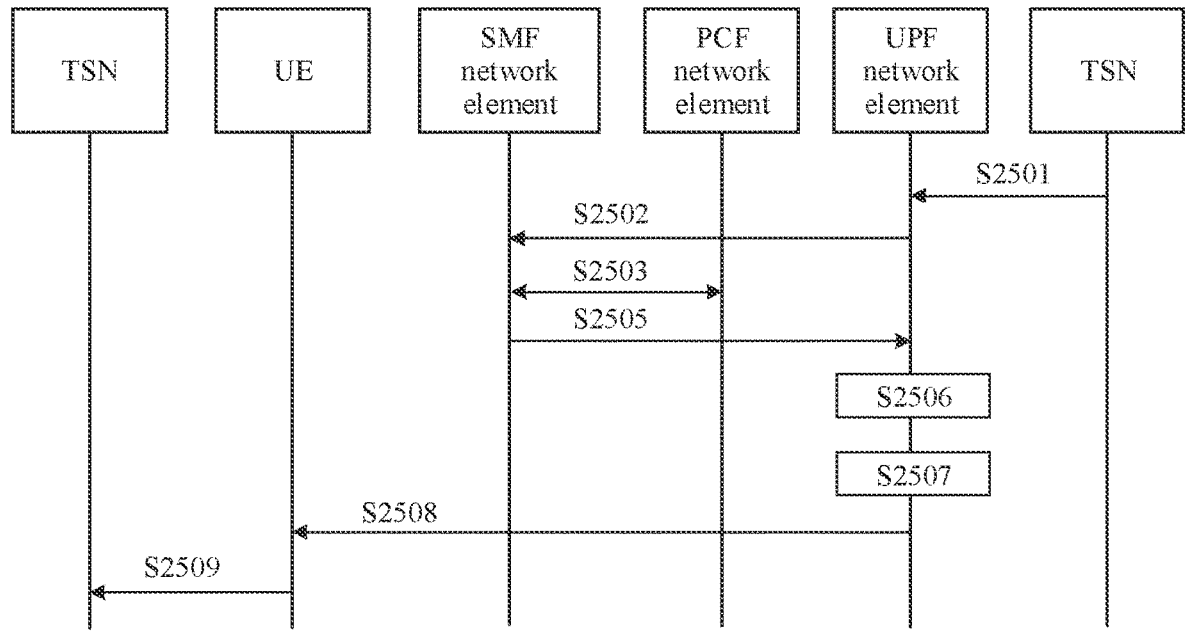
FIG. 25 is a schematic flowchart of a communication method according to another embodiment of this application.

FIG. 25 is a schematic flowchart of a communication method according to an embodiment of this application. It should be understood that FIG. 25 shows steps or operations of the communication method, but these steps or operations are merely examples. In this embodiment of this application, other operations or variations of the operations in FIG. 25 may be further performed. In addition, the steps in FIG. 25 may be performed in a sequence different from that presented in FIG. 25, and possibly, not all operations in FIG. 25 need to be performed.

S2501: A UPF network element receives first latency information from a TSN, where the first latency information is used to indicate a first latency, and the first latency is an accumulated latency of transmitting a flow from a flow service provider in the TSN to the UPF network element.

For example, the UPF network element 1903 receives a flow service provider broadcast declaration message from a network element that is in the TSN and that is used as a previous hop of the UPF network element 1903. The message may be used to broadcast a flow and a QoS requirement corresponding to the flow, and the message includes identification information of the flow and the first latency information. In this case, the first latency is an accumulated latency of transmitting the flow from the communications device 1908 used as the flow service provider to the UPF network element 1903. The previous-hop network element of the UPF network element 1903 may be the communications device 1908, or may be a device or a network element between the UPF network element 1903 and the communications device 1908.

Optionally, the message may further include one or more of the following information: a destination address, a source address, a maximum frame size, a maximum frame interval, a priority of a frame, a maximum allowable latency of transmitting a single frame of the flow from the flow service provider to a flow service recipient, a reliability requirement of the flow, or a resource reservation failure cause.

It should be understood that, in this embodiment of this application, for ease of description, all information other than the first latency information in information related to the flow is referred to as information about the flow. For example, the destination address, the source address, the maximum frame size, the maximum frame interval, the priority of the frame, the maximum allowable latency of transmitting the single frame of the flow from the flow service provider to the flow service recipient, the reliability requirement of the flow, the resource reservation failure cause, an identifier of the flow, a QoS parameter of the flow, or the like is referred to as the information about the flow.

S2502: The UPF network element sends information about the flow to an SMF network element. Correspondingly, the SMF network element receives the information about the flow from the UPF network element.

For example, after receiving the flow service provider broadcast declaration message from the TSN, the UPF network element 1903 forwards the flow service provider broadcast declaration message to the SMF network element 1905. The flow service provider broadcast declaration message carries the information about the flow.

For example, after receiving the flow service provider broadcast declaration message from the TSN, the UPF network element 1903 obtains the information about the flow in the flow service provider broadcast declaration message, and sends the information about the flow to the SMF network element 1905.

S2503: The SMF network element obtains, from a PCF network element, a PCC rule corresponding to the flow.

For example, the SMF network element sends the information about the flow to the PCF network element. The information about the flow may include identification information of the flow and the like. Correspondingly, the PCF network element receives the information about the flow from the SMF network element.

The PCF network element sends the PCC rule corresponding to the flow to the SMF network element. Correspondingly, the SMF network element receives the PCC rule corresponding to the flow from the PCF network element.

It should be understood that S2503 is not a step that needs to be performed. The two steps are performed to enable the SMF network element to obtain the PCC rule corresponding to the flow. An implementation in which the SMF network element obtains the PCC rule corresponding to the flow is not limited in this embodiment of this application.

S2505: The SMF network element sends, to the UPF network element according to the PCC rule, a quality of service parameter corresponding to the flow. Correspondingly, the UPF network element receives the quality of service parameter from the SMF network element.

For example, the SMF network element determines, according to the PCC rule, a 5QI corresponding to the flow, or determines a PDB between the UPF network element and the UE according to the PCC rule, and sends the 5QI or the PDB to the UPF network element. Alternatively, the SMF network element sends, to the UPF network element, QoS flow identification information corresponding to the flow.

Optionally, after obtaining the PCC rule, the SMF network element may trigger a PDU session modification process, to establish a QoS flow for the flow, to reserve a resource for the flow.

The SMF network element may further send, to the UPF network element, a second target latency corresponding to the flow. The second target latency is a latency of transmitting the flow from the UE to a target network element that is in the TSN network and that is used as a next hop of the UE.

S2506: The UPF network element determines a first target latency based on the quality of service parameter corresponding to the flow, where the first target latency is a latency of transmitting the flow between the UPF network element and the UE.

An example of the first target latency may be a maximum transmission latency of the flow from the UPF network element to the UE. For example, the UPF network element may determine the maximum transmission latency of the flow from the UPF network element to the UE based on the 5QI, the PDB, or the QoS flow identification information received from the SMF network element.

For example, if the UPF network element obtains the PDB from the SMF network element, the UPF network element may use the PDB as the first target latency.

For example, if the UPF network element obtains the QoS flow identification information from the SMF network element, the UPF network element may obtain a PDB in a corresponding QoS parameter based on the QoS flow identification information, and use the PDB as the first target latency.

For example, if the UPF network element obtains the 5QI corresponding to the flow from the SMF network element, the UPF network element may obtain the PDB in the corresponding QoS parameter based on the 5QI, and use the PDB as the first target latency.

S2507: The UPF network element determines a third latency based on the first latency, the first target latency, and a second target latency, where the second target latency is a latency of transmitting the flow from the UE to a target network element that is in the TSN network and that is used as a next hop of the UE, and the third latency is a latency of transmitting the flow from the flow service provider to the target network element that is in the TSN and that is used as the next hop of the UE.

If the first latency is denoted as an accumulated latency 1, the first target latency is denoted as T1, the second target latency is denoted as T2, and the third latency is denoted as an accumulated latency 3, a possible implementation in which the UPF network element determines the third latency based on the first latency, the first target latency, and the second target latency is as follows: The accumulated latency 3=the accumulated latency 1+T1+T2.

The second target latency may be obtained by the SMF network element from the UE, or may be configured, or may be obtained in another manner. A manner in which the SMF network element obtains the second target latency is not limited in this embodiment of this application.

S2508: The UPF network element sends the third latency information to the UE. Correspondingly, the UE receives the third latency information from the UPF network element.

For example, the UPF network element sends, to the UE, the flow service provider broadcast declaration message that is received by the UPF network element from the TSN, and the first latency information in the flow service provider broadcast declaration message is modified to carrying the third latency information.

S2509: The UE sends third latency information to the target network element.

For example, the UE forwards, to the target network element, the flow service provider broadcast declaration message that is received by the UE from the UPF network element, and the flow service provider broadcast declaration message carries the third latency information.

If the target network element is the flow service recipient, the target network element may determine whether the target network element is interested in the flow, and if the target network element is interested in the flow, determine whether the third latency can meet a latency requirement of the flow. If the third latency can meet the latency requirement of the flow, the target network element sends the third latency information to the UE.

For example, the target network element sends, to the UE, a flow service recipient ready message, and the flow service recipient ready message includes the identification information of the flow and the third latency information. Then, the UE may forward the flow service recipient ready message to the UPF network element, and then the UPF network element forwards the flow service recipient ready message to a next-hop network element of the UPF network element in the TSN.

In the communication method shown in FIG. 25, the UPF network element determines, based on the QoS parameter obtained from the SMF network element, the first target latency of transmitting the flow between the UPF network element and the UE, and determines, based on the first latency of transmitting the flow from the flow service provider to the UPF network element, the first target latency, and the second target latency of the flow from the UE to the target network element that is in the TSN and that is used as the next hop of the UE, the third latency of the flow from the flow service provider to the target network element.

It should be understood that names of messages shown in FIG. 25 are merely examples. Any message that can implement a corresponding function in the communication method falls within the protection scope of the embodiments of this application.

In the communication method shown in FIG. 25, an accumulated latency of transmitting the flow from the flow service provider to the target network element that is in the TSN network and that is used as the next hop of the UE may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In addition, in the communication method shown in FIG. 25, a 3GPP system is considered as a bridge in the TSN network, and may receive a flow reservation protocol message (an SRP message) from a node that is in the TSN network and that is used as a previous node of the bridge, provide a method for processing the SRP message, and send the SRP message to a node that is in the TSN and that is used as a next hop of the bridge, so that a latency requirement of a URLLC service flow can be ensured and a bandwidth resource can be reserved in a scenario in which the 3GPP network interworks with the TSN network.

Figure 26:
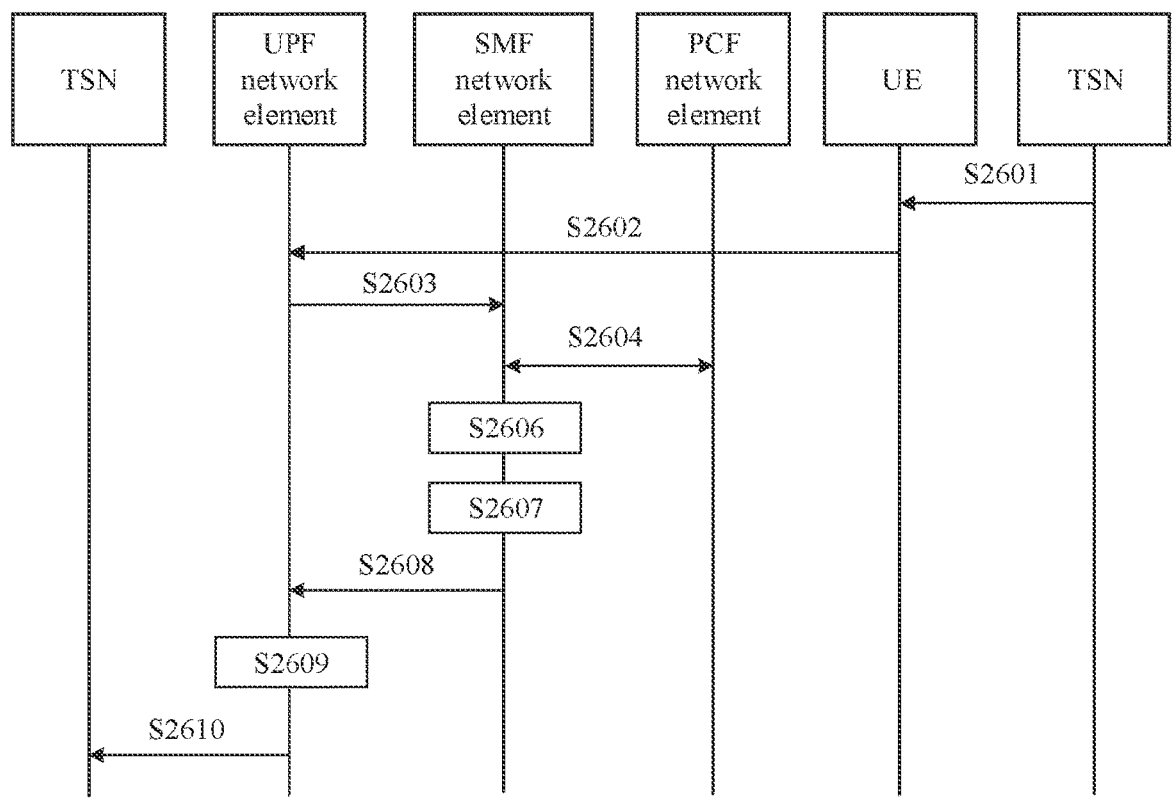
FIG. 26 is a schematic flowchart of a communication method according to another embodiment of this application.

FIG. 26 is a schematic flowchart of a communication method according to an embodiment of this application. It should be understood that FIG. 26 shows steps or operations of the communication method, but these steps or operations are merely examples. In this embodiment of this application, other operations or variations of the operations in FIG. 26 may be further performed. In addition, the steps in FIG. 26 may be performed in a sequence different from that presented in FIG. 26, and possibly, not all operations in FIG. 26 need to be performed.

S2601: UE receives first latency information from a TSN, where the first latency information is used to indicate a first latency, and the first latency is an accumulated latency of transmitting the flow from a flow service provider in the TSN to the UE.

For example, the UE 1901 receives a flow service provider broadcast declaration message from a network element that is in the TSN and that is used as a previous hop of the UE 1901. The message may be used to broadcast a flow and a QoS requirement corresponding to the flow, and the message includes identification information of the flow and the first latency information. In this case, the first latency is an accumulated latency of transmitting the flow from the communications device 1907 used as the flow service provider to the UE 1901. The previous-hop network element of the UE 1901 may be the communications device 1907, or may be a device or a network element between the UE 1901 and the communications device 1907.

Optionally, the message may further include one or more of the following information: a destination address, a source address, a maximum frame size, a maximum frame interval, a priority of a frame, a maximum allowable latency of transmitting a single frame of the flow from the flow service provider to a flow service recipient, a reliability requirement of the flow, or a resource reservation failure cause.

It should be understood that, in this embodiment of this application, for ease of description, all information other than the first latency information in information related to the flow is referred to as information about the flow. For example, the destination address, the source address, the maximum frame size, the maximum frame interval, the priority of the frame, the maximum allowable latency of transmitting the single frame of the flow from the flow service provider to the flow service recipient, the reliability requirement of the flow, the resource reservation failure cause, an identifier of the flow, a QoS parameter of the flow, or the like is referred to as the information about the flow.

S2602: The UE sends the first latency information to a UPF network element. Correspondingly, the UPF network element receives the first latency information from the UE.

For example, the UE forwards, to the UPF network element, the flow service provider broadcast declaration message that is received by the UE from the TSN, and the flow service provider broadcast declaration message carries the first latency information and the information about the flow.

For example, after receiving the flow service provider broadcast declaration message from the TSN, the UE obtains the first latency information and the information about the flow that are in the flow service provider broadcast declaration message, and sends the first latency information and the information about the flow to the UPF network element.

S2603: The UPF network element sends the first latency information to an SMF network element. Correspondingly, the SMF network element receives the first latency information from the UPF network element. In addition, the UPF network element may further send the information about the flow to the SMF network element.

For example, after receiving the flow service provider broadcast declaration message from the UE 1901, the UPF network element 1903 forwards the flow service provider broadcast declaration message to the SMF network element 1905. The flow service provider broadcast declaration message carries the first latency information and the information about the flow.

For example, after receiving the flow service provider broadcast declaration message from the UE 1901, the UPF network element 1903 obtains the first latency information and the information about the flow that are in the flow service provider broadcast declaration message, and sends the first latency information and the information about the flow to the SMF network element 1905.

S2604: The SMF network element obtains, from a PCF network element, a PCC rule corresponding to the flow.

For example, the SMF network element sends the information about the flow to the PCF network element. The information about the flow may include identification information of the flow, a QoS parameter of the flow, or the like. Correspondingly, the PCF network element receives the information about the flow from the SMF network element.

The PCF network element sends the PCC rule corresponding to the flow to the SMF network element. Correspondingly, the SMF network element receives the PCC rule corresponding to the flow from the PCF network element.

It should be understood that S2604 is not a step that needs to be performed. This step is performed to enable the SMF network element to obtain the PCC rule corresponding to the flow. An implementation in which the SMF network element obtains the PCC rule corresponding to the flow is not limited in this embodiment of this application.

S2606: The SMF network element determines a first target latency according to the PCC rule corresponding to the flow, and the first target latency is a transmission latency of the flow from the UE to the UPF network element.

In this embodiment of this application, the first target latency may also be referred to as an accumulated latency of transmitting the flow between the UE and the UPF network element.

An example of the first target latency may be a maximum transmission latency of the flow from the UE to the UPF network element. For example, the SMF network element may determine the maximum transmission latency of the flow from the UE to the UPF network element based on a 5QI in the PCC rule. For example, the SMF network element may use a PDB that is between the UE and the UPF and that corresponds to the 5QI as the maximum transmission latency of transmitting the flow from the UE to the UPF network element.

Optionally, after obtaining the PCC rule, the SMF network element may trigger a PDU session modification process, to establish a QoS flow for the flow, to reserve a resource for the flow.

S2607: The SMF network element determines a second latency based on the first latency and the first target latency, where the second latency is a transmission latency of the flow from the flow service provider to the UE.

For example, the SMF network element determines the second latency based on the first latency indicated by the first latency information carried in the flow service provider broadcast declaration message and the maximum transmission latency that is determined in S2606.

If the first latency is denoted as an accumulated latency 1, the first target latency is denoted as T1, and the second latency is denoted as an accumulated latency 2, the accumulated latency 2=the accumulated latency 1+T1.

S2608: The SMF network element sends second latency information to the UPF network element, where the second latency information is used to indicate the second latency. Correspondingly, the UPF network element receives the second latency information from the SMF network element.

For example, the SMF network element modifies, to the second latency information, the first latency information that is in the flow service provider broadcast declaration message and that is received by the SMF network element from the UPF network element, and sends, to the UPF network element, a flow service provider broadcast declaration message obtained through modification.

Alternatively, the SMF network element may send the second latency information to the UPF network element in another manner.

S2609: The UPF network element determines a third latency based on the second latency and a second target latency, where the second target latency is a latency of transmitting the flow from the UPF network element to a target network element that is in the TSN network and that is used as a next hop of the UPF network element, and the third latency is a latency of transmitting the flow from the flow service provider to the target network element that is in the TSN and that is used as the next hop of the UPF network element.

For example, the second target latency is an accumulated transmission latency of the flow from the UPF network element 1903 to the target network element that is in the TSN and that is used as the next hop of the UPF network element 1903. The third latency is an accumulated transmission latency of the flow from the communications device 107 to the target network element. The target network element may be the communications device 1908 or may be a communications device between the UPF network element and the communications device 1908.

An implementation in which the UPF network element determines the third latency based on the second latency and the second target latency may include: The UPF network element adds the second target latency to the second latency, to obtain the third latency. For example, if the second target latency is denoted as T2, the second latency is denoted as an accumulated latency 2, and the third latency is denoted as an accumulated latency 3, the accumulated latency 3=the accumulated latency 2+T2.

The second target latency may be obtained by the UPF network element from the target network element, or may be configured, or may be obtained in another manner. A manner in which the UPF network element obtains the second target latency is not limited in this embodiment of this application.

S2610: The UPF network element sends third latency information to the target network element.

For example, the UPF network element sends, to the target network element, the flow service provider broadcast declaration message that is received by the UPF network element from the UE, and the first latency information in the flow service provider broadcast declaration message is modified to carrying the third latency information.

Alternatively, the UPF network element may send, to the target network element, the flow service provider broadcast declaration message that is received by the UPF network element from the SMF network element, and the second latency information in the flow service provider broadcast declaration message is modified to carrying the third latency information.

In the communication method shown in FIG. 26, the SMF network element learns, from the UPF network element, of the first latency of the flow from the flow service provider to the UE, determines, according to the PCC rule of the flow, the first target latency of transmitting the flow between the UPF network element and the UE, determines, based on the first latency and the first target latency, the second latency of transmitting the flow from the flow service provider to the UPF network element, and sends the second latency to the UPF network element. The UPF network element determines, based on the second latency and the second target latency of the flow from the UPF network element to the network element that is in the TSN and that is used as the next hop of the UPF network element, the third latency of the flow from the flow service provider to the next-hop network element.

It should be understood that names of messages shown in FIG. 26 are merely examples. Any message that can implement a corresponding function in the communication method falls within the protection scope of the embodiments of this application.

In the communication method shown in FIG. 26, an accumulated latency of transmitting the flow from the flow service provider to the target network element that is in the TSN network and that is used as the next hop of the UPF network element may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In addition, in the communication method shown in FIG. 26, a 3GPP system is considered as a bridge in the TSN network, and may receive a flow reservation protocol message (an SRP message) from a node that is in the TSN network and that is used as a previous node of the bridge, provide a method for processing the SRP message, and send the SRP message to a node that is in the TSN and that is used as a next hop of the bridge, so that a latency requirement of a URLLC service flow can be ensured and a bandwidth resource can be reserved in a scenario in which the 3GPP network interworks with the TSN network.

Figure 27:
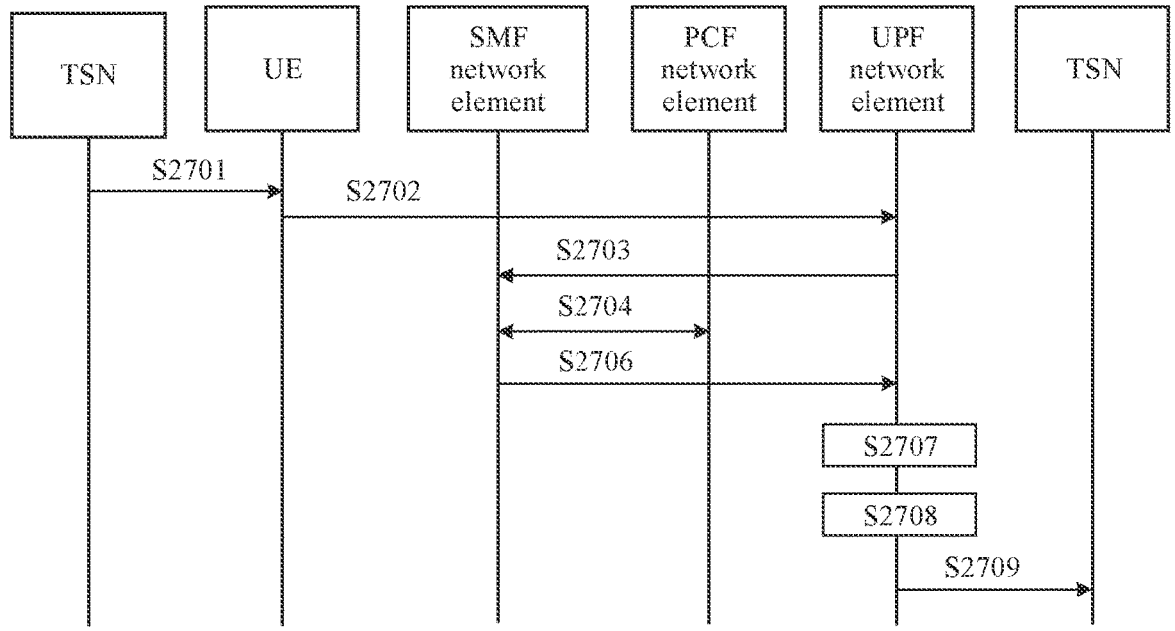
FIG. 27 is a schematic flowchart of a communication method according to another embodiment of this application.

FIG. 27 is a schematic flowchart of a communication method according to an embodiment of this application. It should be understood that FIG. 27 shows steps or operations of the communication method, but these steps or operations are merely examples. In this embodiment of this application, other operations or variations of the operations in FIG. 27 may be further performed. In addition, the steps in FIG. 27 may be performed in a sequence different from that presented in FIG. 27, and possibly, not all operations in FIG. 27 need to be performed.

S2701: UE receives first latency information from a TSN, where the first latency information is used to indicate a first latency, and the first latency is an accumulated latency of transmitting a flow from a flow service provider in the TSN to the UE.

For example, the UE 1901 receives a flow service provider broadcast declaration message from a network element that is in the TSN and that is used as a previous hop of the UE 1901. The message may be used to broadcast a flow and a QoS requirement corresponding to the flow, and the message includes identification information of the flow and the first latency information. In this case, the first latency is an accumulated latency of transmitting the flow from the communications device 1907 used as the flow service provider to the UE 1901. The previous-hop network element of the UE 1901 may be the communications device 1907, or may be a device or a network element between the UE 1901 and the communications device 1907.

Optionally, the message may further include one or more of the following information: a destination address, a source address, a maximum frame size, a maximum frame interval, a priority of a frame, a maximum allowable latency of transmitting a single frame of the flow from the flow service provider to a flow service recipient, a reliability requirement of the flow, or a resource reservation failure cause.

It should be understood that, in this embodiment of this application, for ease of description, all information other than the first latency information in information related to the flow is referred to as information about the flow. For example, the destination address, the source address, the maximum frame size, the maximum frame interval, the priority of the frame, the maximum allowable latency of transmitting the single frame of the flow from the flow service provider to the flow service recipient, the reliability requirement of the flow, the resource reservation failure cause, an identifier of the flow, a QoS parameter of the flow, or the like is referred to as the information about the flow.

S2702: The UE sends the first latency information to a UPF network element. Correspondingly, the UE receives the first latency information from the UPF network element.

For example, the UE forwards, to the UPF network element, the flow service provider broadcast declaration message that is received by the UE from the TSN, and the flow service provider broadcast declaration message carries the first latency information. The flow service provider broadcast declaration message carries the first latency information and the information about the flow.

For example, after receiving the flow service provider broadcast declaration message from the TSN, the UE obtains the first latency information and the information about the flow that are in the flow service provider broadcast declaration message, and sends the first latency information and the information about the flow to the UPF network element.

S2703: The UPF network element sends information about the flow to an SMF network element. Correspondingly, the SMF network element receives the information about the flow from the UPF network element.

For example, after receiving the flow service provider broadcast declaration message from the TSN, the UPF network element 1903 forwards the flow service provider broadcast declaration message to the SMF network element 1905. The flow service provider broadcast declaration message carries the information about the flow.

For example, after receiving the flow service provider broadcast declaration message from the TSN, the UPF network element 1903 obtains the first latency information and the information about the flow that are in the flow service provider broadcast declaration message, and sends the first latency information and the information about the flow to the SMF network element 1905.

S2704: The SMF network element obtains, from a PCF network element, a PCC rule corresponding to the flow.

For example, the SMF network element sends the information about the flow to the PCF network element. The information about the flow may include identification information of the flow and the like. Correspondingly, the PCF network element receives the information about the flow from the SMF network element.

The PCF network element sends the PCC rule corresponding to the flow to the SMF network element. Correspondingly, the SMF network element receives the PCC rule corresponding to the flow from the PCF network element.

It should be understood that S2704 is not a step that needs to be performed. This step is performed to enable the SMF network element to obtain the PCC rule corresponding to the flow. An implementation in which the SMF network element obtains the PCC rule corresponding to the flow is not limited in this embodiment of this application.

S2706: The SMF network element sends, to the UPF network element according to the PCC rule, a quality of service parameter corresponding to the flow. Correspondingly, the UPF network element receives the quality of service parameter from the SMF network element.

For example, the SMF network element determines, according to the PCC rule, a 5QI corresponding to the flow, or determines a PDB between the UPF network element and the UE according to the PCC rule, and sends the 5QI or the PDB to the UPF network element. Alternatively, the SMF network element sends, to the UPF network element, QoS flow identification information corresponding to the flow.

Optionally, after obtaining the PCC rule, the SMF network element may trigger a PDU session modification process, to establish a QoS flow for the flow, to reserve a resource for the flow.

S2707: The UPF network element determines a first target latency based on the quality of service parameter corresponding to the flow, where the first target latency is a latency of transmitting the flow between the UE and the UPF network element.

An example of the first target latency may be a maximum transmission latency of the flow from the UPF network element to the UE. For example, the UPF network element may determine the maximum transmission latency of the flow from the UE to the UPF network element based on the 5QI, the PDB, or the QoS flow identification information received from the SMF network element.

For example, if the UPF network element obtains the PDB from the SMF network element, the UPF network element may use the PDB as the first target latency.

For example, if the UPF network element obtains the QoS flow identification information from the SMF network element, the UPF network element may obtain a PDB in a corresponding QoS parameter based on the QoS flow identification information, and use the PDB as the first target latency.

For example, if the UPF network element obtains the 5QI corresponding to the flow from the SMF network element, the UPF network element may obtain the PDB in the corresponding QoS parameter based on the 5QI, and use the PDB as the first target latency.

S2708: The UPF network element determines a third latency based on the first latency, the first target latency, and a second target latency, where the second target latency is a latency of transmitting the flow from the UPF network element to a target network element that is in the TSN network and that is used as a next hop of the UPF network element, and the third latency is a latency of transmitting the flow from the flow service provider to the target network element that is in the TSN and that is used as the next hop of the UPF network element.

If the first latency is denoted as an accumulated latency 1, the first target latency is denoted as T1, the second target latency is denoted as T2, and the third latency is denoted as an accumulated latency 3, a possible implementation in which the UPF network element determines the third latency based on the first latency, the first target latency, and the second target latency is as follows: The accumulated latency 3=the accumulated latency 1+T1+T2.

The second target latency may be obtained by the UPF network element from the target network element, or may be configured, or may be obtained in another manner. A manner in which the UPF network element obtains the second target latency is not limited in this embodiment of this application.

S2709: The UPF network element sends third latency information to the target network element.

For example, the UPF network element sends, to the target network element, the flow service provider broadcast declaration message that is received by the UPF network element from the UE, and the first latency information in the flow service provider broadcast declaration message is modified to carrying the third latency information.

In the communication method shown in FIG. 27, the UPF network element determines, based on the QoS parameter obtained from the SMF network element, the first target latency of transmitting the flow between the UPF network element and the UE, and determines, based on the first latency of transmitting the flow from the flow service provider to the UE, the first target latency, and the second target latency of the flow from the UPF network element to the target network element that is in the TSN and that is used as the next hop of the UPF network element, the third latency of the flow from the flow service provider to the target network element.

It should be understood that names of messages shown in FIG. 27 are merely examples. Any message that can implement a corresponding function in the communication method falls within the protection scope of the embodiments of this application.

In the communication method shown in FIG. 27, an accumulated latency of transmitting the flow from the flow service provider to the target network element that is in the TSN network and that is used as the next hop of the UPF network element may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In addition, in the communication method shown in FIG. 27, a 3GPP system is considered as a bridge in the TSN network, and may receive a flow reservation protocol message (an SRP message) from a node that is in the TSN network and that is used as a previous node of the bridge, provide a method for processing the SRP message, and send the SRP message to a node that is in the TSN and that is used as a next hop of the bridge, so that a latency requirement of a URLLC service flow can be ensured and a bandwidth resource can be reserved in a scenario in which the 3GPP network interworks with the TSN network.

Figure 28:
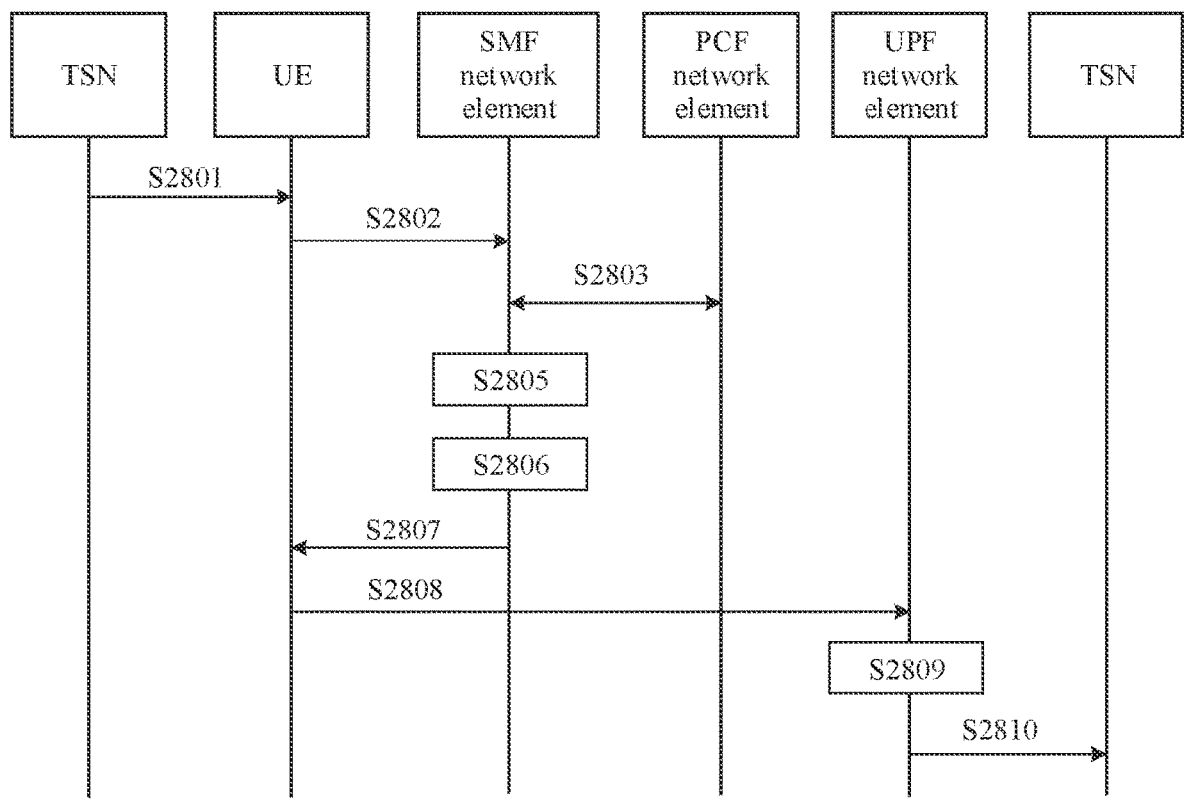
FIG. 28 is a schematic flowchart of a communication method according to another embodiment of this application.

FIG. 28 is a schematic flowchart of a communication method according to an embodiment of this application. It should be understood that FIG. 28 shows steps or operations of the communication method, but these steps or operations are merely examples. In this embodiment of this application, other operations or variations of the operations in FIG. 28 may be further performed. In addition, the steps in FIG. 28 may be performed in a sequence different from that presented in FIG. 28, and possibly, not all operations in FIG. 28 need to be performed.

S2801: UE receives first latency information from a TSN, where the first latency information is used to indicate a first latency, and the first latency is an accumulated latency of transmitting a flow from a flow service provider in the TSN to the UE.

For example, the UE 1901 receives a flow service provider broadcast declaration message from a network element that is in the TSN and that is used as a previous hop of the UE 1901. The message may be used to broadcast a flow and a QoS requirement corresponding to the flow, and the message includes identification information of the flow and the first latency information. In this case, the first latency is an accumulated latency of transmitting the flow from the communications device 1907 used as the flow service provider to the UE 1901. The previous-hop network element of the UE 1901 may be the communications device 1907, or may be a device or a network element between the UE 1901 and the communications device 1907.

Optionally, the message may further include one or more of the following information: a destination address, a source address, a maximum frame size, a maximum frame interval, a priority of a frame, a maximum allowable latency of transmitting a single frame of the flow from the flow service provider to a flow service recipient, a reliability requirement of the flow, or a resource reservation failure cause.

It should be understood that, in this embodiment of this application, for ease of description, all information other than the first latency information in information related to the flow is referred to as information about the flow. For example, the destination address, the source address, the maximum frame size, the maximum frame interval, the priority of the frame, the maximum allowable latency of transmitting the single frame of the flow from the flow service provider to the flow service recipient, the reliability requirement of the flow, the resource reservation failure cause, an identifier of the flow, a QoS parameter of the flow, or the like is referred to as the information about the flow.

S2802: The UE sends the first latency information to an SMF network element. Correspondingly, the SMF network element receives the first latency information from the UE. In addition, the UE may further send the information about the flow to the SMF network element.

For example, after receiving the flow service provider broadcast declaration message from the TSN, the UE 1901 forwards the flow service provider broadcast declaration message to the SMF network element 1905. The flow service provider broadcast declaration message carries the first latency information and the information about the flow.

For example, after receiving the flow service provider broadcast declaration message from the TSN, the UE 1901 obtains the first latency information and the information about the flow that are in the flow service provider broadcast declaration message, and sends the first latency information and the information about the flow to the SMF network element 1905.

S2803: The SMF network element obtains, from a PCF network element, a PCC rule corresponding to the flow.

For example, the SMF network element sends the information about the flow to the PCF network element. The information about the flow may include identification information of the flow, a QoS parameter of the flow, or the like. Correspondingly, the PCF network element receives the information about the flow from the SMF network element.

The PCF network element sends the PCC rule corresponding to the flow to the SMF network element. Correspondingly, the SMF network element receives the PCC rule corresponding to the flow from the PCF network element.

It should be understood that S2803 is not a step that needs to be performed. This step is performed to enable the SMF network element to obtain the PCC rule corresponding to the flow. An implementation in which the SMF network element obtains the PCC rule corresponding to the flow is not limited in this embodiment of this application.

S2805: The SMF network element determines a first target latency according to the PCC rule corresponding to the flow, and the first target latency is a transmission latency of the flow from the UE to the UPF network element.

In this embodiment of this application, the first target latency may also be referred to as an accumulated latency of transmitting the flow between the UE and the UPF network element.

An example of the first target latency may be a maximum transmission latency of the flow from the UE to the UPF network element. For example, the SMF network element may determine the maximum transmission latency of the flow from the UE to the UPF network element based on a 5QI in the PCC rule. For example, the SMF network element may use a PDB that is between the UE and the UPF network element and that corresponds to the 5QI as the maximum transmission latency of transmitting the flow from the UE to the UPF network element.

Optionally, after obtaining the PCC rule, the SMF network element may trigger a PDU session modification process, to establish a QoS flow for the flow, to reserve a resource for the flow.

S2806: The SMF network element determines a second latency based on the first latency and the first target latency, where the second latency is a transmission latency of the flow from the flow service provider to the UPF network element.

For example, the SMF network element determines the second latency based on the first latency indicated by the first latency information carried in the flow service provider broadcast declaration message and the maximum transmission latency that is determined in S2805.

If the first latency is denoted as an accumulated latency 1, the first target latency is denoted as T1, and the second latency is denoted as an accumulated latency 2, the accumulated latency 2=the accumulated latency 1+T1.

S2807: The SMF network element sends second latency information to the UE, where the second latency information is used to indicate the second latency. Correspondingly, the UE receives the second latency information from the SMF network element.

For example, the SMF network element sends, to the UE, the flow service provider broadcast declaration message that is received by the SMF network element from the UE, and the first latency information carried in the flow service provider broadcast declaration message is modified to the second latency information.

Alternatively, the SMF network element sends the second latency information to the UE through another message.

S2808: The UE sends the second latency information to a UPF network element. Correspondingly, the UPF network element receives the second latency information from the UE.

For example, the UE sends, to the UPF network element, the flow service provider broadcast declaration message that is received by the UE from the SMF network element, and the first latency information in the flow service provider broadcast declaration message is modified to the second latency information.

For example, the UE sends, to the UPF network element, the flow service provider broadcast declaration message that is received by the UE from the TSN, and the first latency information in the flow service provider broadcast declaration message is modified to the second latency information that is received by the UE from the SMF network element.

S2809: The UPF network element determines a third latency based on the second latency and a second target latency, where the second target latency is a latency of transmitting the flow from the UPF network element to a target network element that is in the TSN network and that is used as a next hop of the UPF network element, and the third latency is a latency of transmitting the flow from the flow service provider to the target network element that is in the TSN and that is used as the next hop of the UPF network element.

For example, the second target latency is an accumulated transmission latency of the flow from the UPF network element 1903 to the target network element that is in the TSN and that is used as the next hop of the UPF network element 1903. The third latency is an accumulated transmission latency of the flow from the communications device 107 to the next-hop network element. The next-hop network element may be the communications device 1908 or may be a communications device between the UPF network element 1903 and the communications device 1908.

An implementation in which the UPF network element determines the third latency based on the second latency and the second target latency may include: The UPF network element adds the second target latency to the second latency. For example, if the second target latency is denoted as T2, the second latency is denoted as an accumulated latency 2, and the third latency is denoted as an accumulated latency 3, the accumulated latency 3=the accumulated latency 2+T2.

The second target latency may be obtained by the UPF network element from the target network element, or may be configured, or may be obtained in another manner. A manner in which the UPF network element obtains the second target latency is not limited in this embodiment of this application.

S2810: The UPF network element sends third latency information to the target network element.

For example, the UPF network element modifies, to the third latency information, the second latency information that is in the flow service provider broadcast declaration message and that is received by the UPF network element from the UE, and sends, to the target network element, a flow service provider broadcast declaration message obtained through modification.

In the communication method shown in FIG. 28, the SMF network element learns, from the UE, of the first latency of the flow from the flow service provider to the UE, determines, according to the PCC rule of the flow, the first target latency of transmitting the flow between the UPF network element and the UE, determines, based on the first latency and the first target latency, the second latency of transmitting the flow from the flow service provider to the UPF network element, and sends the second latency to the UPF network element through the UE. The UPF network element determines, based on the second latency and the second target latency of the flow from the UPF network element to the network element that is in the TSN and that is used as the next hop of the UPF network element, the third latency of the flow from the flow service provider to the next-hop network element.

It should be understood that names of messages shown in FIG. 28 are merely examples. Any message that can implement a corresponding function in the communication method falls within the protection scope of the embodiments of this application.

In the communication method shown in FIG. 28, an accumulated latency of transmitting the flow from the flow service provider to the target network element that is in the TSN network and that is used as the next hop of the UPF network element may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In addition, in the communication method shown in FIG. 28, a 3GPP system is considered as a bridge in the TSN network, and may receive a flow reservation protocol message (an SRP message) from a node that is in the TSN network and that is used as a previous node of the bridge, provide a method for processing the SRP message, and send the SRP message to a node that is in the TSN and that is used as a next hop of the bridge, so that a latency requirement of a URLLC service flow can be ensured and a bandwidth resource can be reserved in a scenario in which the 3GPP network interworks with the TSN network.

Figure 29:
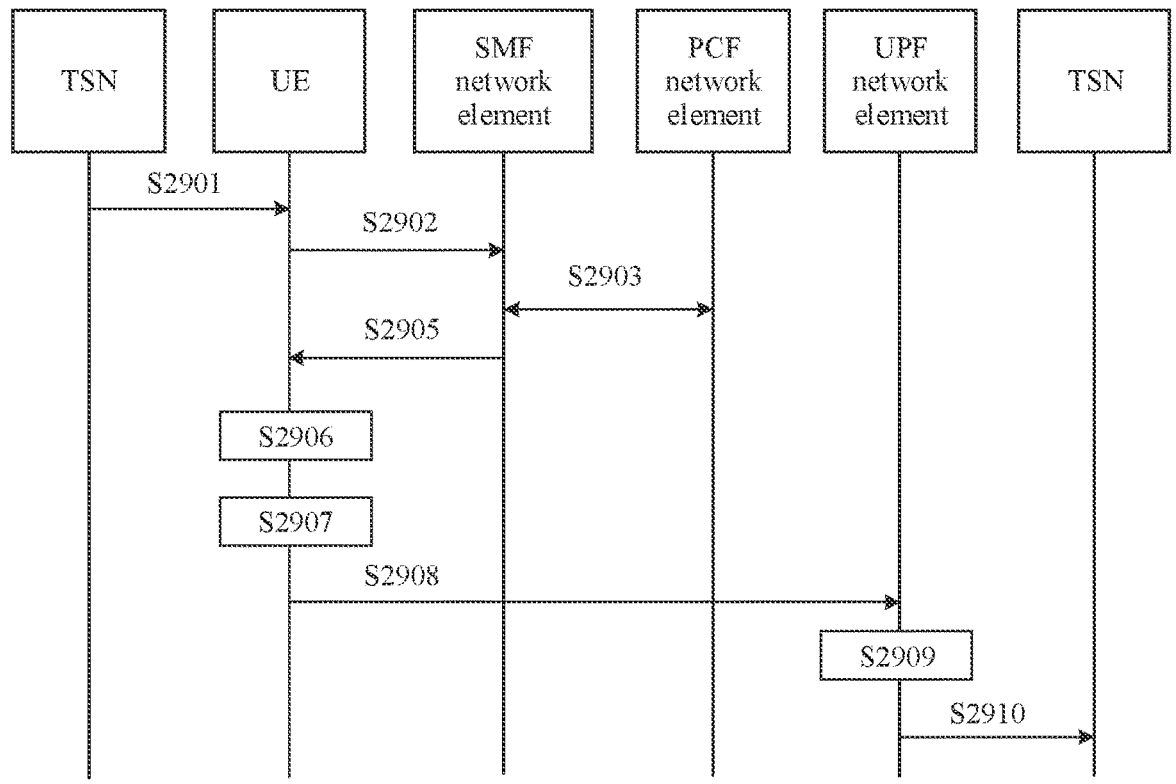
FIG. 29 is a schematic flowchart of a communication method according to another embodiment of this application.

FIG. 29 is a schematic flowchart of a communication method according to an embodiment of this application. It should be understood that FIG. 29 shows steps or operations of the communication method, but these steps or operations are merely examples. In this embodiment of this application, other operations or variations of the operations in FIG. 29 may be further performed. In addition, the steps in FIG. 29 may be performed in a sequence different from that presented in FIG. 29, and possibly, not all operations in FIG. 29 need to be performed.

S2901: UE receives first latency information from a TSN, where the first latency information is used to indicate a first latency, and the first latency is an accumulated latency of transmitting a flow from a flow service provider in the TSN to the UE.

For example, the UE 1901 receives a flow service provider broadcast declaration message from a network element that is in the TSN and that is used as a previous hop of the UE 1901. The message may be used to broadcast a flow and a QoS requirement corresponding to the flow, and the message includes identification information of the flow and the first latency information. In this case, the first latency is an accumulated latency of transmitting the flow from the communications device 1907 used as the flow service provider to the UE 1901. The previous-hop network element of the UE 1901 may be the communications device 1907, or may be a device or a network element between the UE 1901 and the communications device 1907.

Optionally, the message may further include one or more of the following information: a destination address, a source address, a maximum frame size, a maximum frame interval, a priority of a frame, a maximum allowable latency of transmitting a single frame of the flow from the flow service provider to a flow service recipient, a reliability requirement of the flow, or a resource reservation failure cause.

It should be understood that, in this embodiment of this application, for ease of description, all information other than the first latency information in information related to the flow is referred to as information about the flow. For example, the destination address, the source address, the maximum frame size, the maximum frame interval, the priority of the frame, the maximum allowable latency of transmitting the single frame of the flow from the flow service provider to the flow service recipient, the reliability requirement of the flow, the resource reservation failure cause, an identifier of the flow, a QoS parameter of the flow, or the like is referred to as the information about the flow.

S2902: The UE sends information about the flow to an SMF network element. Correspondingly, the SMF network element receives the information about the flow from the UE.

For example, after receiving the flow service provider broadcast declaration message from the TSN, the UE 1901 forwards the flow service provider broadcast declaration message to the SMF network element 1905. The flow service provider broadcast declaration message carries the information about the flow.

For example, after receiving the flow service provider broadcast declaration message from the TSN, the UE 1901 obtains the information about the flow in the flow service provider broadcast declaration message, and sends the information about the flow to the SMF network element 1905.

S2903: The SMF network element obtains, from a PCF network element, a PCC rule corresponding to the flow.

For example, the SMF network element sends the information about the flow to the PCF network element. The information about the flow may include identification information of the flow and the like. Correspondingly, the PCF network element receives the information about the flow from the SMF network element.

The PCF network element sends the PCC rule corresponding to the flow to the SMF network element. Correspondingly, the SMF network element receives the PCC rule corresponding to the flow from the PCF network element.

It should be understood that S2903 is not a step that needs to be performed. This step is performed to enable the SMF network element to obtain the PCC rule corresponding to the flow. An implementation in which the SMF network element obtains the PCC rule corresponding to the flow is not limited in this embodiment of this application.

S2905: The SMF network element sends, to the UE according to the PCC rule, a quality of service parameter corresponding to the flow. Correspondingly, the UE receives the quality of service parameter from the SMF network element.

For example, the SMF network element determines, according to the PCC rule, a 5QI corresponding to the flow, or determines a PDB between the UPF network element and the UE according to the PCC rule, and sends the 5QI or the PDB to the UE. Alternatively, the SMF network element sends, to the UE, QoS flow identification information corresponding to the flow.

Optionally, after obtaining the PCC rule, the SMF network element may trigger a PDU session modification process, to establish a QoS flow for the flow, to reserve a resource for the flow.

S2906: The UE determines a first target latency based on the quality of service parameter corresponding to the flow, where the first target latency is a latency of transmitting the flow between the UE and the UPF network element.

An example of the first target latency may be a maximum transmission latency of the flow from the UE to the UPF network element. For example, the UE may determine the maximum transmission latency of the flow from the UE to the UPF network element based on the 5QI, the PDB, or the QoS flow identification information received from the SMF network element.

For example, if the UE obtains the PDB from the SMF network element, the UE may use the PDB as the first target latency.

For example, if the UE obtains the QoS flow identification information from the SMF network element, the UE may obtain a PDB in a corresponding QoS parameter based on the QoS flow identification information, and use the PDB as the first target latency.

For example, if the UE obtains the 5QI corresponding to the flow from the SMF network element, the UE may obtain the PDB in the corresponding QoS parameter based on the 5QI, and use the PDB as the first target latency.

S2907: The UE determines a second latency based on the first latency and the first target latency, where the second latency is a transmission latency of the flow from the flow service provider to the UPF network element.

For example, the UE determines the second latency based on the first latency indicated by the first latency information carried in the flow service provider broadcast declaration message and the maximum transmission latency that is determined in S2906.

If the first latency is denoted as an accumulated latency 1, the first target latency is denoted as T1, and the second latency is denoted as an accumulated latency 2, the accumulated latency 2=the accumulated latency 1+T1.

S2908: The UE sends the second latency information to a UPF network element. Correspondingly, the UPF network element receives the second latency information from the UE.

For example, the UE sends, to the UPF network element, a flow service provider broadcast declaration message obtained through modification, and the first latency information carried in the flow service provider broadcast declaration message is modified to the second latency information.

S2909: The UPF network element determines a third latency based on the second latency and a second target latency, where the second target latency is a latency of transmitting the flow from the UPF network element to a target network element that is in the TSN network and that is used as a next hop of the UPF network element, and the third latency is a latency of transmitting the flow from the flow service provider to the target network element that is in the TSN and that is used as the next hop of the UPF network element.

For example, the second target latency is an accumulated transmission latency of the flow from the UPF network element 1903 to the target network element that is in the TSN and that is used as the next hop of the UPF network element 1903. The third latency is an accumulated transmission latency of the flow from the communications device 107 to the next-hop network element. The next-hop network element may be the communications device 108 or may be a communications device between the UPF network element 1903 and the communications device 1908.

An implementation in which the UPF network element determines the third latency based on the second latency and the second target latency may include: The UPF network element adds the second target latency to the second latency. For example, if the second target latency is denoted as T2, the second latency is denoted as an accumulated latency 2, and the third latency is denoted as an accumulated latency 3, the accumulated latency 3=the accumulated latency 2+T2.

The second target latency may be obtained by the UPF network element from the target network element, or may be configured, or may be obtained in another manner. A manner in which the UPF network element obtains the second target latency is not limited in this embodiment of this application.

S2910: The UPF network element sends third latency information to the target network element.

For example, the UPF network element modifies, to the third latency information, the second latency information that is in the flow service provider broadcast declaration message and that is received by the UPF network element from the UE, and sends, to the target network element, a flow service provider broadcast declaration message obtained through modification.

In the communication method shown in FIG. 29, the UE determines the first target latency of transmitting the flow between the UPF network element and the UE, determines the second latency of the flow from the flow service provider to the UPF network element based on the first target latency and the first latency of the flow from the flow service provider to the UE, and sends the second latency to the UPF network element. The UPF network element determines, based on the second latency and the second target latency of the flow from the UPF network element to the network element that is in the TSN and that is used as the next hop of the UPF network element, the third latency of the flow from the flow service provider to the next-hop network element.

It should be understood that names of messages shown in FIG. 29 are merely examples. Any message that can implement a corresponding function in the communication method falls within the protection scope of the embodiments of this application.

In the communication method shown in FIG. 29, an accumulated latency of transmitting the flow from the flow service provider to the target network element that is in the TSN network and that is used as the next hop of the UPF network element may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In addition, in the communication method shown in FIG. 29, a 3GPP system is considered as a bridge in the TSN network, and may receive a flow reservation protocol message (an SRP message) from a node that is in the TSN network and that is used as a previous node of the bridge, provide a method for processing the SRP message, and send the SRP message to a node that is in the TSN and that is used as a next hop of the bridge, so that a latency requirement of a URLLC service flow can be ensured and a bandwidth resource can be reserved in a scenario in which the 3GPP network interworks with the TSN network.

Figure 30:
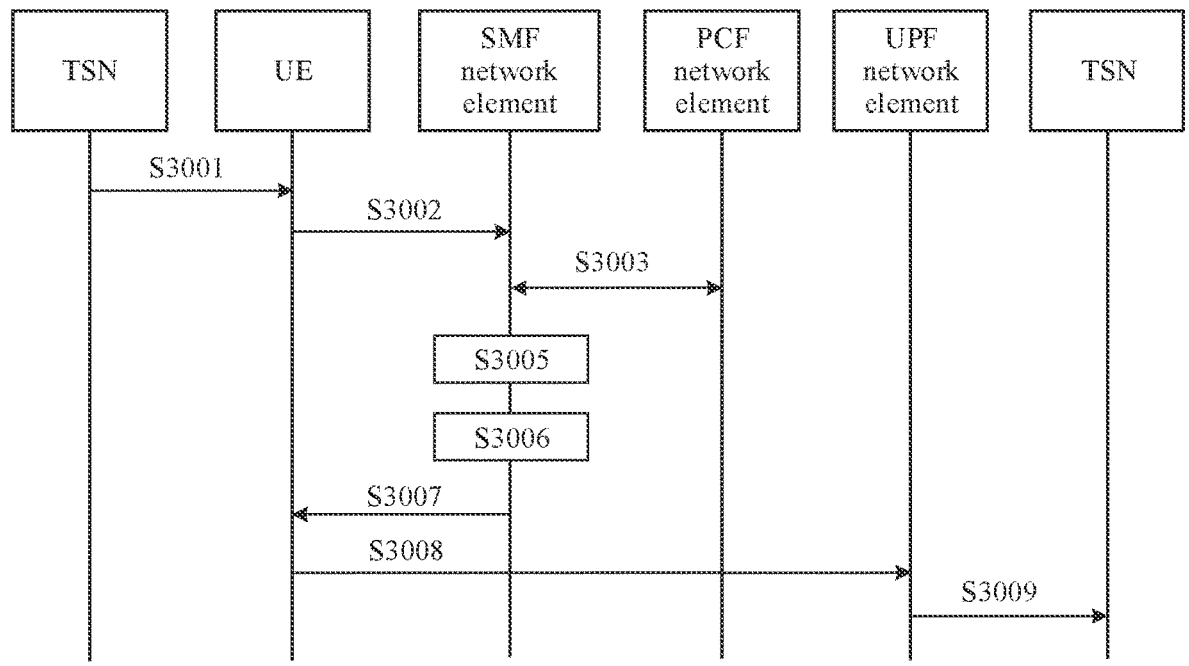
FIG. 30 is a schematic flowchart of a communication method according to another embodiment of this application.

FIG. 30 is a schematic flowchart of a communication method according to an embodiment of this application. It should be understood that FIG. 30 shows steps or operations of the communication method, but these steps or operations are merely examples. In this embodiment of this application, other operations or variations of the operations in FIG. 30 may be further performed. In addition, the steps in FIG. 30 may be performed in a sequence different from that presented in FIG. 30, and possibly, not all operations in FIG. 30 need to be performed.

S3001: UE receives first latency information from a TSN, where the first latency information is used to indicate a first latency, and the first latency is an accumulated latency of transmitting a flow from a flow service provider in the TSN to the UE.

For example, the UE 1901 receives a flow service provider broadcast declaration message from a network element that is in the TSN and that is used as a previous hop of the UE 1901. The message may be used to broadcast a flow and a QoS requirement corresponding to the flow, and the message includes identification information of the flow and the first latency information. In this case, the first latency is an accumulated latency of transmitting the flow from the communications device 1907 used as the flow service provider to the UE 1901. The previous-hop network element of the UE 1901 may be the communications device 1907, or may be a device or a network element between the UE 1901 and the communications device 1907.

Optionally, the message may further include one or more of the following information: a destination address, a source address, a maximum frame size, a maximum frame interval, a priority of a frame, a maximum allowable latency of transmitting a single frame of the flow from the flow service provider to a flow service recipient, a reliability requirement of the flow, or a resource reservation failure cause.

It should be understood that, in this embodiment of this application, for ease of description, all information other than the first latency information in information related to the flow is referred to as information about the flow. For example, the destination address, the source address, the maximum frame size, the maximum frame interval, the priority of the frame, the maximum allowable latency of transmitting the single frame of the flow from the flow service provider to the flow service recipient, the reliability requirement of the flow, the resource reservation failure cause, an identifier of the flow, a QoS parameter of the flow, or the like is referred to as the information about the flow.

S3002: The UE sends the first latency information to an SMF network element. Correspondingly, the SMF network element receives the first latency information from the UE. In addition, the UE may further send the information about the flow to the SMF network element.

For example, after receiving the flow service provider broadcast declaration message from the TSN, the UE 1901 forwards the flow service provider broadcast declaration message to the SMF network element 1905. The flow service provider broadcast declaration message carries the first latency information and the information about the flow.

For example, after receiving the flow service provider broadcast declaration message from the TSN, the UE 1901 obtains the first latency information and the information about the flow that are in the flow service provider broadcast declaration message, and sends the first latency information and the information about the flow to the SMF network element 1905.

S3003: The SMF network element obtains, from a PCF network element, a PCC rule corresponding to the flow.

For example, the SMF network element sends the information about the flow to the PCF network element. The information about the flow may include identification information of the flow, a QoS parameter of the flow, or the like. Correspondingly, the PCF network element receives the information about the flow from the SMF network element.

The PCF network element sends the PCC rule corresponding to the flow to the SMF network element. Correspondingly, the SMF network element receives the PCC rule corresponding to the flow from the PCF network element.

It should be understood that S3003 is not a step that needs to be performed. This step is performed to enable the SMF network element to obtain the PCC rule corresponding to the flow. An implementation in which the SMF network element obtains the PCC rule corresponding to the flow is not limited in this embodiment of this application.

S3005: The SMF network element determines a first target latency according to the PCC rule corresponding to the flow, and the first target latency is a transmission latency of the flow from the UE to the UPF network element.

In this embodiment of this application, the first target latency may also be referred to as an accumulated latency of transmitting the flow between the UE and the UPF network element.

An example of the first target latency may be a maximum transmission latency of the flow from the UE to the UPF network element. For example, the SMF network element may determine the maximum transmission latency of the flow from the UE to the UPF network element based on a 5QI in the PCC rule. For example, the SMF network element may use a PDB that is between the UE and the UPF network element and that corresponds to the 5QI as the maximum transmission latency of transmitting the flow from the UE to the UPF network element.

Optionally, after obtaining the PCC rule, the SMF network element may trigger a PDU session modification process, to establish a QoS flow for the flow, to reserve a resource for the flow.

S3006: The SMF network element determines a third latency based on the first latency, the first target latency, and a second target latency, where the second target latency is a latency of transmitting the flow from the UPF network element to a target network element that is in the TSN network and that is used as a next hop of the UPF network element, and the third latency is a latency of transmitting the flow from the flow service provider to the target network element that is in the TSN and that is used as the next hop of the UPF network element.

If the first latency is denoted as an accumulated latency 1, the first target latency is denoted as T1, the second target latency is denoted as T2, and the third latency is denoted as an accumulated latency 3, a possible implementation in which the SMF network element determines the third latency based on the first latency, the first target latency, and the second target latency is as follows: The accumulated latency 3=the accumulated latency 1+T1+T2.

The second target latency may be obtained by the SMF network element from the UPF network element, or may be configured, or may be obtained in another manner. A manner in which the SMF network element obtains the second target latency is not limited in this embodiment of this application.

S3007: The SMF network element sends the third latency information to the UE. Correspondingly, the UE receives the third latency information from the SMF network element.

For example, the SMF network element sends, to the UE, the flow service provider broadcast declaration message that is received by the SMF network element from the UE, and the first latency information in the flow service provider broadcast declaration message is modified to the third latency information.

Alternatively, the SMF network element sends the second latency information to the UE through another message.

S3008: The UE network element sends third latency information to the UPF network element. Correspondingly, the UPF network element receives the third latency information from the UE.

For example, the UE sends, to the UPF network element, the flow service provider broadcast declaration message that is received by the UE from the SMF network element, and the flow service provider broadcast declaration message carries the third latency information.

Alternatively, the UE modifies, to the third latency information, the first latency information that is in the flow service provider broadcast declaration message and that is received by the UE from the TSN network, and sends, to the UPF network element, a flow service provider broadcast declaration message obtained through modification.

S3009: The UPF network element sends the third latency information to the target network element.

For example, the UPF network element sends, to the target network element, the flow service provider broadcast declaration message that is received by the UPF network element from the UE, and the flow service provider broadcast declaration message carries the third latency information.

In the communication method shown in FIG. 30, the SMF network element learns, from the UE, of the first latency of transmitting the flow from the flow service provider to the UE, determines the first target latency of transmitting the flow between the UE and the UPF network element, and determines, based on the first latency, the first target latency, and the second target latency of the flow from the UPF network element to the target network element that is in the TSN and that is used as the next hop of the UPF network element, the third latency of the flow from the flow service provider to the target network element.

It should be understood that names of messages shown in FIG. 30 are merely examples. Any message that can implement a corresponding function in the communication method falls within the protection scope of the embodiments of this application.

In the communication method shown in FIG. 30, an accumulated latency of transmitting the flow from the flow service provider to the target network element that is in the TSN network and that is used as the next hop of the UPF network element may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In addition, in the communication method shown in FIG. 30, a 3GPP system is considered as a bridge in the TSN network, and may receive a flow reservation protocol message (an SRP message) from a node that is in the TSN network and that is used as a previous node of the bridge, provide a method for processing the SRP message, and send the SRP message to a node that is in the TSN and that is used as a next hop of the bridge, so that a latency requirement of a URLLC service flow can be ensured and a bandwidth resource can be reserved in a scenario in which the 3GPP network interworks with the TSN network.

Figure 31:
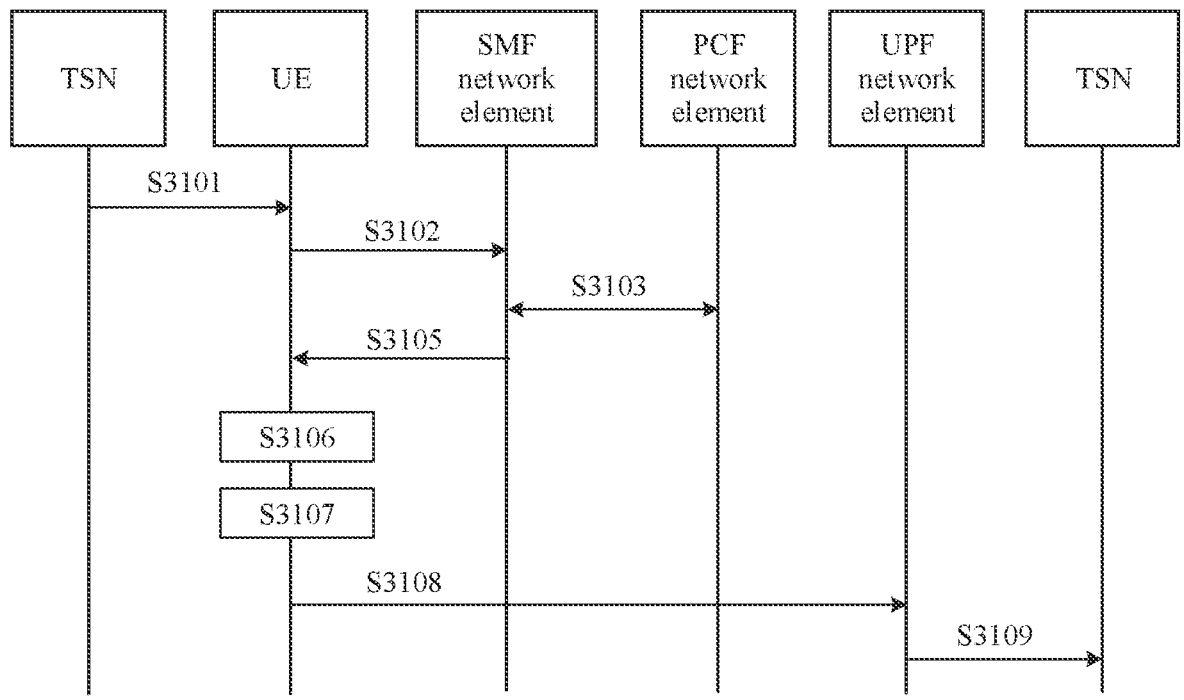
FIG. 31 is a schematic flowchart of a communication method according to another embodiment of this application.

FIG. 31 is a schematic flowchart of a communication method according to an embodiment of this application. It should be understood that FIG. 31 shows steps or operations of the communication method, but these steps or operations are merely examples. In this embodiment of this application, other operations or variations of the operations in FIG. 31 may be further performed. In addition, the steps in FIG. 31 may be performed in a sequence different from that presented in FIG. 31, and possibly, not all operations in FIG. 31 need to be performed.

S3101: UE receives first latency information from a TSN, where the first latency information is used to indicate a first latency, and the first latency is an accumulated latency of transmitting a flow from a flow service provider in the TSN to the UE.

For example, the UE 1901 receives a flow service provider broadcast declaration message from a network element that is in the TSN and that is used as a previous hop of the UE 1901. The message may be used to broadcast a flow and a QoS requirement corresponding to the flow, and the message includes identification information of the flow and the first latency information. In this case, the first latency is an accumulated latency of transmitting the flow from the communications device 1907 used as the flow service provider to the UE 1901. The previous-hop network element of the UE 1901 may be the communications device 1907, or may be a device or a network element between the UE 1901 and the communications device 1907.

Optionally, the message may further include one or more of the following information: a destination address, a source address, a maximum frame size, a maximum frame interval, a priority of a frame, a maximum allowable latency of transmitting a single frame of the flow from the flow service provider to a flow service recipient, a reliability requirement of the flow, or a resource reservation failure cause.

It should be understood that, in this embodiment of this application, for ease of description, all information other than the first latency information in information related to the flow is referred to as information about the flow. For example, the destination address, the source address, the maximum frame size, the maximum frame interval, the priority of the frame, the maximum allowable latency of transmitting the single frame of the flow from the flow service provider to the flow service recipient, the reliability requirement of the flow, the resource reservation failure cause, an identifier of the flow, a QoS parameter of the flow, or the like is referred to as the information about the flow.

S3102: The UE sends information about the flow to an SMF network element. Correspondingly, the SMF network element receives the information about the flow from the UE.

For example, after receiving the flow service provider broadcast declaration message from the TSN, the UE 1901 forwards the flow service provider broadcast declaration message to the SMF network element 1905. The flow service provider broadcast declaration message carries the information about the flow.

For example, after receiving the flow service provider broadcast declaration message from the TSN, the UE obtains the information about the flow in the flow service provider broadcast declaration message, and sends the information about the flow to the SMF network element 1905.

S3103: The SMF network element obtains, from a PCF network element, a PCC rule corresponding to the flow.

For example, the SMF network element sends the information about the flow to the PCF network element. The information about the flow may include identification information of the flow and the like. Correspondingly, the PCF network element receives the information about the flow from the SMF network element.

The PCF network element sends the PCC rule corresponding to the flow to the SMF network element. Correspondingly, the SMF network element receives the PCC rule corresponding to the flow from the PCF network element.

It should be understood that S3103 is not a step that needs to be performed. This step is performed to enable the SMF network element to obtain the PCC rule corresponding to the flow. An implementation in which the SMF network element obtains the PCC rule corresponding to the flow is not limited in this embodiment of this application.

S3105: The SMF network element sends, to the UE according to the PCC rule, a quality of service parameter corresponding to the flow. Correspondingly, the UE receives the quality of service parameter from the SMF network element.

For example, the SMF network element determines, according to the PCC rule, a 5QI corresponding to the flow, or determines a PDB between the UPF network element and the UE according to the PCC rule, and sends the 5QI or the PDB to the UE. Alternatively, the SMF network element sends, to the UE, QoS flow identification information corresponding to the flow.

Optionally, after obtaining the PCC rule, the SMF network element may trigger a PDU session modification process, to establish a QoS flow for the flow, to reserve a resource for the flow.

The SMF network element may further send, to the UE, a second target latency corresponding to the flow. The second target latency is a latency of transmitting the flow from the UPF network element to a target network element that is in the TSN network and that is used as a next hop of the UPF network element. The second target latency may be obtained by the SMF network element from the UPF network element, or may be configured, or may be obtained in another manner. A manner in which the SMF network element obtains the second target latency is not limited in this embodiment of this application.

S3106: The UE determines a first target latency based on the quality of service parameter corresponding to the flow, where the first target latency is a latency of transmitting the flow between the UE and the UPF network element.

An example of the first target latency may be a maximum transmission latency of the flow from the UE to the UPF network element. For example, the UE may determine the maximum transmission latency of the flow from the UE to the UPF network element based on the 5QI, the PDB, or the QoS flow identification information received from the SMF network element.

For example, if the UE obtains the PDB from the SMF network element, the UE may use the PDB as the first target latency.

For example, if the UE obtains the QoS flow identification information from the SMF network element, the UE may obtain a PDB in a corresponding QoS parameter based on the QoS flow identification information, and use the PDB as the first target latency.

For example, if the UE obtains the 5QI corresponding to the flow from the SMF network element, the UE may obtain the PDB in the corresponding QoS parameter based on the 5QI, and use the PDB as the first target latency.

S3107: The UE determines a third latency based on the first latency, the first target latency, and a second target latency, where the second target latency is a latency of transmitting the flow from the UPF network element to a target network element that is in the TSN network and that is used as a next hop of the UPF network element, and the third latency is a latency of transmitting the flow from the flow service provider to the target network element that is in the TSN and that is used as the next hop of the UPF network element.

If the first latency is denoted as an accumulated latency 1, the first target latency is denoted as T1, the second target latency is denoted as T2, and the third latency is denoted as an accumulated latency 3, a possible implementation in which the UE determines the third latency based on the first latency, the first target latency, and the second target latency is as follows: The accumulated latency 3=the accumulated latency 1+T1+T2.

S3108: The UE network element sends third latency information to the UPF network element. Correspondingly, the UPF network element receives the third latency information from the UE.

For example, the UE sends, to the UPF network element, the flow service provider broadcast declaration message that is received by the UE from the TSN, and the flow service provider broadcast declaration message carries the third latency information.

S3109: The UPF network element sends the third latency information to the target network element.

For example, the UPF network element sends, to the target network element, the flow service provider broadcast declaration message that is received by the UPF network element from the UE, and the flow service provider broadcast declaration message carries the third latency information.

In the communication method shown in FIG. 31, the SMF network element learns of the information about the flow from the UE, sends, to the UE based on the information about the flow, the QoS parameter corresponding to the flow, and sends the QoS parameter to the UE. The UE determines, based on the QoS parameter, the first target latency of transmitting the flow between the UE and the UPF network element, and determines, based on the first latency of transmitting the flow from the flow service provider to the UE, the first target latency, and the second target latency of the flow from the UPF network element to the target network element that is in the TSN and that is used as the next hop of the UPF network element, the third latency of the flow from the flow service provider to the target network element.

It should be understood that names of messages shown in FIG. 31 are merely examples. Any message that can implement a corresponding function in the communication method falls within the protection scope of the embodiments of this application.

In the communication method shown in FIG. 31, an accumulated latency of transmitting the flow from the flow service provider to the target network element that is in the TSN network and that is used as the next hop of the UPF network element may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In addition, in the communication method shown in FIG. 31, a 3GPP system is considered as a bridge in the TSN network, and may receive a flow reservation protocol message (an SRP message) from a node that is in the TSN network and that is used as a previous node of the bridge, provide a method for processing the SRP message, and send the SRP message to a node that is in the TSN and that is used as a next hop of the bridge, so that a latency requirement of a URLLC service flow can be ensured and a bandwidth resource can be reserved in a scenario in which the 3GPP network interworks with the TSN network.

Figure 32:
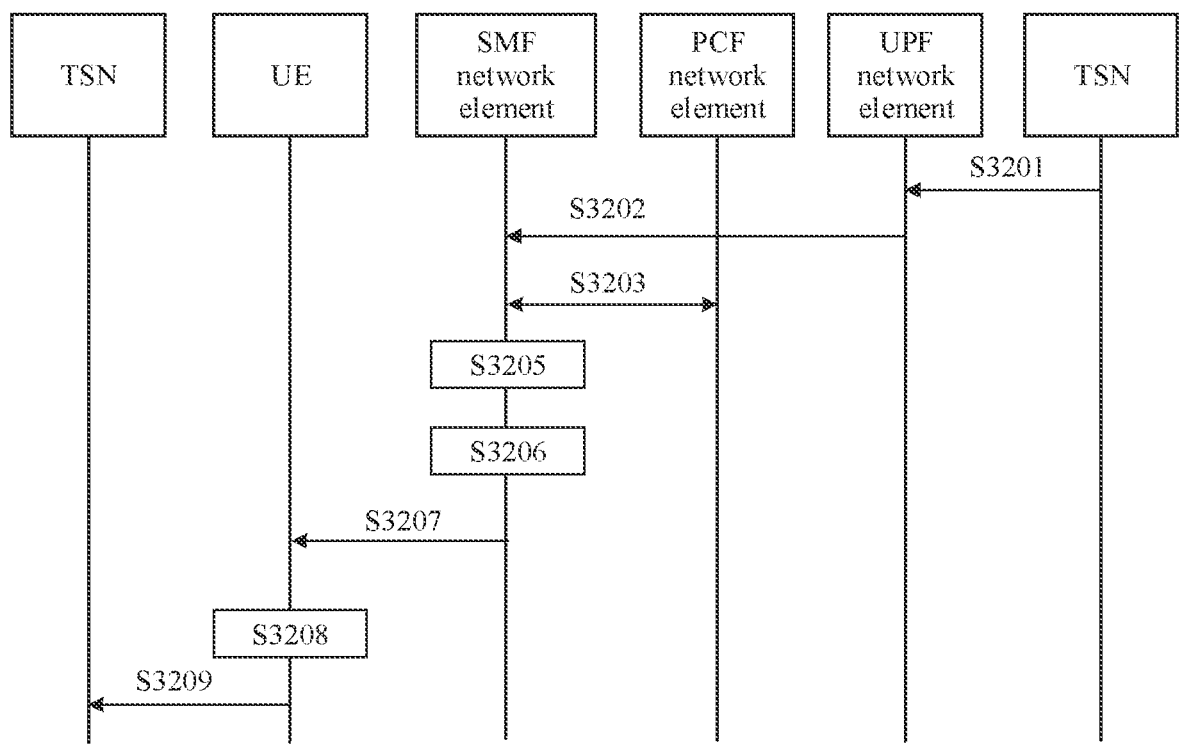
FIG. 32 is a schematic flowchart of a communication method according to another embodiment of this application.

FIG. 32 is a schematic flowchart of a communication method according to an embodiment of this application. It should be understood that FIG. 32 shows steps or operations of the communication method, but these steps or operations are merely examples. In this embodiment of this application, other operations or variations of the operations in FIG. 32 may be further performed. In addition, the steps in FIG. 32 may be performed in a sequence different from that presented in FIG. 32, and possibly, not all operations in FIG. 32 need to be performed.

S3201: A UPF network element receives first latency information from a TSN, where the first latency information is used to indicate a first latency, and the first latency is an accumulated latency of transmitting a flow from a flow service provider in the TSN to the UPF network element.

For example, the UPF network element 1903 receives a flow service provider broadcast declaration message from a network element that is in the TSN and that is used as a previous hop of the UPF network element 1903. The message may be used to broadcast a flow and a QoS requirement corresponding to the flow, and the message includes identification information of the flow and the first latency information. In this case, the first latency is an accumulated latency of transmitting the flow from the communications device 1908 used as the flow service provider to the UPF network element 1903. The previous-hop network element of the UPF network element 1903 may be the communications device 1908, or may be a device or a network element between the UPF network element 1903 and the communications device 1908.

Optionally, the message may further include one or more of the following information: a destination address, a source address, a maximum frame size, a maximum frame interval, a priority of a frame, a maximum allowable latency of transmitting a single frame of the flow from the flow service provider to a flow service recipient, a reliability requirement of the flow, or a resource reservation failure cause.

It should be understood that, in this embodiment of this application, for ease of description, all information other than the first latency information in information related to the flow is referred to as information about the flow. For example, the destination address, the source address, the maximum frame size, the maximum frame interval, the priority of the frame, the maximum allowable latency of transmitting the single frame of the flow from the flow service provider to the flow service recipient, the reliability requirement of the flow, the resource reservation failure cause, an identifier of the flow, a QoS parameter of the flow, or the like is referred to as the information about the flow.

S3202: The UPF network element sends the first latency information to an SMF network element. Correspondingly, the SMF network element receives the first latency information from the UPF network element. In addition, the UPF network element may further send the information about the flow to the SMF network element.

For example, after receiving the flow service provider broadcast declaration message from the TSN, the UPF network element 1903 forwards the flow service provider broadcast declaration message to the SMF network element 1905. The flow service provider broadcast declaration message carries the first latency information and the information about the flow.

For example, after receiving the flow service provider broadcast declaration message from the TSN, the UPF network element 1903 obtains the first latency information and the information about the flow that are in the flow service provider broadcast declaration message, and sends the first latency information and the information about the flow to the SMF network element 1905.

S3203: The SMF network element obtains, from a PCF network element, a PCC rule corresponding to the flow.

For example, the SMF network element sends the information about the flow to the PCF network element. The information about the flow may include identification information of the flow, a QoS parameter of the flow, or the like. Correspondingly, the PCF network element receives the information about the flow from the SMF network element.

The PCF network element sends the PCC rule corresponding to the flow to the SMF network element. Correspondingly, the SMF network element receives the PCC rule corresponding to the flow from the PCF network element.

It should be understood that S3203 is not a step that needs to be performed. This step is performed to enable the SMF network element to obtain the PCC rule corresponding to the flow. An implementation in which the SMF network element obtains the PCC rule corresponding to the flow is not limited in this embodiment of this application.

S3205: The SMF network element determines a first target latency according to the PCC rule corresponding to the flow, and the first target latency is a transmission latency of the flow from the UPF network element to the UE.

In this embodiment of this application, the first target latency may also be referred to as an accumulated latency of transmitting the flow between the UPF network element and the UE.

An example of the first target latency may be a maximum transmission latency of the flow from the UPF network element to the UE. For example, the SMF network element may determine the maximum transmission latency of the flow from the UPF network element to the UE based on a 5QI in the PCC rule. For example, the SMF network element may use a PDB that is between the UPF network element and the UE and that corresponds to the 5QI as the maximum transmission latency of transmitting the flow from the UPF network element to the UE.

Optionally, after obtaining the PCC rule, the SMF network element may trigger a PDU session modification process, to establish a QoS flow for the flow, to reserve a resource for the flow.

S3206: The SMF network element determines a second latency based on the first latency and the first target latency, where the second latency is a transmission latency of the flow from the flow service provider to the UPF network element.

For example, the SMF network element determines the second latency based on the first latency indicated by the first latency information carried in the flow service provider broadcast declaration message and the maximum transmission latency that is determined in S3205.

If the first latency is denoted as an accumulated latency 1, the first target latency is denoted as T1, and the second latency is denoted as an accumulated latency 2, the accumulated latency 2=the accumulated latency 1+T1.

S3207: The SMF network element sends second latency information to the UE, where the second latency information is used to indicate the second latency. Correspondingly, the UE receives the second latency information from the SMF network element.

For example, the SMF network element sends, to the UE, the flow service provider broadcast declaration message that is received by the SMF network element from the UE, and the first latency information carried in the flow service provider broadcast declaration message is modified to the second latency information.

Alternatively, the SMF network element may send the second latency information to the UE in another manner.

S3208: The UE determines a third latency based on the second latency and a second target latency, where the second target latency is a latency of transmitting the flow from the UE to a target network element that is in the TSN network and that is used as a next hop of the UE, and the third latency is a latency of transmitting the flow from the flow service provider to the target network element that is in the TSN and that is used as the next hop of the UE.

For example, the second target latency is an accumulated transmission latency of the flow from the UE 1901 to the target network element that is in the TSN and that is used as the next hop of the UE 1901. The third latency is an accumulated transmission latency of the flow from the communications device 108 to the next-hop network element. The next-hop network element may be the communications device 1907 or may be a communications device between the UE 1901 and the communications device 1907.

An implementation in which the UE determines the third latency based on the second latency and the second target latency may include: The UE adds the second target latency to the second latency. For example, if the second target latency is denoted as T2, the second latency is denoted as an accumulated latency 2, and the third latency is denoted as an accumulated latency 3, the accumulated latency 3=the accumulated latency 2+T2.

The second target latency may be obtained by the UE from the target network element, or may be configured, or may be obtained in another manner. A manner in which the UE obtains the second target latency is not limited in this embodiment of this application.

S3209: The UE sends third latency information to the target network element.

For example, the UE modifies, to the third latency information, the second latency information that is in the flow service provider broadcast declaration message and that is received by the UE from the SMF network element, and sends, to the target network element, a flow service provider broadcast declaration message obtained through modification.

If the target network element is the flow service recipient, the target network element may determine whether the target network element is interested in the flow, and if the target network element is interested in the flow, determine whether the third latency can meet a latency requirement of the flow. If the third latency can meet the latency requirement of the flow, the target network element sends the third latency information to the UE.

For example, the target network element sends, to the UE, a flow service recipient ready message, and the flow service recipient ready message includes the identification information of the flow and the third latency information. Then, the UE may forward the flow service recipient ready message to the UPF network element, and then the UPF network element forwards the flow service recipient ready message to a next-hop network element of the UPF network element in the TSN.

In the communication method shown in FIG. 32, the SMF network element learns, from the UPF network element, of the first latency of the flow from the flow service provider to the UE, determines, according to the PCC rule of the flow, the first target latency of transmitting the flow between the UPF network element and the UE, determines, based on the first latency and the first target latency, the second latency of transmitting the flow from the flow service provider to the UE, and sends the second latency to the UE. The UE determines, based on the second latency and the second target latency of the flow from the UE to the network element that is in the TSN and that is used as the next hop of the UE, the third latency of the flow from the flow service provider to the next-hop network element.

It should be understood that names of messages shown in FIG. 32 are merely examples. Any message that can implement a corresponding function in the communication method falls within the protection scope of the embodiments of this application.

In the communication method shown in FIG. 32, an accumulated latency of transmitting the flow from the flow service provider to the target network element that is in the TSN network and that is used as the next hop of the UE may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In addition, in the communication method shown in FIG. 32, a 3GPP system is considered as a bridge in the TSN network, and may receive a flow reservation protocol message (an SRP message) from a node that is in the TSN network and that is used as a previous node of the bridge, provide a method for processing the SRP message, and send the SRP message to a node that is in the TSN and that is used as a next hop of the bridge, so that a latency requirement of a URLLC service flow can be ensured and a bandwidth resource can be reserved in a scenario in which the 3GPP network interworks with the TSN network.

Figure 33:
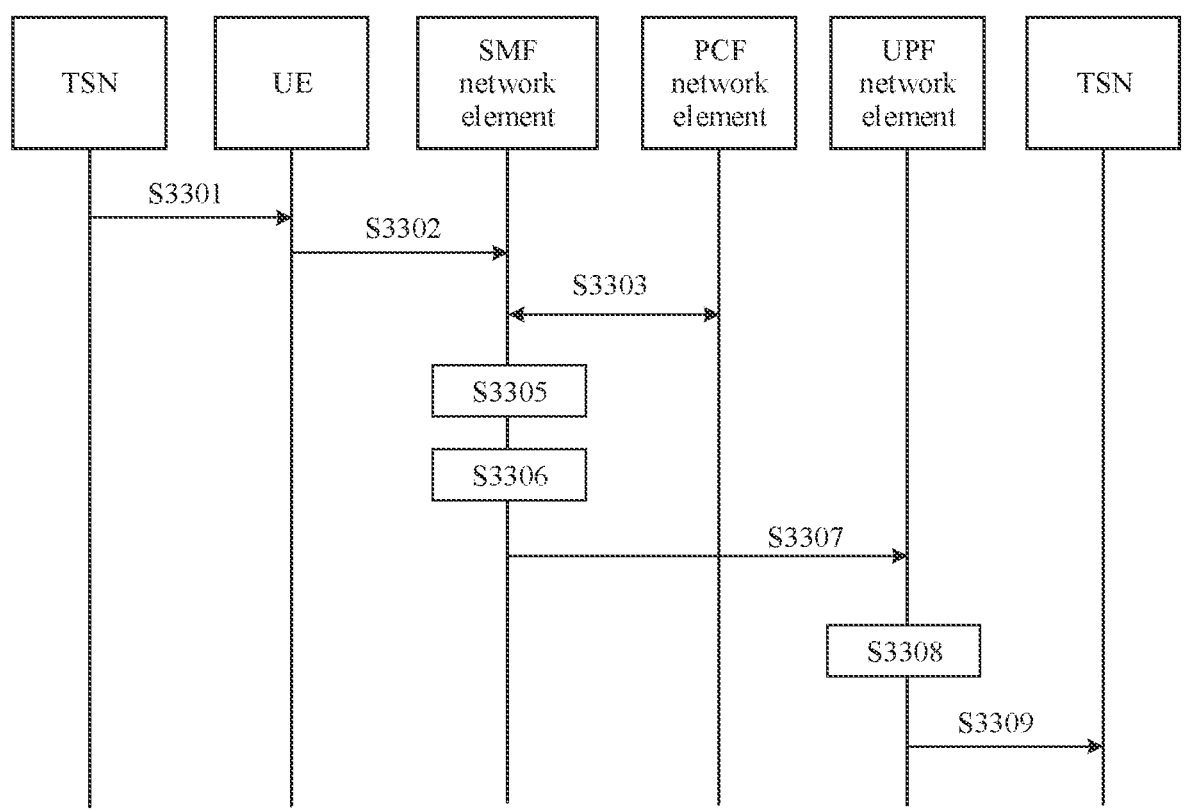
FIG. 33 is a schematic flowchart of a communication method according to another embodiment of this application.

FIG. 33 is a schematic flowchart of a communication method according to an embodiment of this application. It should be understood that FIG. 33 shows steps or operations of the communication method, but these steps or operations are merely examples. In this embodiment of this application, other operations or variations of the operations in FIG. 33 may be further performed. In addition, the steps in FIG. 33 may be performed in a sequence different from that presented in FIG. 33, and possibly, not all operations in FIG. 33 need to be performed.

S3301: UE receives first latency information from a TSN, where the first latency information is used to indicate a first latency, and the first latency is an accumulated latency of transmitting a flow from a flow service provider in the TSN to the UE.

For example, the UE 1901 receives a flow service provider broadcast declaration message from a network element that is in the TSN and that is used as a previous hop of the UE 1901. The message may be used to broadcast a flow and a QoS requirement corresponding to the flow, and the message includes identification information of the flow and the first latency information. In this case, the first latency is an accumulated latency of transmitting the flow from the communications device 1907 used as the flow service provider to the UE 1901. The previous-hop network element of the UE 1901 may be the communications device 1907, or may be a device or a network element between the UE 1901 and the communications device 1907.

Optionally, the message may further include one or more of the following information: a destination address, a source address, a maximum frame size, a maximum frame interval, a priority of a frame, a maximum allowable latency of transmitting a single frame of the flow from the flow service provider to a flow service recipient, a reliability requirement of the flow, or a resource reservation failure cause.

It should be understood that, in this embodiment of this application, for ease of description, all information other than the first latency information in information related to the flow is referred to as information about the flow. For example, the destination address, the source address, the maximum frame size, the maximum frame interval, the priority of the frame, the maximum allowable latency of transmitting the single frame of the flow from the flow service provider to the flow service recipient, the reliability requirement of the flow, the resource reservation failure cause, an identifier of the flow, a QoS parameter of the flow, or the like is referred to as the information about the flow.

S3302: The UE sends the first latency information to an SMF network element. Correspondingly, the SMF network element receives the first latency information from the UE. In addition, the UE may further send the information about the flow to the SMF network element.

For example, after receiving the flow service provider broadcast declaration message from the TSN, the UE 1901 forwards the flow service provider broadcast declaration message to the SMF network element 1905. The flow service provider broadcast declaration message carries the first latency information and the information about the flow.

For example, after receiving the flow service provider broadcast declaration message from the TSN, the UE 1901 obtains the first latency information and the information about the flow that are in the flow service provider broadcast declaration message, and sends the first latency information and the information about the flow to the SMF network element 1905.

S3303: The SMF network element obtains, from a PCF network element, a PCC rule corresponding to the flow.

For example, the SMF network element sends the information about the flow to the PCF network element. The information about the flow may include identification information of the flow, a QoS parameter of the flow, or the like. Correspondingly, the PCF network element receives the information about the flow from the SMF network element.

The PCF network element sends the PCC rule corresponding to the flow to the SMF network element. Correspondingly, the SMF network element receives the PCC rule corresponding to the flow from the PCF network element.

It should be understood that S3303 is not a step that needs to be performed. This step is performed to enable the SMF network element to obtain the PCC rule corresponding to the flow. An implementation in which the SMF network element obtains the PCC rule corresponding to the flow is not limited in this embodiment of this application.

S3305: The SMF network element determines a first target latency according to the PCC rule corresponding to the flow, and the first target latency is a transmission latency of the flow from the UE to the UPF network element.

In this embodiment of this application, the first target latency may also be referred to as an accumulated latency of transmitting the flow between the UE and the UPF network element.

An example of the first target latency may be a maximum transmission latency of the flow from the UE to the UPF network element. For example, the SMF network element may determine the maximum transmission latency of the flow from the UE to the UPF network element based on a 5QI in the PCC rule. For example, the SMF network element may use a PDB that is between the UPF and the UE and that corresponds to the 5QI as the maximum transmission latency of transmitting the flow from the UE to the UPF.

Optionally, after obtaining the PCC rule, the SMF network element may trigger a PDU session modification process, to establish a QoS flow for the flow, to reserve a resource for the flow.

S3306: The SMF network element determines a second latency based on the first latency and the first target latency, where the second latency is a transmission latency of the flow from the flow service provider to the UE.

For example, the SMF network element determines the second latency based on the first latency indicated by the first latency information carried in the flow service provider broadcast declaration message and the maximum transmission latency that is determined in S3305.

If the first latency is denoted as an accumulated latency 1, the first target latency is denoted as T1, and the second latency is denoted as an accumulated latency 2, the accumulated latency 2=the accumulated latency 1+T1.

S3307: The SMF network element sends second latency information to the UPF network element, where the second latency information is used to indicate the second latency. Correspondingly, the UPF network element receives the second latency information from the SMF network element.

For example, the SMF network element sends, to the UPF network element, a flow service provider broadcast declaration message obtained through modification, and the first latency information carried in the flow service provider broadcast declaration message obtained through modification is modified to the second latency information.

Alternatively, the SMF network element may send the second latency information to the UPF network element in another manner.

S3308: The UPF network element determines a third latency based on the second latency and a second target latency, where the second target latency is a latency of transmitting the flow from the UPF network element to a target network element that is in the TSN network and that is used as a next hop of the UPF network element, and the third latency is a latency of transmitting the flow from the flow service provider to the target network element that is in the TSN and that is used as the next hop of the UPF network element.

For example, the second target latency is an accumulated transmission latency of the flow from the UPF network element 1903 to the target network element that is in the TSN and that is used as the next hop of the UPF network element 1903. The third latency is an accumulated transmission latency of the flow from the communications device 1907 to the target network element. The target network element may be the communications device 1908 or may be a communications device between the UPF network element and the communications device 1908.

An implementation in which the UPF network element determines the third latency based on the second latency and the second target latency may include: The UPF network element adds the second target latency to the second latency, to obtain the third latency. For example, if the second target latency is denoted as T2, the second latency is denoted as an accumulated latency 2, and the third latency is denoted as an accumulated latency 3, the accumulated latency 3=the accumulated latency 2+T2.

The second target latency may be obtained by the UPF network element from the target network element, or may be configured, or may be obtained in another manner. A manner in which the UPF network element obtains the second target latency is not limited in this embodiment of this application.

S3309: The UPF network element sends the third latency information to the target network element.

For example, the UPF network element sends, to the target network element, the flow service provider broadcast declaration message that is received by the UPF network element from the UE, and the first latency information carried in the flow service provider broadcast declaration message is modified to carrying the third latency information.

In the communication method shown in FIG. 33, the SMF network element learns, from the UE, of the first latency of the flow from the flow service provider to the UE, determines, according to the PCC rule of the flow, the first target latency of transmitting the flow between the UE and the UPF network element, determines, based on the first latency and the first target latency, the second latency of transmitting the flow from the flow service provider to the UPF network element, and sends the second latency to the UPF network element. The UPF network element determines, based on the second latency and the second target latency of the flow from the UPF network element to the network element that is in the TSN and that is used as the next hop of the UPF network element, the third latency of the flow from the flow service provider to the next-hop network element.

It should be understood that names of messages shown in FIG. 33 are merely examples. Any message that can implement a corresponding function in the communication method falls within the protection scope of the embodiments of this application.

In the communication method shown in FIG. 33, an accumulated latency of transmitting the flow from the flow service provider to the target network element that is in the TSN network and that is used as the next hop of the UPF network element may be obtained, and a method for obtaining the accumulated latency is relatively simple, because in the communication method, the accumulated latency can also be obtained through calculation without requiring that the UE or the UPF network element and each device between the UE and the UPF network element are synchronized with a master clock source.

In addition, in the communication method shown in FIG. 33, a 3GPP system is considered as a bridge in the TSN network, and may receive a flow reservation protocol message (an SRP message) from a node that is in the TSN network and that is used as a previous node of the bridge, provide a method for processing the SRP message, and send the SRP message to a node that is in the TSN and that is used as a next hop of the bridge, so that a latency requirement of a URLLC service flow can be ensured and a bandwidth resource can be reserved in a scenario in which the 3GPP network interworks with the TSN network.

Optionally, any communication method shown in FIG. 20 to FIG. 33 may further include: sending, by the SMF network element, the bandwidth requirement information of the flow to the UPF network element. Correspondingly, the UPF network element receives the bandwidth requirement information of the flow from the SMF network element, and reserves the bandwidth resource for the flow based on the bandwidth requirement information of the flow.

In other words, when determining that the bandwidth resource can be reserved for the flow, the SMF network element may send the bandwidth requirement message of the flow to the UPF network element, so that the UPF network element reserves the bandwidth resource for the flow based on the bandwidth requirement information. In this way, when the flow is transmitted to the UPF network element, the UPF network element may have a corresponding bandwidth resource to transmit the flow, thereby improving transmission reliability of the flow.

Optionally, any communication method shown in FIG. 20 to FIG. 33 may further include: sending, by the SMF network element, the bandwidth requirement information of the flow to an access network device corresponding to the UE. Correspondingly, the access network device receives the bandwidth requirement information, and reserves bandwidth for the flow based on the bandwidth requirement information.

In other words, when determining that the bandwidth resource can be reserved for the flow, the SMF network element may send the bandwidth requirement message of the flow to the access network device serving the UE, so that the access network device reserves the bandwidth resource for the flow based on the bandwidth requirement information. In this way, the access network may have a corresponding bandwidth resource to transmit the flow, thereby improving transmission reliability of the flow.

Optionally, when the SMF network element sends the bandwidth requirement information of the flow to the access network device corresponding to the UE, any communication method shown in FIG. 20 to FIG. 33 may further include: receiving, by the SMF network element, first information from the access network device, where the first information is used to indicate whether the access network device successfully reserves the bandwidth resource for the flow based on the bandwidth requirement information of the flow.

For example, before sending any latency information to the UE or the UPF network element, the SMF network element may detect whether the first information is received from the access network device. If the SMF network element receives the first information and the first information indicates that the AN device successfully reserves the resource for the flow, the SMF network element may send, to the UE or the UPF network element, latency information that needs to be sent. Otherwise, the SMF network element may not send, to the UE or the UPF network element, the latency information that needs to be sent.

In this implementation, the SMF network element performs a subsequent related operation only when determining that the access network device can successfully reserve the bandwidth resource for the flow, thereby improving execution efficiency of the SMF network element.

Figure 18:
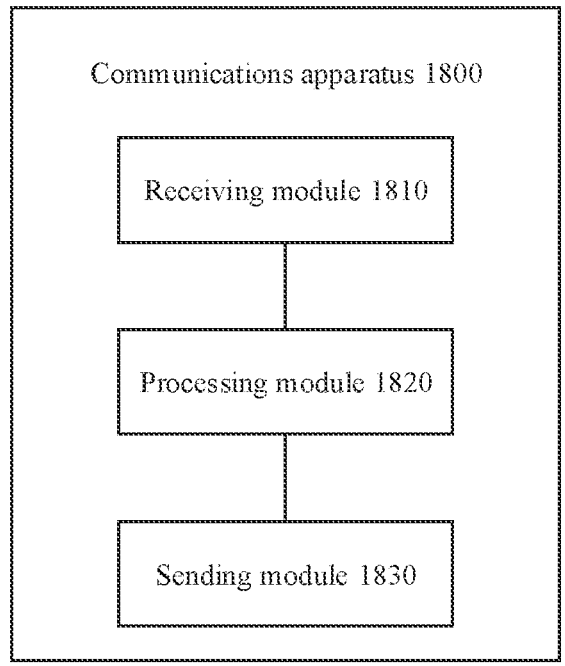
FIG. 18 is a schematic structural diagram of a communications apparatus according to an embodiment of this application.

FIG. 18 is a schematic structural diagram of a communications apparatus according to an embodiment of this application. It should be understood that a communications apparatus 1800 shown in FIG. 18 is merely an example. The communications apparatus in this embodiment of this application may further include other modules or units, or include modules having functions similar to those of modules in FIG. 18, or does not need to include all the modules in FIG. 18.

The communications apparatus 1800 shown in FIG. 18 may include a receiving module 1810, a processing module 1820, and a sending module 1830. The modules included in the communications apparatus 1800 may be implemented in a software and/or hardware manner.

For example, the receiving module 1810 may be a receiver, the sending module 1830 may be a transmitter, and the processing module 1820 may be a processor. The receiver and the transmitter may be integrated together and referred to as a transceiver.

For another example, the processing module 1820 may be a processor, and the receiving module 1810 and the sending module 1830 may be communications interfaces. In this case, the communications apparatus 1800 may be a chip.

Optionally, the communications apparatus 1800 may further include a memory, configured to store program code executed by the processor.

In a possible implementation, the communications apparatus 1800 may be configured to perform the steps performed by the SMF network element in the communication method described in any one of FIG. 2 to FIG. 7.

In this case, the communications apparatus may be an SMF network element, or may be a chip that can be integrated into the SMF network element.

For example, in the communications apparatus 1800, the receiving module 1810 may be configured to receive first latency information of a flow from a UPF network element, where the first latency information is used to indicate a first latency of transmitting the flow from a flow service provider in a TSN to the UPF network element; the processing module 1820 may be configured to determine, according to a PCC rule of the flow, a third latency of transmitting the flow from the UPF network element to UE, and the processing module 1820 may be configured to determine, based on the first latency and the third latency, a second latency of transmitting the flow from the flow service provider in the TSN to the UE; and the sending module 1830 may be configured to send second latency information to the UPF network element, where the second latency information is used to indicate the second latency.

Optionally, the third latency may be a maximum transmission latency of transmitting the flow from the UPF network element to the UE.

Optionally, the processing module may be specifically configured to determine a sum of the first latency and the third latency as the second latency.

Optionally, the processing module may be configured to determine, according to the PCC rule, that a bandwidth resource can be reserved for the flow.

Optionally, the sending module may be configured to send bandwidth requirement information of the flow to the UPF network element.

Optionally, the sending module may be configured to send the bandwidth requirement information of the flow to an access network device corresponding to the UE.

Optionally, the receiving module may be configured to receive first information from the access network device, where the first information is used to indicate that the access network device successfully reserves the bandwidth resource for the flow based on the bandwidth requirement information of the flow.

Optionally, the sending module may be configured to send information about the flow to a PCF network element, where the information about the flow is used to determine a PCC rule of the flow; and the receiving module may be configured to receive the PCC rule from the PCF network element.

Optionally, the information about the flow may include at least one of the following: an identifier ID of the flow, a source address and a destination address of the flow, a size of a maximum frame used for transmitting the flow, an interval between frames used for transmitting the flow, a priority of the flow, a maximum allowable latency of transmitting a single frame of the flow from the flow service provider to a flow service recipient, or a reliability requirement of the flow.

In some other possible implementations, the communications apparatus 1800 may be configured to perform the steps performed by the SMF network element in the communication method described in any one of FIG. 8 to FIG. 10. In this case, the communications apparatus 1800 may be an SMF network element, or may be a chip that can be integrated into the SMF network element.

For example, in the communications apparatus 1800, the receiving module 1810 may be configured to receive first latency information of a flow from UE, where the first latency information is used to indicate a first latency; the processing module 1820 may be configured to determine, according to a PCC rule of the flow, a maximum transmission latency of transmitting the flow from the UE to a UPF network element; the processing module 1820 may be configured to determine, based on the first latency and the maximum transmission latency, a second latency of transmitting the flow from the UE to the UPF network element; and the sending module 1830 may be configured to send second latency information to the UPF network element, where the second latency information is used to indicate the second latency.

Optionally, the processing module 1820 may be specifically configured to determine a value obtained by subtracting a default value of a transmission latency of transmitting the flow from the UE to the UPF network element from a sum of the first latency and the maximum transmission latency as the second latency.

Optionally, the processing module may be configured to determine, according to the PCC rule, that a bandwidth resource can be reserved for the flow.

Optionally, the sending module 1830 may be configured to send bandwidth requirement information of the flow to the UPF network element.

Optionally, the sending module 1830 may be configured to send the bandwidth requirement information of the flow to an access network device corresponding to the UE.

Optionally, the receiving module 1810 may be configured to receive first information from the access network device, where the first information is used to indicate that the access network device successfully reserves the bandwidth resource for the flow based on the bandwidth requirement information of the flow.

Optionally, the sending module 1830 may be configured to send information about the flow to a PCF network element, where the information about the flow is used to determine a PCC rule of the flow; and the SMF network element receives the PCC rule from the PCF network element.

Optionally, the information about the flow may include at least one of the following: an identifier ID of the flow, a source address and a destination address of the flow, a size of a maximum frame used for transmitting the flow, an interval between frames used for transmitting the flow, or a priority of the flow.

In some other possible implementations, the communications apparatus 1800 may be configured to perform the steps performed by the SMF network element in the communication method described in any one of FIG. 11 to FIG. 13. In this case, the communications apparatus 1800 may be an SMF network element, or may be a chip that can be integrated into the SMF network element.

For example, in the communications apparatus 1800, the receiving module 1810 may be configured to receive information about a flow from UE; the processing module 1820 may be configured to: determine, based on the information about the flow and a PCC rule of the flow, a maximum transmission latency of transmitting the flow from the UE to a user plane function UPF network element; and the sending module 1830 may be configured to send first latency information to the UE, where the first latency information is used to indicate the maximum transmission latency.

Optionally, the information about the flow may include one or more of the following: an identifier ID of the flow, a source address and a destination address of the flow, a size of a maximum frame used for transmitting the flow, an interval between frames used for transmitting the flow, a priority of the flow, or information about a latency that is determined by the UE and that is of transmitting the flow from the UE to the UPF network element.

Optionally, the processing module 1820 may be configured to determine, according to the PCC rule, that the UPF network element can reserve a bandwidth resource for the flow.

Optionally, the sending module 1830 may be configured to send bandwidth requirement information of the flow to the UPF network element.

Optionally, the sending module 1830 may be configured to send the bandwidth requirement information of the flow to an access network device corresponding to the UE.

Optionally, the receiving module 1810 may be configured to receive first information from the access network device, where the first information is used to indicate that the access network device successfully reserves the bandwidth resource for the flow based on the bandwidth requirement information of the flow.

Optionally, the sending module 1830 may be configured to send information about the flow to a PCF network element, where the information about the flow is used to determine a PCC rule of the flow; and the receiving module 1810 may be configured to receive the PCC rule from the PCF network element.

Optionally, the information about the flow may include at least one of the following: an identifier ID of the flow, a source address and a destination address of the flow, a size of a maximum frame used for transmitting the flow, an interval between frames used for transmitting the flow, or a priority of the flow.

In some other possible implementations, the communications apparatus 1800 may be configured to perform the steps performed by the UPF network element in the communication method described in any one of FIG. 2 to FIG. 7. In this case, the communications apparatus 1800 may be a UPF network element, or may be a chip that can be integrated into the UPF network element.

For example, in the communications apparatus 1800, the receiving module 1810 may be configured to receive first latency information of a flow from a TSN, where the first latency information is used to indicate a first latency of transmitting the flow from a flow service provider in the TSN to the UPF network element; the sending module 1830 may be configured to send the first latency information to an SMF network element, where the first latency information is used to determine a second latency, and the second latency is a latency of transmitting the flow from the flow service provider in the TSN network to a terminal device UE; the receiving module 1810 may be configured to receive second latency information from the SMF network element, where the second latency information is used to indicate the second latency; and the sending module 1830 may be configured to send the second latency information to the UE.

Optionally, the receiving module 1810 may be configured to receive bandwidth requirement information of the flow from the SMF network element; and the processing module 1820 may be configured to reserve a bandwidth resource for the flow based on the bandwidth requirement information of the flow.

Optionally, the receiving module may be configured to receive first information from the SMF network element, where the first information is used to indicate that an access network device corresponding to the UE successfully reserves the bandwidth resource for the flow based on the bandwidth requirement information of the flow.

In some other possible implementations, the communications apparatus 1800 may be configured to perform the steps performed by the UE in the communication method described in any one of FIG. 8 to FIG. 10. In this case, the communications apparatus 1800 may be UE, or may be a chip that can be integrated into the UE.

For example, in the communications apparatus 1800, the sending module 1830 may be configured to send information about a flow to an SMF network element, where the information about the flow is used to determine a maximum transmission latency of transmitting the flow from the UE to a UPF network element; the receiving module 1810 may be configured to receive first latency information from the SMF network element, where the first latency information is used to indicate the maximum transmission latency; the processing module 1810 may be configured to determine, based on the maximum transmission latency, a target latency of transmitting the flow from the UE to the UPF network element; and the sending module 1830 may be configured to send second latency information to the UPF network element, where the second latency information is used to indicate the target latency.

In some other possible implementations, the communications apparatus 1800 may be configured to perform the steps performed by the UPF network element in the communication method described in any one of FIG. 14 to FIG. 17. In this case, the communications apparatus 1800 may be a UPF network element, or may be a chip that can be integrated into the UPF network element.

For example, in the communications apparatus 1800, the receiving module 1810 may be configured to receive first latency information of a flow from a TSN, where the first latency information is used to indicate a first latency of transmitting the flow from a flow service provider in the TSN to the UPF network element; the sending module 1830 may be configured to send information about the flow to an SMF network element, where the information about the flow is used to determine a third latency of transmitting the flow from the UPF network element to UE; the processing module 1820 may be configured to receive third latency information from the SMF network element, where the third latency information is used to indicate the third latency; the processing module 1820 may be configured to determine, based on the first latency and the third latency, a second latency of transmitting the flow from the flow service provider in the TSN network to the UE; and the sending module 1830 may be configured to send second latency information to the UE, where the second latency information is used to indicate the second latency.

Optionally, the processing module 1820 may be specifically configured to determine a sum of the first latency and the third latency as the second latency.

Optionally, the receiving module 1810 may be configured to receive bandwidth requirement information of the flow from the SMF network element; and the processing module 1820 may be configured to reserve a bandwidth resource for the flow based on the bandwidth requirement information of the flow.

Optionally, the receiving module 1810 may be configured to receive first information from the SMF network element, where the first information is used to indicate that an access network device corresponding to the UE successfully reserves the bandwidth resource for the flow based on the bandwidth requirement information of the flow.

Optionally, the information about the flow may include at least one of the following: an identifier ID of the flow, a source address and a destination address of the flow, a size of a maximum frame used for transmitting the flow, an interval between frames used for transmitting the flow, a priority of the flow, a maximum allowable latency of transmitting a single frame of the flow from the flow service provider to a flow service recipient, or a reliability requirement of the flow.

In another possible implementation, the communications apparatus 1800 may be configured to perform the steps performed by the SMF network element in the communication method described in FIG. 24 or FIG. 30. In this case, the communications apparatus may be an SMF network element, or may be a chip that can be integrated into the SMF network element.

For example, in the communications apparatus 1800, the receiving module 1810 may be configured to receive first latency information of a flow from a first communications device, where the first latency information is used to indicate a first latency of transmitting the flow from a flow service provider in a TSN to the first communications device; the processing module 1820 may be configured to determine, according to a PCC rule of the flow, a first target latency of transmitting the flow from the first communications device to a second communications device; the processing module 1820 may be configured to determine, based on the first latency, the first target latency, and a second target latency, a third latency of transmitting the flow from the flow service provider to a target network element that is in the TSN and that is used as a next hop of the second communications device, and the second target latency is a latency of transmitting the flow from the second communications device to the target network element; and the sending module 1830 may be configured to send third latency information to the first communications device, where the third latency information is used to indicate the third latency, where the first communications device is a UPF network element, and the second communications device is UE, or the first communications device is the UE, and the second communications device is the UPF network element.

Optionally, the processing module 1820 is specifically configured to use a sum of the first latency, the first target latency, and the second target latency as the third latency.

Optionally, the first target latency is a maximum transmission latency of the flow between the UPF network element and the UE.

Optionally, the processing module 1820 is further configured to determine, according to the PCC rule, that a bandwidth resource can be reserved for the flow.

Optionally, the sending module 1830 is further configured to send bandwidth requirement information of the flow to the UPF network element.

Optionally, the sending module 1830 is further configured to send the bandwidth requirement information of the flow to an access network device corresponding to the UE.

Optionally, the receiving module 1810 is further configured to receive first information from the access network device, where the first information is used to indicate whether the access network device successfully reserves the bandwidth resource for the flow based on the bandwidth requirement information of the flow.

Optionally, the sending module is further configured to send information about the flow to a PCF network element, where the information about the flow is used to determine a PCC rule of the flow; and the receiving module 1810 is further configured to receive the PCC rule from the PCF network element.

Optionally, the information about the flow may include at least one of the following: an identifier ID of the flow, a source address and a destination address of the flow, a size of a maximum frame used for transmitting the flow, an interval between frames used for transmitting the flow, a priority of the flow, a maximum allowable latency of transmitting a single frame of the flow from a talker to a listener, or a reliability requirement of the flow.

In another possible implementation, the communications apparatus 1800 may be configured to perform the steps performed by the SMF network element in the communication method described in any one of FIG. 20, FIG. 22, FIG. 26, FIG. 28, FIG. 32, and FIG. 33. In this case, the communications apparatus 1800 may be an SMF network element, or may be a chip that can be integrated into the SMF network element.

For example, in the communications apparatus 1800, the receiving module 1810 is configured to receive first latency information of a flow from a UPF network element or UE, where the first latency information is used to indicate a first latency of transmitting the flow from a flow service provider in a TSN to a first communications device; the processing module 1820 is configured to determine, according to a PCC rule of the flow, a first target latency of transmitting the flow between the UPF network element and the UE; the processing module 1820 is configured to determine, based on the first latency and the first target latency, a second latency of transmitting the flow from the flow service provider in the TSN to a second communications device; and the sending module 1830 is configured to send second latency information to the UPF network element or the UE, where the second latency information is used to indicate the second latency, where the first communications device is the UPF network element, and the second communications device is the UE, or the first communications device is the UE, and the second communications device is the UPF network element.

Optionally, the processing module 1820 is specifically configured to use a sum of the first latency and the first target latency as the second latency.

Optionally, the first target latency is a maximum transmission latency of the flow between the UPF network element and the UE.

Optionally, the processing module 1820 is further configured to determine, according to the PCC rule, that a bandwidth resource can be reserved for the flow.

Optionally, the sending module 1830 is further configured to send bandwidth requirement information of the flow to the UPF network element.

Optionally, the sending module 1830 is further configured to send the bandwidth requirement information of the flow to an access network device corresponding to the UE.

Optionally, the receiving module 1810 is further configured to receive first information from the access network device, where the first information is used to indicate whether the access network device successfully reserves the bandwidth resource for the flow based on the bandwidth requirement information of the flow.

Optionally, the sending module is further configured to send information about the flow to a PCF network element, where the information about the flow is used to determine a PCC rule of the flow; and the receiving module 1810 is further configured to receive the PCC rule from the PCF network element.

Optionally, the information about the flow may include at least one of the following: an identifier ID of the flow, a source address and a destination address of the flow, a size of a maximum frame used for transmitting the flow, an interval between frames used for transmitting the flow, a priority of the flow, a maximum allowable latency of transmitting a single frame of the flow from the flow service provider to a flow service recipient, or a reliability requirement of the flow.

In some other possible implementations, the communications apparatus 1800 may be configured to perform the steps performed by the UPF network element in the communication method described in FIG. 23. In this case, the communications apparatus 1800 may be a UPF network element, or may be a chip that can be integrated into the UPF network element.

For example, in the communications apparatus 1800, the receiving module 1810 may be configured to receive first latency information of a flow from a TSN, where the first latency information is used to indicate a first latency of transmitting the flow from a flow service provider in the TSN to the UPF network element; the sending module 1830 may be configured to send information about the flow to an SMF network element, where the information about the flow is used to determine a quality of service parameter corresponding to the flow; the receiving module 1810 may be configured to receive the quality of service parameter from the SMF network element; the processing module 1820 may be configured to determine, based on the quality of service parameter, a first target latency of transmitting the flow from the UPF network element to the UE; the processing module 1820 may configured to determine a second latency based on the first latency and the first target latency, where the second latency is a latency of transmitting the flow from the flow service provider to the UE; and the sending module may be configured to send second latency information to the UE, where the second latency information is used to indicate the second latency.

Optionally, the processing module 1820 is specifically configured to use a sum of the first latency and the first target latency as the second latency.

Optionally, the first target latency is a maximum transmission latency of the flow between the UPF network element and the UE.

Optionally, the receiving module 1810 is further configured to receive bandwidth requirement information of the flow from the SMF network element; and the processing module 1820 is further configured to reserve a bandwidth resource for the flow based on the bandwidth requirement information of the flow.

Optionally, the receiving module 1810 is further configured to receive first information from the SMF network element, where the first information is used to indicate whether an access network device corresponding to the UE successfully reserves the bandwidth resource for the flow based on the bandwidth requirement information of the flow.

In some other possible implementations, the communications apparatus 1800 may be configured to perform the steps performed by the UPF network element in the communication method described in FIG. 25 or FIG. 27. In this case, the communications apparatus 1800 may be a UPF network element, or may be a chip that can be integrated into the UPF network element.

In the communications apparatus 1800, the receiving module 1810 may be configured to receive first latency information of a flow from a TSN or UE, where the first latency information is used to indicate a first latency of transmitting the flow from a flow service provider in the TSN to a first communications device; the sending module 1830 may be configured to send information about the flow to an SMF network element, where the information about the flow is used to determine a quality of service parameter corresponding to the flow; the receiving module 1810 may be configured to receive the quality of service parameter corresponding to the flow from the SMF network element; the processing module 1820 may be configured to determine a first target latency based on the quality of service parameter corresponding to the flow, where the first target latency is a latency of transmitting the flow between the terminal device UE and the UPF network element; the processing module 1820 may be configured to determine a third latency based on the first latency, the first target latency, and a second target latency, where the second target latency is a latency of transmitting the flow from a second communications device to a target network element that is in the TSN network and that is used as a next hop of the second communications device, and the third latency is a latency of transmitting the flow from the flow service provider to the target network element; and the sending module 1830 may be configured to send third latency information, where the third latency information is used to indicate the third latency, where the first communications device is the UPF network element, and the second communications device is the UE, or the first communications device is the UE, and the second communications device is the UPF network element.

Optionally, the processing module 1820 is specifically configured to use a sum of the first latency, the first target latency, and the second target latency as the third latency.

Optionally, the first target latency is a maximum transmission latency of the flow between the UPF network element and the UE.

Optionally, the receiving module 1810 is further configured to receive bandwidth requirement information of the flow from the SMF network element; and the processing module 1820 is further configured to reserve a bandwidth resource for the flow based on the bandwidth requirement information of the flow.

Optionally, the receiving module 1810 is further configured to receive first information from the SMF network element, where the first information is used to indicate whether an access network device corresponding to the UE successfully reserves the bandwidth resource for the flow based on the bandwidth requirement information of the flow.

In some other possible implementations, the communications apparatus 1800 may be configured to perform the steps performed by the UPF network element in the communication method described in FIG. 26, FIG. 28, FIG. 29, or FIG. 33. In this case, the communications apparatus 1800 may be a UPF network element, or may be a chip that can be integrated into the UPF network element.

In the communications apparatus 1800, the receiving module 1810 may be configured to receive second latency information of a flow from UE or an SMF network element, where the second latency information is used to indicate a second latency of transmitting the flow from a flow service provider in a time sensitive network TSN to the UPF network element; the processing module 1820 may be configured to determine a third latency based on the second latency and a second target latency, where the second target latency is a latency of transmitting the flow from the UPF network element to a target network element that is in the TSN network and that is used as a next hop of the UPF network element, and the third latency is a latency of transmitting the flow from the flow service provider to the target network element; and the sending module 1830 may be configured to send third latency information to the target network element, where the third latency information is used to indicate the third latency.

Optionally, the processing module 1820 is specifically configured to use a sum of the second latency and the second target latency as the third latency.

Optionally, the receiving module 1810 is further configured to receive bandwidth requirement information of the flow from the SMF network element; and the processing module 1820 is further configured to reserve a bandwidth resource for the flow based on the bandwidth requirement information of the flow.

Optionally, the receiving module 1810 is further configured to receive first information from the SMF network element, where the first information is used to indicate whether an access network device corresponding to the UE successfully reserves the bandwidth resource for the flow based on the bandwidth requirement information of the flow.

In some other possible implementations, the communications apparatus 1800 may be configured to perform the steps performed by the UE in the communication method described in FIG. 20, FIG. 22, FIG. 23, or FIG. 32. In this case, the communications apparatus 1800 may be UE, or may be a chip that can be integrated into the UE.

For example, in the communications apparatus 1800, the receiving module 1810 may be configured to receive second latency information of a flow from an SMF network element or a UPF network element, where the second latency information is used to indicate a second latency of transmitting the flow from a flow service provider in a TSN to the UE; the processing module 1820 may be configured to determine a third latency based on the second latency and a second target latency, where the second target latency is a latency of transmitting the flow from the UE to a target network element that is in the TSN network and that is used as a next hop of the UE, and the third latency is a latency of transmitting the flow from the flow service provider to the target network element; and the sending module 1830 may be configured to send third latency information to the target network element, where the third latency information is used to indicate the third latency.

Optionally, the processing module 1820 is specifically configured to use a sum of the second latency and the second target latency as the third latency.

In some other possible implementations, the communications apparatus 1800 may be configured to perform the steps performed by the UE in the communication method described in FIG. 21 or FIG. 31. In this case, the communications apparatus 1800 may be UE, or may be a chip that can be integrated into the UE.

For example, in the communications apparatus 1800, the receiving module 1810 may be configured to receive first latency information of a flow, where the first latency information is used to indicate a first latency of transmitting the flow from a flow service provider in the time sensitive network TSN to a first communications device; the sending module 1830 may be configured to send information about the flow to a session management function SMF network element, where the information about the flow is used to determine a quality of service parameter corresponding to the flow; the receiving module 1810 may be configured to receive the quality of service parameter corresponding to the flow from the SMF network element; the processing module 1820 may be configured to determine a first target latency based on the quality of service parameter corresponding to the flow, where the first target latency is a latency of transmitting the flow between the UE and the user plane function UPF network element; the processing module 1820 may be configured to determine a third latency based on the first latency, the first target latency, and a second target latency, where the second target latency is a latency of transmitting the flow from a second communications device to a target network element that is in the TSN network and that is used as a next hop of the second communications device, and the third latency is a latency of transmitting the flow from the flow service provider to the target network element; and the sending module 1830 may be configured to send third latency information, where the third latency information is used to indicate the third latency, where the first communications device is the UPF network element, and the second communications device is the UE, or the first communications device is the UE, and the second communications device is the UPF network element.

Optionally, the processing module 1820 is specifically configured to use a sum of the first latency, the first target latency, and the second target latency as the third latency.

Optionally, the first target latency is a maximum transmission latency of the flow between the UPF network element and the UE.

In some other possible implementations, the communications apparatus 1800 may be configured to perform the steps performed by the UE in the communication method described in FIG. 29. In this case, the communications apparatus 1800 may be UE, or may be a chip that can be integrated into the UE.

For example, in the communications apparatus 1800, the receiving module 1810 may be configured to receive first latency information of a flow, where the first latency information is used to indicate a first latency of transmitting the flow from a flow service provider in a TSN to the UE; the sending module 1830 may be configured to send information about the flow to an SMF network element, where the information about the flow is used to determine a quality of service parameter corresponding to the flow; the receiving module 1810 may be configured to receive the quality of service parameter corresponding to the flow from the SMF network element; the processing module 1820 may be configured to determine a first target latency based on the quality of service parameter corresponding to the flow, where the first target latency is a latency of transmitting the flow between the UE and a user plane function UPF network element; the processing module 1820 may be configured to determine a second latency based on the first latency and the first target latency, where the second latency is a latency of transmitting the flow from the flow service provider to the UPF network element; and the sending module 1830 may be configured to send second latency information to the UPF network element, where the second latency information is used to indicate the second latency.

Optionally, the processing module 1820 is specifically configured to determine a sum of the first latency and the first target latency as the second latency.

Optionally, the first target latency is a maximum transmission latency of the flow between the UPF network element and the UE.

A person of ordinary skill in the art may be aware that, units and algorithm steps in the examples described with reference to the embodiments disclosed in this application can be implemented by electronic hardware or a combination of electronic hardware and computer software. Whether the functions are performed by hardware or software depends on particular applications and design constraints of the technical solutions. A person skilled in the art may use a different method to implement the described function for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely division of logical functions and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may or may not be physical units, in other words, may be located at one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit.

It should be understood that in the embodiments of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:
1. A method, comprising:
receiving first latency information of a flow, wherein the first latency information indicates a first latency of transmitting the flow from a flow service provider in a time sensitive network to a user equipment (UE);
sending information about the flow to a session management function network element, wherein the information about the flow is configured for determining a quality of service parameter corresponding to the flow;

receiving the quality of service parameter corresponding to the flow from the session management function network element;
determining a first target latency based on the quality of service parameter corresponding to the flow, wherein the first target latency is a latency of transmitting the flow between the UE and a user plane function network element;
determining a second latency based on the first latency and the first target latency, wherein the second latency is a latency of transmitting the flow from the flow service provider to the user plane function network element; and
sending second latency information to the user plane function network element, wherein the second latency information indicates the second latency.

2. The method according to the claim 1, wherein the first latency information is received in a first flow service provider broadcast declaration message.

3. The method according to the claim 1, wherein the information about the flow comprises one or more of:
a destination address, a source address, a maximum frame size, a maximum frame interval, a priority of a frame, a maximum allowable latency of transmitting a single frame of the flow, a reliability requirement of the flow, a resource reservation failure cause, or an identifier of the flow.

4. The method according to the claim 2, wherein the second latency information is sent in a second flow service provider broadcast declaration message, and wherein the second flow service provider broadcast declaration message is obtained by modifying the first latency information in the first flow service provider broadcast declaration message into the second latency information.

5. The method according to the claim 1, wherein the second latency information is configured for determining a third latency, wherein the third latency is a latency of transmitting the flow from the flow service provider to a target network element that is in the time sensitive network and that is used as a next hop of the user plane function network element.

6. The method according to the claim 1, wherein the method is performed by the user equipment or a chip in the user equipment.

7. The method according to the claim 5, further comprising:
receiving the second latency information; and
determining the third latency based on the second latency and a second target latency, wherein the second latency is a latency of transmitting the flow from the user plane function network element to the target network element.

8. An apparatus, comprising:
at least one processor; and
at least one memory coupled to the at least one processor and storing programming instructions that, when executed by the at least one processor, cause the apparatus to:
receive first latency information of a flow, wherein the first latency information indicates a first latency of transmitting the flow from a flow service provider in a time sensitive network to a user equipment (UE);
send information about the flow to a session management function network element, wherein the information about the flow is configured for determining a quality of service parameter corresponding to the flow;
receive the quality of service parameter corresponding to the flow from the session management function network element;
determine a first target latency based on the quality of service parameter corresponding to the flow, wherein the first target latency is a latency of transmitting the flow between the UE and a user plane function network element;
determine a second latency based on the first latency and the first target latency, wherein the second latency is a latency of transmitting the flow from the flow service provider to the user plane function network element; and
send second latency information to the user plane function network element, wherein the second latency information indicates the second latency.

9. The apparatus according to the claim 8, wherein the first latency information is received in a first flow service provider broadcast declaration message.

10. The apparatus according to the claim 8, wherein the information about the flow comprises one or more of:
a destination address, a source address, a maximum frame size, a maximum frame interval, a priority of a frame, a maximum allowable latency of transmitting a single frame of the flow, a reliability requirement of the flow, a resource reservation failure cause, or an identifier of the flow.

11. The apparatus according to the claim 9, wherein the second latency information is sent in a second flow service provider broadcast declaration message, wherein the second flow service provider broadcast declaration message is obtained by modifying the first latency information in the first flow service provider broadcast declaration message into the second latency information.

12. The apparatus according to the claim 8, wherein the second latency information is for determining a third latency, wherein the third latency is a latency of transmitting the flow from the flow service provider to a target network element that is in the time sensitive network and that is used as a next hop of the user plane function network element.

13. The apparatus according to the claim 8, wherein the apparatus is the user equipment or a chip in the user equipment.

14. An apparatus, comprising:
at least one processor; and
at least one memory coupled to the at least one processor and storing programming instructions that, when executed by the at least one processor, cause the apparatus to:
send information about a flow to a session management function network element, wherein the information about the flow is configured for determining a first latency of transmitting the flow from a user equipment (UE) to a user plane function network element;
receive first latency information from the session management function network element, wherein the first latency information indicates the first latency;
determine, based on the first latency, a target latency of transmitting the flow from the UE to the user plane function network element; and
send second latency information to the user plane function network element, wherein the second latency information indicates the target latency.

15. The apparatus according to the claim 14, wherein the first latency is a maximum transmission latency of transmitting the flow from the UE to the user plane function network element.

16. The apparatus according to the claim 14, wherein the information about the flow comprises one or more of:
an identifier of the flow, a source address of the flow, a destination address of the flow, a size of a maximum frame for transmitting the flow, an interval between frames for transmitting the flow, a priority of the flow, a maximum allowable latency of transmitting a single frame of the flow from a talker to a listener, a reliability requirement of the flow, or information about a latency that is determined by the UE and that is of transmitting the flow from the UE to the user plane function network element.

17. The apparatus according to the claim 14, wherein determining, based on the first latency, the target latency of transmitting the flow from the UE to the user plane function network element comprises:
determining a sum of the first latency and a latency of locally processing a single frame of the flow as the target latency.

18. The apparatus according to the claim 14, wherein the second latency information is configured for determining a third latency, and wherein the third latency is a latency of transmitting the flow from the UE to a target network element that is in a time sensitive network and that is used as a next hop of the user plane function network element.

19. The apparatus according to the claim 14, wherein the apparatus is the user equipment or a chip in the user equipment.

\* \* \* \* \*